US007119772B2

(12) United States Patent
Amundson et al.

(10) Patent No.: US 7,119,772 B2
(45) Date of Patent: Oct. 10, 2006

(54) METHODS FOR DRIVING BISTABLE ELECTRO-OPTIC DISPLAYS, AND APPARATUS FOR USE THEREIN

(75) Inventors: Karl R. Amundson, Cambridge, MA (US); Robert W. Zehner, Arlington, MA (US); Ara N. Knaian, Cambridge, MA (US); Benjamin Zion, State College, PA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/814,205

(22) Filed: Mar. 31, 2004

(65) Prior Publication Data

US 2005/0001812 A1 Jan. 6, 2005

Related U.S. Application Data

(63) Continuation-in-part of application No. 10/065,795, filed on Nov. 20, 2002, now Pat. No. 7,012,600, and a continuation-in-part of application No. 09/561,424, filed on Apr. 28, 2000, now Pat. No. 6,531,997, which is a continuation-in-part of application No. 09/520, 743, filed on Mar. 8, 2000, now Pat. No. 6,504,524.

(60) Provisional application No. 60/557,094, filed on Mar. 26, 2004, provisional application No. 60/481,675, filed on Nov. 20, 2003, provisional application No. 60/481,669, filed on Nov. 19, 2003, provisional application No. 60/320,070, filed on Mar. 31, 2003, provisional application No. 60/319,040, filed on Dec. 21, 2001, provisional application No. 60/319,037, filed on Dec. 20, 2001, provisional application No. 60/319, 034, filed on Dec. 18, 2001, provisional application No. 60/319,010, filed on Nov. 21, 2001.

(51) Int. Cl.
*H04N 5/14* (2006.01)

(52) U.S. Cl. ............................ 345/87; 345/89; 345/90; 345/95; 345/210; 348/671; 348/673; 349/33; 358/455

(58) Field of Classification Search .................. 345/87, 345/89, 90, 94, 95, 101, 103, 208, 210; 348/671, 348/673; 349/33; 358/455
See application file for complete search history.

(56) References Cited

U.S. PATENT DOCUMENTS 3,668,106 A 6/1972 Ota (Continued)

FOREIGN PATENT DOCUMENTS

DE 25 23 763 12/1976

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 16 (Jun. 2001).

(Continued)

*Primary Examiner*—Ricardo Osorio
*Assistant Examiner*—Vincent E. Kovalick
(74) *Attorney, Agent, or Firm*—David J. Cole

(57) ABSTRACT

A gray scale bistable electro-optic display is driven by storing a look-up table containing data representing the impulses necessary for transitions, storing data representing at least an initial state of each pixel of the display, storing data representing temporal and gray level prior states of each pixel, receiving an input signal representing a desired final state of at least one pixel of the display; and generating an output signal representing the impulse necessary for a transition, as determined from the look-up table, dependent upon the temporal and gray level prior states. Other similar methods for driving such displays are also disclosed.

79 Claims, 25 Drawing Sheets

U.S. PATENT DOCUMENTS 3,756,693 A 9/1973 Ota
3,767,392 A 10/1973 Ota
3,792,308 A 2/1974 Ota
3,870,517 A 3/1975 Ota et al.
3,892,568 A 7/1975 Ota
3,972,040 A 7/1976 Hilsum et al.
4,041,481 A 8/1977 Sato
4,418,346 A 11/1983 Batchelder
4,430,648 A 2/1984 Togashi et al.
4,450,440 A 5/1984 White
4,741,604 A 5/1988 Kornfeld
4,746,917 A 5/1988 Di Santo et al.
4,833,464 A 5/1989 Di Santo et al.
4,947,157 A 8/1990 Di Santo et al.
4,947,159 A 8/1990 Di Santo et al.
5,061,044 A * 10/1991 Matsunaga .................. 349/133
5,066,946 A 11/1991 Disanto et al.
5,223,115 A 6/1993 DiSanto et al.
5,247,290 A 9/1993 Di Santo et al.
5,254,981 A 10/1993 Disanto et al.
5,266,937 A 11/1993 DiSanto et al.
5,293,528 A 3/1994 DiSanto et al.
5,302,235 A 4/1994 DiSanto et al.
5,335,294 A * 8/1994 Niki ........................... 382/177
5,412,398 A 5/1995 DiSanto et al.
5,448,258 A * 9/1995 Edwards ...................... 345/90
5,467,107 A 11/1995 DiSanto et al.
5,467,217 A 11/1995 Check, III
5,499,038 A 3/1996 DiSanto et al.
5,600,345 A * 2/1997 Dingwall et al. ........... 345/100
5,619,708 A * 4/1997 Ho ............................. 715/506
5,621,869 A * 4/1997 Drews ........................ 345/634
5,654,732 A 8/1997 Katakura
5,663,772 A * 9/1997 Uehara et al. .............. 348/671
5,684,501 A 11/1997 Knapp et al.
5,689,282 A 11/1997 Wolfs et al.
5,717,515 A 2/1998 Sheridon
5,725,129 A * 3/1998 Chapin et al. .............. 222/190
5,729,663 A * 3/1998 Lin et al. ..................... 358/1.9
5,739,801 A 4/1998 Sheridon
5,745,094 A 4/1998 Gordon, II et al.
5,760,761 A 6/1998 Sheridon
5,774,104 A * 6/1998 Crossland et al. ............ 345/96
5,777,782 A 7/1998 Sheridon
5,805,175 A * 9/1998 Priem ......................... 345/601
5,808,783 A 9/1998 Crowley
5,831,588 A * 11/1998 Hotto ......................... 345/100
5,831,705 A * 11/1998 Kaneko et al. ............. 349/128
5,844,569 A * 12/1998 Eisler et al. ................ 345/619
5,866,284 A 2/1999 Vincent
5,872,552 A 2/1999 Gordon, II et al.
5,892,504 A 4/1999 Knapp
5,896,117 A 4/1999 Moon
5,903,251 A * 5/1999 Mori et al. ................. 345/101
5,905,484 A * 5/1999 Verhulst ...................... 345/98
5,923,340 A * 7/1999 Guttag et al. ............... 345/571
5,930,026 A 7/1999 Jacobson et al.
5,933,203 A 8/1999 Wu et al.
5,961,804 A 10/1999 Jacobson et al.
5,963,456 A 10/1999 Klein et al.
5,969,701 A * 10/1999 Numao et al. ................ 345/89
5,978,052 A 11/1999 Ilcisin et al.
6,002,384 A 12/1999 Tamai et al.
6,017,584 A 1/2000 Albert et al.
6,034,807 A 3/2000 Little et al.
6,054,071 A 4/2000 Mikkelsen, Jr.
6,055,091 A 4/2000 Sheridon et al.
6,055,180 A 4/2000 Gudesen et al.
6,057,814 A 5/2000 Kalt
6,064,410 A 5/2000 Wen et al.
6,067,185 A 5/2000 Albert et al.
6,081,285 A 6/2000 Wen et al.
6,097,531 A 8/2000 Sheridon
6,118,426 A 9/2000 Albert et al.
6,120,588 A 9/2000 Jacobson
6,120,839 A 9/2000 Comiskey et al.
6,124,851 A 9/2000 Jacobson
6,128,124 A 10/2000 Silverman
6,130,773 A 10/2000 Jacobson et al.
6,130,774 A 10/2000 Albert et al.
6,137,467 A 10/2000 Sheridon et al.
6,144,361 A 11/2000 Gordon, II et al.
6,147,791 A 11/2000 Sheridon
6,154,190 A 11/2000 Yang et al.
6,172,798 B1 1/2001 Albert et al.
6,177,921 B1 1/2001 Comiskey et al.
6,184,856 B1 2/2001 Gordon, II et al.
6,211,998 B1 4/2001 Sheridon
6,225,971 B1 5/2001 Gordon, II et al.
6,232,950 B1 5/2001 Albert et al.
6,236,385 B1 5/2001 Nomura et al.
6,239,896 B1 5/2001 Ikeda
6,241,921 B1 6/2001 Jacobson et al.
6,249,271 B1 6/2001 Albert et al.
6,252,564 B1 6/2001 Albert et al.
6,262,706 B1 7/2001 Albert et al.
6,262,833 B1 7/2001 Loxley et al.
6,271,823 B1 8/2001 Gordon, II et al.
6,300,932 B1 10/2001 Albert
6,301,038 B1 10/2001 Fitzmaurice et al.
6,312,304 B1 11/2001 Duthaler et al.
6,312,971 B1 11/2001 Amundson et al.
6,320,565 B1 11/2001 Albu et al.
6,323,989 B1 11/2001 Jacobson et al.
6,327,072 B1 12/2001 Comiskey et al.
6,330,054 B1 12/2001 Ikami
6,348,908 B1 2/2002 Richley et al.
6,359,605 B1 3/2002 Knapp et al.
6,373,461 B1 4/2002 Hasegawa et al.
6,376,828 B1 4/2002 Comiskey
6,377,387 B1 4/2002 Duthaler et al.
6,392,785 B1 5/2002 Albert et al.
6,392,786 B1 5/2002 Albert
6,407,763 B1 6/2002 Yamaguchi et al.
6,413,790 B1 7/2002 Duthaler et al.
6,421,033 B1 7/2002 Williams et al.
6,422,687 B1 7/2002 Jacobson
6,445,374 B1 9/2002 Albert et al.
6,445,489 B1 9/2002 Jacobson et al.
6,459,418 B1 10/2002 Comiskey et al.
6,462,837 B1 10/2002 Tone
6,473,072 B1 10/2002 Comiskey et al.
6,480,182 B1 11/2002 Turner et al.
6,498,114 B1 12/2002 Amundson et al.
6,504,524 B1 1/2003 Gates et al.
6,506,438 B1 1/2003 Duthaler et al.
6,512,354 B1 1/2003 Jacobson et al.
6,515,649 B1 2/2003 Albert et al.
6,518,949 B1 2/2003 Drzaic
6,521,489 B1 2/2003 Duthaler et al.
6,531,997 B1 3/2003 Gates et al.
6,535,197 B1 3/2003 Comiskey et al.
6,538,801 B1 3/2003 Jacobson et al.
6,545,291 B1 4/2003 Amundson et al.
6,580,545 B1 6/2003 Morrison et al.
6,639,578 B1 10/2003 Comiskey et al.
6,652,075 B1 11/2003 Jacobson
6,657,772 B1 12/2003 Loxley
6,664,944 B1 12/2003 Albert et al.
D485,294 S 1/2004 Albert
6,672,921 B1 1/2004 Liang et al.
6,680,725 B1 1/2004 Jacobson
6,683,333 B1 1/2004 Kazlas et al.
6,693,620 B1 2/2004 Herb et al.

| | | | |
|---|---|---|---|
| 6,704,133 | B1 | 3/2004 | Gates et al. |
| 6,710,540 | B1 | 3/2004 | Albert et al. |
| 6,721,083 | B1 | 4/2004 | Jacobson et al. |
| 6,724,519 | B1 | 4/2004 | Morrison et al. |
| 6,727,881 | B1 | 4/2004 | Albert et al. |
| 6,738,050 | B1 | 5/2004 | Comiskey et al. |
| 6,750,473 | B1 | 6/2004 | Amundson et al. |
| 6,753,999 | B1 | 6/2004 | Zehner et al. |
| 6,788,449 | B1 | 9/2004 | Liang et al. |
| 6,816,147 | B1 | 11/2004 | Albert |
| 6,819,471 | B1 | 11/2004 | Amundson et al. |
| 6,822,782 | B1 | 11/2004 | Pratt et al. |
| 6,825,068 | B1 | 11/2004 | Denis et al. |
| 6,825,829 | B1 | 11/2004 | Albert et al. |
| 6,825,970 | B1 | 11/2004 | Goenaga et al. |
| 6,831,769 | B1 | 12/2004 | Holman et al. |
| 6,839,158 | B1 | 1/2005 | Albert et al. |
| 6,842,167 | B1 | 1/2005 | Albert et al. |
| 6,842,279 | B1 | 1/2005 | Amundson |
| 6,842,657 | B1 | 1/2005 | Drzaic et al. |
| 6,864,875 | B1 | 3/2005 | Drzaic et al. |
| 6,865,010 | B1 | 3/2005 | Duthaler et al. |
| 6,866,760 | B1 | 3/2005 | Paolini Jr. et al. |
| 6,870,661 | B1 | 3/2005 | Pullen et al. |
| 2001/0026260 | A1 | 10/2001 | Yoneda et al. |
| 2002/0005832 | A1 | 1/2002 | Katase |
| 2002/0033784 | A1 | 3/2002 | Machida et al. |
| 2002/0033793 | A1 | 3/2002 | Machida et al. |
| 2002/0060321 | A1 | 5/2002 | Kazlas et al. |
| 2002/0063661 | A1 | 5/2002 | Comiskey et al. |
| 2002/0090980 | A1 | 7/2002 | Wilcox et al. |
| 2002/0113770 | A1 | 8/2002 | Jacobson et al. |
| 2002/0130832 | A1 | 9/2002 | Baucom et al. |
| 2002/0180687 | A1 | 12/2002 | Webber |
| 2002/0196207 | A1 | 12/2002 | Machida et al. |
| 2002/0196219 | A1 | 12/2002 | Matsunaga et al. |
| 2003/0011560 | A1 | 1/2003 | Albert et al. |
| 2003/0020844 | A1 | 1/2003 | Albert et al. |
| 2003/0058223 | A1 | 3/2003 | Tracy et al. |
| 2003/0063076 | A1 | 4/2003 | Machida et al. |
| 2003/0102858 | A1 | 6/2003 | Jacobson et al. |
| 2003/0132908 | A1 | 7/2003 | Herb et al. |
| 2003/0137521 | A1 | 7/2003 | Zehner et al. |
| 2003/0151702 | A1 | 8/2003 | Morrison et al. |
| 2003/0214695 | A1 | 11/2003 | Abramson et al. |
| 2003/0222315 | A1 | 12/2003 | Amundson et al. |
| 2004/0012839 | A1 | 1/2004 | Cao et al. |
| 2004/0014265 | A1 | 1/2004 | Kazlas et al. |
| 2004/0027327 | A1 | 2/2004 | LeCain et al. |
| 2004/0051934 | A1 | 3/2004 | Machida et al. |
| 2004/0075634 | A1 | 4/2004 | Gates |
| 2004/0094422 | A1 | 5/2004 | Pullen et al. |
| 2004/0105036 | A1 | 6/2004 | Danner et al. |
| 2004/0112750 | A1 | 6/2004 | Jacobson et al. |
| 2004/0119681 | A1 | 6/2004 | Albert et al. |
| 2004/0120024 | A1 | 6/2004 | Chen et al. |
| 2004/0136048 | A1 | 7/2004 | Arango et al. |
| 2004/0155857 | A1 | 8/2004 | Duthaler et al. |
| 2004/0180476 | A1 | 9/2004 | Kazlas et al. |
| 2004/0196215 | A1 | 10/2004 | Duthaler et al. |
| 2004/0226820 | A1 | 11/2004 | Webber et al. |
| 2004/0233509 | A1 | 11/2004 | Zhang et al. |
| 2004/0252360 | A1 | 12/2004 | Webber et al. |
| 2004/0257635 | A1 | 12/2004 | Paolini, Jr. et al. |
| 2005/0000813 | A1 | 1/2005 | Pullen et al. |
| 2005/0001810 | A1 | 1/2005 | Yakushiji et al. |
| 2005/0001812 | A1 | 1/2005 | Amundson et al. |
| 2005/0007653 | A1 | 1/2005 | Honeyman et al. |
| 2005/0035941 | A1 | 2/2005 | Albert et al. |

FOREIGN PATENT DOCUMENTS

| | | | |
|---|---|---|---|
| EP | 1 145 072 | B1 | 5/2003 |
| EP | 1 500 971 | A1 | 1/2005 |
| JP | 03-091722 | A | 4/1991 |
| JP | 03-096925 | A | 4/1991 |
| JP | 05-173194 | A | 7/1993 |
| JP | 06-233131 | A | 8/1994 |
| JP | 09-016116 | A | 1/1997 |
| JP | 09-185087 | A | 7/1997 |
| JP | 09-230391 | A | 9/1997 |
| JP | 11-113019 | A | 4/1999 |
| JP | 2000-221546 | | 8/2000 |
| WO | WO 99/10870 | | 3/1999 |
| WO | WO 00/05704 | | 2/2000 |
| WO | WO 00/36560 | | 6/2000 |
| WO | WO 00/38000 | | 6/2000 |
| WO | WO 00/67110 | | 11/2000 |
| WO | WO 00/67327 | | 11/2000 |
| WO | WO 01/07961 | | 2/2001 |
| WO | WO 01/27690 | | 4/2001 |
| WO | WO 03/107315 | | 12/2003 |
| WO | WO 2004/001498 | | 12/2003 |
| WO | WO 2004/006006 | | 1/2004 |
| WO | WO 2004/008239 | | 1/2004 |

OTHER PUBLICATIONS

Antia, M., “Switchable Reflections Make Electronic Ink”, Science, 285, 658 (1999).

Bach, U., et al., “Nanomaterials-Based Electrochromics for Paper-Quality Displays”, Adv. Mater, 14(11), 845 (2002).

Chen, Y., et al., “A Conformable Electronic Ink Display using a Foil-Based a-Si TFT Array”, SID 01 Digest, 157 (Jun. 2001).

Comiskey, B., et al., “An electrophoretic Ink for all-printed reflective electronic displays”, Nature, 394, 253 (1998).

Comiskey, B., et al., “Electrophoretic Ink: A Printable Display Material”, SID 97 Digest (1997), p. 75.

Drzaic, P., et al., “A Printed and Rollable Bistable Electronic Display”, SID 98 Digest (1998), p. 1131.

Duthaler, G., et al., “Active-Matrix Color Displays Using Electrophoretic Ink and Color Filters”, SID 02 Digest, 1374 (2002).

Hayes, R.A., et al., “Video-Speed Electronic Paper Based on Electrowetting”, Nature, vol. 425, Sep. 25, pp. 383-385 (2003).

Hunt, R.W.G., “Measuring Color”, 3d. Edn, Fountain Press (ISBN 0 86343 387 1), p. 63 (1998).

Jacobson, J., et al., “The last book”, IBM Systems J., 36, 457 (1997).

Jo, G-R, et al., “Toner Display Based on Particle Movements”, Chem. Mater, 14, 664 (2002).

Kazlas, P., et al., “12.1” SVGA Microencapsulated Electrophoretic Active Matrix Display for Information Applicances, SID 01 Digest, 152 (Jun. 2001).

Kitamura, T., et al., “Electrical toner movement for electronic paper-like display”, Asia Display/IDW ’01, p. 1517, Paper HCS1-1 (2001).

Mossman, M.A., et al., “A New Reflective Color Display Technique Based on Total Internal Reflection and Substractive Color Filtering”, SID 01 Digest, 1054 (2001).

O’Regan, B. et al., “A Low Cost, High-efficiency Solar Cell Based on Dye-sensitized colloidal TiO2 Films”, Nature, vol. 353, Oct. 24, 1991, 773-740.

Pitt, M.G., et al., “Power Consumption of Microencapsulated Electrophoretic Displays for Smart Handheld Applications”, SID 02 Digest, 1378 (2002).

Poor, A., "Feed forward makes LCDs Faster", available at "http://www.extremetech.com/article2/0,3973,10085,00.asp".
Shiffman, R.R., et al., "An Electrophoretic Image Display with Internal NMOS Address Logic and Display Drivers," Proceedings of the SID, 1984, vol. 25, 105 (1984).
Singer, B., et al., "An X-Y Addressable Electrophoretic Display," Proceedings of the SID, 18, 255 (1977).
Webber, R., "Image Stability in Active-Matrix Microencapsulated Electrophoretic Displays", SID 02 Digest, 126 (2002).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).

* cited by examiner

METHODS FOR DRIVING BISTABLE ELECTRO-OPTIC DISPLAYS, AND APPARATUS FOR USE THEREIN

REFERENCE TO RELATED APPLICATIONS

This application is a continuation in part of application Ser. No. 10/065,795, filed Nov. 20, 2002 now U.S. Pat. No. 7,012,600 (Publication No. 2003/0137521), which itself claims benefit of the following Provisional Applications: (a) Ser. No. 60/319,007, filed Nov. 20, 2001; (b) Ser. No. 60/319,010, filed Nov. 21, 2001; (c) Ser. No. 60/319,034, filed Dec. 18, 2001; (d) Ser. No. 60/319,037, filed Dec. 20, 2001; and (e) Ser. No. 60/319,040, filed Dec. 21, 2001. The aforementioned application Ser. No. 10/065,795 is also a continuation-in-part of application Ser. No. 09/561,424, filed Apr. 28, 2000 (now U.S. Pat. No. 6,531,997), which is itself a continuation-in-part of application Ser. No. 09/520,743, filed Mar. 8, 2000 (now U.S. Pat. No. 6,504,524). Application Ser. No. 09/561,424 also claims benefit of Application Ser. No. 60/131,790 filed Apr. 30, 1999.

This application also claims benefit of the following Provisional Applications: (f) Ser. No. 60/320,070, filed Mar. 31, 2003; (g) Ser. No. 60/320,207, filed May 5, 2003; (h) Ser. No. 60/481,669, filed Nov. 19, 2003; (i) Ser. No. 60/481,675, filed Nov. 20, 2003; and (j) Ser. No. 60/557,094, filed Mar. 26, 2004 entitled "Methods for driving bistable electro-optic displays" by Karl R. Amundson.

This application is also related to application Ser. No. 10/249,973, filed May 23, 2003, which is a continuation-in-part of the aforementioned application Ser. No. 10/065,795. Application Ser. No. 10/249,973 claims priority from Provisional Applications Ser. No. 60/319,315, filed Jun. 13, 2002 and Ser. No. 60/319,321, filed Jun. 18, 2002. This application is also related to copending application Ser. No. 10/063,236, filed Apr. 2, 2002 (Publication No. 2002/0180687), and to Application Ser. No. 60/481,040, filed Jun. 30, 2003.

The entire contents of these copending applications, and of all other U.S. patents and published and copending applications mentioned below, are herein incorporated by reference.

BACKGROUND OF INVENTION

This invention relates to methods for driving electro-optic displays, especially bistable electro-optic displays, and to apparatus for use in such methods. More specifically, this invention relates to driving methods and apparatus (controllers) which are intended to enable more accurate control of gray states of the pixels of an electro-optic display. This invention also relates to a method which enables long-term direct current (DC) balancing of the driving impulses applied to an electrophoretic display. This invention is especially, but not exclusively, intended for use with particle-based electrophoretic displays in which one or more types of electrically charged particles are suspended in a liquid and are moved through the liquid under the influence of an electric field to change the appearance of the display.

In one aspect, this invention relates to apparatus which enables electro-optic media which are sensitive to the polarity of the applied field to be driven using circuitry intended for driving liquid crystal displays, in which the liquid crystal material is not sensitive to polarity.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gamma voltage" is used herein to refer to external voltage references used by drivers to determine voltages to be applied to pixels of a display. It will be appreciated that a bistable electro-optic medium does not display the type of one-to-one correlation between applied voltage and optical state characteristic of liquid crystals, the use of the term "gamma voltage" herein is not precisely the same as with conventional liquid crystal displays, in which gamma voltages determine inflection points in the voltage level/output voltage curve.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. patent application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; and 6,704,133; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0096113; 2003/0102858; 2003/0132908; 2003/0137521; 2003/0137717; 2003/0151702; 2003/0189749; 2003/0214695; 2003/0214697; 2003/0222315; 2004/0008398; 2004/0012839; 2004/0014265; and 2004/0027327; and International Applications Publication Nos. WO 99/67678; WO 00/05704; WO 00/38000; WO 00/38001; WO00/36560; WO 00/67110; WO 00/67327; WO 01/07961; WO 01/08241; WO 03/092077; and WO 03/107,315.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

The bistable or multi-stable behavior of particle-based electrophoretic displays, and other electro-optic displays displaying similar behavior, is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals.

In contrast, bistable electro-optic displays act, to a first approximation, as impulse transducers, so that the final state of a pixel depends not only upon the electric field applied and the time for which this field is applied, but also upon the state of the pixel prior to the application of the electric field. Furthermore, it has now been found, at least in the case of many particle-based electro-optic displays, that the impulses necessary to change a given pixel through equal changes in gray level (as judged by eye or by standard optical instruments) are not necessarily constant, nor are they necessarily commutative. For example, consider a display in which each pixel can display gray levels of 0 (white), 1, 2 or 3 (black), beneficially spaced apart. (The spacing between the levels may be linear in percentage reflectance, as measured by eye or by instruments but other spacings may also be used. For example, the spacings may be linear in L* (where L* has the usual CIE definition:

$$L^*=116(R/R_0)^{1/3}-16,$$

where R is the reflectance and $R_0$ is a standard reflectance value), or may be selected to provide a specific gamma; a gamma of 2.2 is often adopted for monitors, and where the present displays are be used as a replacement for a monitor, use of a similar gamma may be desirable.) It has been found that the impulse necessary to change the pixel from level 0 to level 1 (hereinafter for convenience referred to as a "0-1 transition") is often not the same as that required for a 1-2 or 2-3 transition. Furthermore, the impulse needed for a 1-0 transition is not necessarily the same as the reverse of a 0-1 transition. In addition, some systems appear to display a "memory" effect, such that the impulse needed for (say) a 0-1 transition varies somewhat depending upon whether a particular pixel undergoes 0-0-1, 1-0-1 or 3-0-1 transitions. (Where, the notation "x-y-z", where x, y, and z are all optical states 0, 1, 2, or 3 denotes a sequence of optical states visited sequentially in time, list from earlier to later.) Although these problems can be reduced or overcome by driving all pixels of the display to one of the extreme states for a substantial period before driving the required pixels to other states, the resultant "flash" of solid color is often unacceptable; for example, a reader of an electronic book may desire the text of the book to scroll down the screen, and may be distracted, or lose his place, if the display is required to flash solid black or white at frequent intervals. Furthermore, such flashing of the display increases its energy consumption and may reduce the working lifetime of the display. Finally, it has been found that, at least in some cases, the impulse required for a particular transition is affected by the temperature and the total operating time of the display, and by the time that a specific pixel has remained in a particular optical state prior to a given transition, and that compensating for these factors is desirable to secure accurate gray scale rendition.

In one aspect, this invention seeks to provide a method and a controller that can provide accurate gray levels in an electro-optic display without the need to flash solid color on the display at frequent intervals.

Furthermore, as will readily be apparent from the foregoing discussion, the drive requirements of bistable electro-optic media render unmodified drivers designed for driving active matrix liquid crystal displays (AMLCD's) unsuitable for use in bistable electro-optic media-based displays. However, such AMLCD drivers are readily available commercially, with large permissible voltage ranges and high pin-count packages, on an off-the-shelf basis, and are inexpensive, so that such AMLCD drives are attractive for drive bistable electro-optic displays, whereas similar drivers custom designed for bistable electro-optic media-based displays would be substantially more expensive, and would involve substantial design and production time. Accordingly, there are cost and development time advantages in modifying AMLCD drivers for use with bistable electro-optic displays, and this invention seeks to provide a method and modified driver which enables this to be done.

Also, as already noted, this invention relates to methods for driving electrophoretic displays which enable long-term DC-balancing of the driving impulses applied to the display. It has been found that encapsulated and other electrophoretic displays need to be driven with accurately DC-balanced waveforms (i.e., the integral of current against time for any particular pixel of the display should be held to zero over an extended period of operation of the display) to preserve image stability, maintain symmetrical switching characteristics, and provide the maximum useful working lifetime of the display. Conventional methods for maintaining precise DC-balance require precision-regulated power supplies, precision voltage-modulated drivers for gray scale, and crystal oscillators for timing, and the provision of these and similar components adds greatly to the cost of the display.

(Strictly speaking, DC balance should be measured "internally" having regard to the voltages experienced by the electro-optic medium itself. However, in practice it is impracticable to effect such internal measurements in an operating display which may contain hundreds of thousands of pixels, and in practice DC balance is measured using an "external" measurement, namely the voltages applied to the electrodes disposed on opposed sides of the electro-optic medium. Furthermore, there are two assumptions normally made when discussing DC balance. Firstly, it is assumed, normally with good reason, that the conductivity of the electro-optic medium is not a function of polarity, so that pulse length is an appropriate way to track DC balance, when a constant voltage is applied. Secondly, it is assumed that the conductivity of the electro-optic medium is proportional to the applied voltage, so that one can use impulse to track DC balance.)

Furthermore, even with the addition of such expensive components, true DC balance is still not obtained. Empirically it has been found that many electrophoretic media have asymmetric current/voltage (I/V curves); it is believed, although the invention is in no way limited by this belief, that these asymmetric curves are due to electrochemical voltage sources within the media. These asymmetric curves mean that the current when the medium is addressed to one extreme optical state (say black) is not the same as when the medium is addressed to the opposed extreme optical state (say white), even when the voltage is carefully controlled to be precisely the same in the two cases.

It has now been found that the extent of DC imbalance in an electrophoretic medium used in a display can be ascertained by measuring the open-circuit electrochemical potential (hereinafter for convenience called the "remnant voltage" of the medium. When the remnant voltage of a pixel is zero, it has been perfectly DC balanced. If its remnant voltage is positive, it has been DC unbalanced in the positive direction. If its remnant voltage is negative, it has been DC unbalanced in the negative direction. This invention uses remnant voltage data to maintain long-term DC-balancing of the display.

As described in more detail below, one aspect of the present invention relates to use of a so-called "look-up table" method for driving a bistable electro-optic display having a plurality of pixels, this method taking account of the initial and desired final state of each pixel, and to a device controller for use in this method. In preferred forms of this look-up table method, there are stored not only the initial gray level of each pixel but also one or more prior states of each pixel prior to the initial state thereof, and the output signal is generated dependent upon the one or more prior states and the initial gray level.

The output signal generated in such a look-up table method commonly defines a plurality of separate impulses. For example, FIGS. 11A and 11B below illustrate a so-called "sawtooth" driving scheme which is arranged so that once a given pixel has been driven from one extreme optical state (i.e., white or black) towards the opposed extreme optical state by a pulse of one polarity, the pixel may not receive a pulse of the opposed polarity until it has reached the aforesaid opposed extreme optical state. Depending upon the initial and final states for a given transition, this sawtooth driving scheme may require from one to three pulses alternating in polarity.

Furthermore, the individual pulses within these sequences may themselves be composites of sub-pulses, and some of these sub-pulses may apply zero voltage to a pixel. For example, Table 2 below illustrates a drive scheme in which white-going pulses are applied in odd-numbered frames and black-going pulses are applied in even-numbered frames. In this drive scheme, white-going transitions are driven only on the odd frames, black-going transitions are driven only on the even frames, and in any frame in which the pixel is not being driven, zero voltage is applied; the total impulse applied to any given pixel is controlled by pulse-width modulation, i.e., by the number of odd or even frames in a sequence for which a non-zero voltage is applied to the pixel. This drive scheme may be combined with that shown in FIGS. 11A and 11B to yield a drive scheme in which a given transition may require a large number of sub-pulses. In view of these complications, hereinafter the term "superframe" will be used to denote a sequence of successive display scan frames needed to effect all necessary gray level changes from an initial image to a final image. Typically, a display update is initiated only at the beginning of a superframe.

Finally, it should be noted that, in a look-up table method which stores at least one prior state of each pixel in addition to the initial state, the prior state(s) stored are not necessarily spaced one superframe apart in time, and the first prior state is not necessarily one superframe before the initial state, since in at least some electro-optic displays it has been found that it is the sequence of successive gray levels applied to a given pixel which is most important in determining the impulse needed to effect a given transition rather than the length of time for which the pixel is maintained in these successive gray levels. For example, consider a two-bit (four gray level) display which is updated once per second, i.e., the superframe length is one second, and in which the impulse applied is determined by the initial state, final state and one prior state. If a given pixel is held at gray level 3 for four superframes and then at gray level 1 for five superframes, in calculating the impulse needed to drive that pixel to a final state of gray level 2, it may be desirable to set the single prior state used for the calculation at gray level 3 (i.e., the immediately preceding gray level different from the initial gray level of 1) rather than 1, the actual gray level one superframe prior to the initial level. In other words, in this form of the look-up table method, the list of prior states is changed only when a change in gray level occurs, not at each superframe.

In practice, it has been found that the impulse needed to effect accurate transitions between gray levels in a bistable electro-optic display is affected by both prior gray state levels and gray state levels at specific times prior to the initial state, and in one aspect this invention provides a modified look-up table method and controller which allows adjustment of the impulse of a transition to allow for both types of parameters.

It must also be recognized that, as discussed in more detail below, depending upon the number of prior states stored, the look-up tables used in look-up table methods may become very large. To take an extreme example, consider a look-up table method for a 256 ($2^8$) gray level display using an algorithm that takes account of initial, final and two prior states. The necessary four-dimensional look-up table has $2^{32}$ entries. If each entry requires (say) 64 bits (8 bytes), the total size of the look-up table would be approximately 32 Gbyte. While storing this amount of data poses no problems on a desktop computer, it may present problems in a portable device. In another aspect, this invention provides a method for driving a bistable electro-optic display which achieves results similar to those of the look-up table method but which does not require the storage of very large look-up tables.

A further aspect of the present invention relates to methods and apparatus for driving a bistable electro-optic display in a manner which permits part of the display to operate at a different bit depth (i.e., different number of gray scale levels) from the remainder of the display. From the foregoing description of the sawtooth driving method illustrated in FIGS. 11A and 11B below, it will be apparent to those skilled in the art that transitions between successive images in general image flow of bistable electro-optic displays having numerous gray scale levels can be substantially longer than transitions if the same displays were being driven in monochrome mode. Typically, gray scale transitions may be up to four times as long as the corresponding monochrome transitions. The relatively slow gray scale transitions may not be objectionable when the display is being used to present a series of images, such as a series of photographs or successive pages of an electronic book. However, there are times when it would be useful to achieve rapid updating of a limited area of such a display. For example, consider a situation where a user employs such a display to review of series of photographs stored in a database in order to enter for each photograph key words or other indexing terms intended to facilitate later retrieval of images from the database. In this situation, relatively slow transitions between successive photographs may be tolerable; for example, if the user spends one to two minutes studying each photograph and deciding on the indexing terms, a one to two second transition between successive photographs does not greatly affect the user's productivity. However, as is well known to anyone who has tried to run a word processing program on a computer with inadequate processing power, a one to two second delay in updating a dialog box, in which are displayed the indexing terms being entered by the user, is extremely frustrating and likely to lead to numerous typing errors. Accordingly, in this and similar situations, it would be advantageous to be able to run the dialog box in a monochrome mode to permit swift transitions, while continuing to run the remainder of the display in a gray scale mode to enable the images to be reproduced accurately, and this invention provides a method and apparatus to enable this to be done.

Another aspect of the present invention relates methods to achieve fine control of gray levels of an impulse drive imaging medium without the need for fine voltage control. Although as already indicated, electrophoretic and some other electro-optic displays exhibit bistability, this bistability is not unlimited, and images on the display slowly fade with time, so that if an image is to be maintained for extended periods, the image may have to be refreshed periodically, so as to restore the image to the optical state which it has when first written.

However, such refreshing of the image may give rise to its own problems. As discussed in the aforementioned U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method which does result in zero net time-averaged applied electric field across the electro-optic medium is conveniently referred to a "direct current balanced" or "DC balanced". If an image is to be maintained for extended periods by applying refreshing pulses, these pulses need to be of the same polarity as the addressing pulse originally used to drive the relevant pixel of the display to the optical state being maintained, which results in a DC imbalanced drive scheme.

A challenge for achieving accurate gray scale levels in an impulse driven medium is applying the appropriate voltage impulse for achieving the desired gray tone. Satisfactory transitions between optical states can be achieved by fine control of the voltage of all or part of the drive waveform. The need for precision can be understood from the following example. Consider the case where a current image consists of a screen that is half black and half white, and the desired next image is a uniform gray intermediate between black and white. In order to achieve a uniform gray level, the impulses used to go from black to gray and white to gray have to be finely adjusted so that the gray level achieved coming from black matches the gray level coming from white. Fine tuning is further needed if the final gray level achieved is a function of prior gray level history of the display. For example, as already discussed, the optical state achieved when going from black to gray can be a function, not only of the waveform applied, but also of what state was visited before the current black state. It is then desirable to have the display module keep track of some aspects of the display history, such as prior image states, and allow fine tuning of the waveform to compensate for this prior state history (see below for more detailed discussions on this point).

Fine tuning of the impulse can be achieved using only three voltage levels (0, +V, −V), by adjusting the width of the applied pulse with high accuracy. However, this is not desirable for an active matrix display, since the frame rate must be increased in order to achieve high pulse width resolution. A high frame rate increases the power consumption of the display, and puts more strenuous demands on the control and drive electronics. It is therefore not desirable to operate an active matrix display at frame rates substantially above 60–75 Hz.

Fine tuning of the impulse can also be achieved if a number of finely-spaced voltages are available. In an active matrix drive, this requires source drivers that can output one of a numerous set of voltages available over at least a subset of the available voltages. For example, for a driver that outputs between −10 and +10 volts, it may be advantageous to have available 0 V, and two bands of voltages between −10 and −7 volts and between 7 and 10 volts, with 16 distinct voltage levels between −10 and −7 volts and 16 distinct voltage levels between 7 and 10 volts bringing the total number of required voltage levels to 33 (see Table 1). One could then achieve fine control of the optical final state, for example, by varying the voltage between +7 and +10 or between −10 and −7 volts for the last one or more scan frames of the addressing period. This method is an example of a voltage-modulated technique for achieving acceptable display performance.

TABLE 1

Example of voltages needed for voltage modulated drive

| | | |
|---|---|---|
| −10.0 V | −7.8 V | 8.0 V |
| −9.8 V | −7.6 V | 8.2 V |
| −9.6 V | −7.4 V | 8.4 V |
| −9.4 V | −7.2 V | 8.6 V |
| −9.2 V | −7.0 V | 8.8 V |
| −9.0 V | 0.0 V | 9.0 V |
| −8.8 V | 7.0 V | 9.2 V |
| −8.6 V | 7.2 V | 9.4 V |
| −8.4 V | 7.4 V | 9.6 V |
| −8.2 V | 7.6 V | 9.8 V |
| −8.0 V | 7.8 V | 10.0 V |

The disadvantage of using voltage-modulated techniques is that drivers must have some range of fine voltage control. Display module cost can be reduced by using drivers that offer only two or three voltages.

In another aspect, this invention seeks to provide methods for achieving fine control of gray levels using drivers with only a small set of available voltages, specifically, where the control of impulse is too coarse to achieve the fine tuning necessary for acceptable display performance. Thus, this aspect of the present invention seeks to provide methods to achieve fine control of gray levels of an impulse driven imaging medium without the need for fine voltage control. This aspect of the invention can be applied, for example, to an active matrix display that has source drivers that can output only two or three voltages.

In another aspect, this invention relates to a method of driving an electro-optic display using a drive scheme that contains at least some direct current (DC) balanced transitions. For reasons explained at length in the aforementioned copending applications, when driving an electro-optic display it is desirable to use a drive scheme that is DC balanced, i.e., on which has the property that, for any sequence of optical states, the integral of the applied voltage is zero whenever the final optical state matches the initial optical state. This guarantees that the net DC imbalance experienced by the electro-optic layer is bounded by a known value. For example, a 15V, 300 ms pulse may be used to drive an electro-optic layer from the white to the black state. After this transition, the imaging layer has experienced 4.5 V-s of DC-imbalance impulse. To drive the film back to white, if a −15V, 300 ms pulse is used, then the imaging layer is DC balanced across the series of transitions from white to black and back to white.

It has also been found desirable to use a drive scheme in which at least some of the transitions are themselves DC balanced; such transitions are hereinafter termed "DC balanced transitions". A DC-balanced transition has no net voltage impulse. A drive scheme waveform that employs only DC-balanced transitions leaves the electro-optic layer DC balanced after each transition. For example, a −15V, 300 ms pulse followed by a 15V, 300 ms pulse might be used to drive the electro-optic layer from white to black. The net voltage impulse across the electro-optic layer across this transition is zero. One might then use a 15V, 300 ms pulse followed by a −15V, 300 ms pulse to drive the electro-optic layer back to white. Again, the net voltage impulse is zero across this transition.

A drive scheme composed of all DC-balanced transition elements is, by necessity, a DC-balanced waveform. It is also possible to formulate a DC-balanced drive scheme that contains DC-balanced transitions and DC-imbalanced transitions, as discussed in detail below.

SUMMARY OF INVENTION

Accordingly, in one aspect, this invention provides a method of driving a bistable electro-optic display having a plurality of pixels, each of which is capable of displaying at least three gray levels (as is conventional in the display art, the extreme black and white states are regarded as two gray levels for purposes of counting gray levels). The method comprises:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table.

This method may hereinafter for convenience be referred to as the "look-up table method" of the present invention.

This invention also provides a device controller for use in such a method. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse.

This invention also provides a method of driving a bistable electro-optic display having a plurality of pixels, each of which is capable of displaying at least three gray levels. The method comprises:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from said look-up table, the output signal representing the period of time for which a substantially constant drive voltage is to be applied to said pixel.

This invention also provides a device controller for use in such a method. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse, the output signal representing the period of time for which a substantially constant drive voltage is to be applied to said pixel.

In another aspect, this invention provides a device controller for use in the method of the present invention. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse, the output signal representing a plurality of pulses varying in at least one of voltage and duration, the output signal representing a zero voltage after the expiration of a predetermined period of time.

In another aspect, this invention provides a driver circuit having output lines arranged to be connected to drive electrodes of an electro-optic display. This driver circuit has first input means for receiving a plurality of (n+1) bit numbers representing the voltage and polarity of signals to be placed on the drive electrodes; and second input means for receiving a clock signal. Upon receipt of the clock signal, the driver circuit displays the selected voltages on its output lines. In one preferred form of this driver circuit, the selected voltages may be any one of $2^n$ discrete voltages between R and R+V, where R is a predetermined reference voltage (typically the voltage of a common front electrode in an active matrix display, as described in more detail below), and V is the maximum difference from the reference voltage which the driver circuit can assert, or any one of $2^n$ discrete voltages between R and R−V. These selected voltages may be linearly distributed over the range of R±V, or may be distributed in a non-linear manner; the non-linearity may be controlled by two or more gamma voltages placed within the specified range, each gamma voltage defining a linear regime between that gamma voltage and the adjacent gamma or reference voltage.

In another aspect, this invention provides a driver circuit having output lines arranged to be connected to drive electrodes of an electro-optic display. This driver circuit has first input means for receiving a plurality of 2-bit numbers representing the voltage and polarity of signals to be placed on the drive electrodes; and second input means for receiving a clock signal. Upon receipt of the clock signal, the driver circuit displays the voltages selected from R+V, R and R−V (where R and V are as defined above) on its output lines.

In another aspect, this invention provides a method for driving an electro-optic display which displays a remnant voltage, especially an electrophoretic display. This method comprises:

(a) applying a first driving pulse to a pixel of the display;

(b) measuring the remnant voltage of the pixel after the first driving pulse; and (c) applying a second driving pulse to the pixel following the measurement of the remnant voltage, the magnitude of the second driving pulse being controlled dependent upon the measured remnant voltage to reduce the remnant voltage of the pixel.

This method may hereinafter for convenience be referred to as the "remnant voltage" method of the present invention.

In another aspect, this invention provides a method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing data representing at least one temporal prior state of each pixel of the display at a predetermined time prior to the initial state;

storing data representing at least one gray level prior state of each pixel prior to a change in gray scale level to produce the initial state;

receiving an input signal representing a desired final state of at least one pixel of the display; and generating an output signal representing the impulse necessary to convert the initial state of said one pixel to the desired final state thereof, as determined from the look-up table, the output signal being generated dependent upon said at least one temporal prior state, said at least one gray level prior state and said initial state of said one pixel.

This method may hereinafter for convenience be referred to as the "prior temporal/gray level state" method of the present invention.

This method may comprise storing data representing at least two gray level prior states of each pixel, and generating the output signal dependent upon said at least one temporal prior state, said at least two gray level prior states and said initial state of said one pixel. Alternatively or in addition, this method may comprise storing data representing at least two temporal prior states of each pixel, and generating the output signal dependent upon said at least two temporal prior states, said at least one gray level prior state and said initial state of said one pixel. The method may, of course, allow for more than two gray level and/or more than two temporal prior states.

This method may further comprise receiving a temperature signal representing the temperature of at least one pixel of the display and generating said output signal dependent upon said temperature signal, and/or generating a lifetime signal representing the operating time of said pixel and generating said output signal dependent upon said lifetime signal.

As explained in more detail below, to reduce the size of the look-up table, at least one entry in the look-up table may comprise a pointer to an entry in a second table specifying one of a plurality of types of waveform to be used for the relevant transition, and at least one parameter specifying how the waveform is to be varied for the relevant transition.

This invention also provides a device controller for use in such a prior temporal/gray level state method. The controller comprises:

storage means arranged to store a look-up table containing data representing the impulses necessary to convert an initial gray level to a final gray level, data representing at least an initial state of each pixel of the display, data representing at least one temporal prior state of each pixel of the display at a predetermined time prior to the initial state, and data representing at least one gray level prior state of each pixel prior to a change in gray scale level to produce the initial state;

input means for receiving an input signal representing a desired final state of at least one pixel of the display;

calculation means for determining, from the input signal, the stored data representing the initial state, the at least one temporal prior state and the at least one gray level prior state of said pixel, and the look-up table, the impulse required to change the initial state of said one pixel to the desired final state; and output means for generating an output signal representative of said impulse.

In this controller, the storage means may be arranged to store data representing at least two gray level prior states of each pixel, and the calculation means may be arranged to determine the impulse dependent upon the at least one temporal prior state, the at least two gray level prior states and the initial state of the one pixel. Alternatively or in addition, the storage means may be arranged to store data representing at least two temporal prior states of each pixel, and the calculation means may be arranged to determine the impulse dependent upon the at least two temporal prior state, the at least one gray level prior state and the initial state of the one pixel.

Furthermore, in this controller, the input means may be arranged to receive a temperature signal representing the temperature of at least one pixel of the display, and the calculation means may be arranged to determine the impulse dependent upon the temperature signal. Alternatively or in addition, the input means may be arranged to receive a lifetime signal representing the operating time temperature of the pixel, and the calculation means may be arranged to determine the impulse dependent upon the lifetime signal.

In another aspect, this invention provides a method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing compensation voltage data representing a compensation voltage for each pixel of the display, the compensation voltage for any pixel being calculated dependent upon at least one impulse previously applied to that pixel;

receiving an input signal representing a desired final state of at least one pixel of the display; and generating an output signal representing a pixel voltage to be applied to said one pixel, said pixel voltage being the sum of a drive voltage determined from the initial and final states of the pixel and the look-up table, and a compensation voltage determined from the compensation voltage data for the pixel.

This method may hereinafter for convenience be referred to as the "compensation voltage" method of the present invention.

In this compensation voltage method, the compensation voltage for each pixel may be calculated dependent upon at least one of a temporal prior state of the pixel and a gray level prior state of the pixel. Also, the compensation voltage for each pixel may be applied to that pixel both during a period when a drive voltage is being applied to the pixel and during a hold period when no drive voltage is being applied to the pixel.

For reasons explained in detail below, it is necessary periodically to update the compensation voltages used in the compensation voltage method of the present invention. The compensation voltage for each pixel may be updated during each superframe (the period required for a complete addressing of the display). The compensation voltage for each pixel may be updated by (1) modifying the previous value of the compensation voltage using a fixed algorithm independent of the pulse applied during the relevant superframe; and (2) increasing the value from step (1) by an amount determined by the pulse applied during the relevant superframe. In a preferred variant of this updating procedure, the compensation voltage for each pixel is updated by (1) dividing the previous value of the compensation voltage by a fixed constant; and (2) increasing the value from step (1) by an amount substantially proportional to the total area under the voltage/time curve applied to the electro-optic medium during the relevant superframe.

In the compensation voltage method of the present invention, the compensation voltage may be applied in the form of an exponentially decaying voltage applied at the end of at least one drive pulse.

This invention also provides a device controller for use in such a compensation voltage method. The controller comprises:

storage means arranged to store both a look-up table containing data representing the impulses necessary to convert an initial gray level to a final gray level, data representing at least an initial state of each pixel of the display; and compensation voltage data for each pixel of the display;

input means for receiving an input signal representing a desired final state of at least one pixel of the display;

calculation means for determining, from the input signal, the stored data representing the initial state of said pixel, and the look-up table, a drive voltage required to change the initial state of said one pixel to the desired final state, the calculation means also determining, from the compensation voltage data for said pixel, a compensation voltage for said pixel, and summing the drive voltage and the compensation voltage to determine a pixel voltage; and output means for generating an output signal representative of said pixel voltage.

In this controller, the calculation means may be arranged to determine the compensation voltage dependent upon at least one of a temporal prior state of the pixel and a gray level prior state of the pixel. Also, the output means may be arranged to apply the compensation voltage to the pixel both during a period when a drive voltage is being applied to the pixel and during a hold period when no drive voltage is being applied to the pixel.

Furthermore, in this controller, the calculation means may be arranged to update the compensation voltage for each pixel during each superframe required for a complete addressing of the display. For such updating, the calculation means may be arranged to update the compensation voltage for each pixel by (1) modifying the previous value of the compensation voltage using a fixed algorithm independent of the pulse applied during the relevant superframe; and (2) increasing the value from step (1) by an amount determined by the pulse applied during the relevant superframe. In a preferred variant of this procedure, the calculation means is arranged to update the compensation voltage for each pixel by (1) dividing the previous value of the compensation voltage by a fixed constant; and (2) increasing the value from step (1) by an amount substantially proportional to the total area under the voltage/time curve applied to the electro-optic medium during the relevant superframe.

The output means of the controller may be arranged to apply the compensation voltage in the form of an exponentially decaying voltage applied at the end of at least one drive pulse.

In another aspect, this invention provides a method for updating a bistable electro-optic display having a plurality of pixels arranged in a plurality of rows and columns such that each pixel is uniquely defined by the intersection of a specified row and a specified column, and drive means for applying electric fields independently to each of the pixels to vary the display state of the pixel, each pixel having at least three different display states, the method comprising:

storing region data representing a defined region comprising a part but less than all of said display;

determining for each pixel whether the pixel is within or outside the defined region;

applying a first drive scheme to pixels within the defined region and a second drive scheme, different from the first drive scheme, to pixels outside the defined region.

This method may hereinafter for convenience be referred to as the "defined region" method of the present invention.

In this defined region method, the first and second drive schemes may differ in bit depth; in particular, one of the first and second drive schemes may be monochrome and the other may be gray scale having at least four different gray levels. The defined region may comprise a text box used for entry of text on to the display.

In another aspect, this invention provides a method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table, wherein for at least one transition from an initial state to a final state, the output signal comprises a DC imbalanced fine tuning sequence which:

(a) has a non-zero net impulse;

(b) is non-contiguous;

(c) results in a change in gray level of the pixel that is substantially different (typically differs by more than 50 per cent) from the change in optical state of its DC reference pulse, where the DC reference pulse is a pulse of voltage $V_0$, where $V_0$ is the maximum voltage applied during the fine tuning sequence but with the same sign as the net impulse G of the fine tuning sequence, and the duration of the reference pulse is $G/V_0$; and (d) results in a change in gray level of the pixel smaller in magnitude than (typically less than half of) the change in gray level caused by its time-reference pulse, where the time-reference pulse is defined as a monopolar voltage pulse of the same duration as the fine tuning sequence, but where the sign of the reference pulse is that which gives the larger change in gray level.

This method (and the similar method defined below) may hereinafter for convenience be referred to as the "non-contiguous addressing" method of the present invention; when it is necessary to distinguish between the two methods they may be referred to as the "DC imbalanced non-contiguous addressing" method and the "DC balanced non-contiguous addressing" method respectively.

In a preferred form of this non-contiguous addressing method, the fine tuning sequence results in a change in gray level of the pixel less than one half of the change in gray level caused by its time-reference pulse.

This invention also provides a method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table, wherein for at least one transition from an initial state to a final state, the output signal comprises a DC balanced fine tuning sequence which:

(a) has substantially zero net impulse; and (b) at no point in the fine tuning sequence, causes the gray level of the pixel to vary from its gray level at the beginning of the fine tuning sequence by more than about one third of the difference in gray level between the two extreme optical states of the pixel.

In both variants of the non-contiguous addressing method of the present invention, the output signal typically comprises at least one monopolar drive pulse in addition to the fine tuning sequence. The non-contiguous output signal may be non-periodic. For a majority of transitions in the lookup table, the output signal may have a non-zero net impulse and be non-contiguous. In the at least one transition using a non-contiguous output signal, the output signal may consist only of pulses having voltage levels of +V, 0 and −V, preferably consisting only of pulses having voltage levels of 0 and one of +V and −V. In a preferred variant of this method, for the at least one transition using a non-contiguous output signal, and preferably for a majority of transitions in the look-up table for which the initial and final states of the pixel are different, the output signal consists of a pulse having a voltage level of 0 preceded and followed by at least two pulses having voltage levels of the same one of +V and −V. Preferably, the transition table is DC balanced. Also, for the at least one transition using a non-contiguous output signal, the output signal may consist of a series of pulses which are integer multiples of a single interval.

The non-contiguous addressing method of the present invention may further comprise storing data representing at least one temporal prior state of said one pixel and/or at least one gray level prior state of said one pixel, and generating the output signal dependent upon said at least one temporal prior state and/or at least one gray level prior state of said one pixel.

The present invention also provides a method of driving a bistable electro-optic display having a plurality of pixels, each of which is capable of displaying at least three gray levels, the method comprising applying to each pixel of the display an output signal effective to change the pixel from an initial state to a final state, wherein, for at least one transition for which the initial and final states of the pixel are different, the output signal consists of a pulse having a voltage level of 0 preceded and followed at by least two pulses having voltage levels of the same one of +V and −V.

In another aspect, this invention provides a method of driving a bistable electro-optic display having a plurality of pixels, each of which is capable of displaying at least three gray levels, the method comprising applying to each pixel of the display an output signal effective to change the pixel from an initial state to a final state, wherein, for at least one transition, the output signal is non-zero but DC balanced.

This method may hereinafter for convenience be referred to as the "DC balanced addressing" method of the present invention.

In this DC balanced addressing method, for the at least one transition, the output signal may comprise a first pair of pulses comprising a voltage pulse preceded by a pulse of equal length but opposite sign. The output signal may further comprise a period of zero voltage between the two pulses alternatively, at least one of the pulses may be interrupted by a period of zero voltage. The output signal may further comprise a second pair of pulses of equal length but opposite sign; the second pair of pulses may have a length different from that of the first pair of pulses. The first of the second pair of pulses may have a polarity opposite to that of the first of the first pair of pulses. The first pair of pulses may occur between the first and the second of the second pair of pulses.

Also, in this DC balanced addressing method, for the aforementioned transition, the output signal may comprise at least one pulse element effective to drive the pixel substantially into one optical rail.

As discussed in more detail below, the DC balanced addressing method of the present invention may make use of a combination of DC balanced and DC imbalanced transitions. For example, for each transition for which the initial and final states of the pixel are the same, the output signal may be non-zero but DC balanced, and for each transition in which the initial and final states of the pixel are not the same, the output signal may not be DC balanced. In this addressing method, for each transition in which the initial and final states of the pixel are not the same, the output signal may have the form $-x/\Delta IP/x$, where $\Delta IP$ is the difference in impulse potential between the initial and final states of the pixel and $-x$ and $x$ are a pair of pulses of equal length but opposite sign.

The DC balanced addressing method of the present invention may further comprise:

storing a look-up table containing data representing the impulses necessary to convert the initial gray level of a pixel to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table.

This invention also provides a method of driving a bistable electro-optic display having at least one pixel which comprises applying to the pixel a waveform V(t) such that:

$$J = \int_0^T V(t)M(T-t)dt \tag{1}$$

(where T is the length of the waveform, the integral is over the duration of the waveform, V(t) is the waveform voltage as a function of time t, and M(t) is a memory function that characterizes the reduction in efficacy of the remnant voltage to induce dwell-time-dependence arising from a short pulse at time zero) is less than about 1 volt sec. This method may hereinafter for convenience by referred to as the "DTD integral reduction" method of the present invention. Desirably J is less than about 0.5 volt sec., and most desirably less than about 0.1 volt sec. In fact J should be arranged to be as small as possible, ideally zero.

In a preferred form of this method, J is calculated by:

$$J = \int_0^T V(t)\exp\left(-\frac{T-t}{\tau}\right)dt \tag{2}$$

where $\tau$ is a decay (relaxation) time, which preferably has a value of from about 0.7 to about 1.3 seconds.

DETAILED DESCRIPTION

Figure 1:
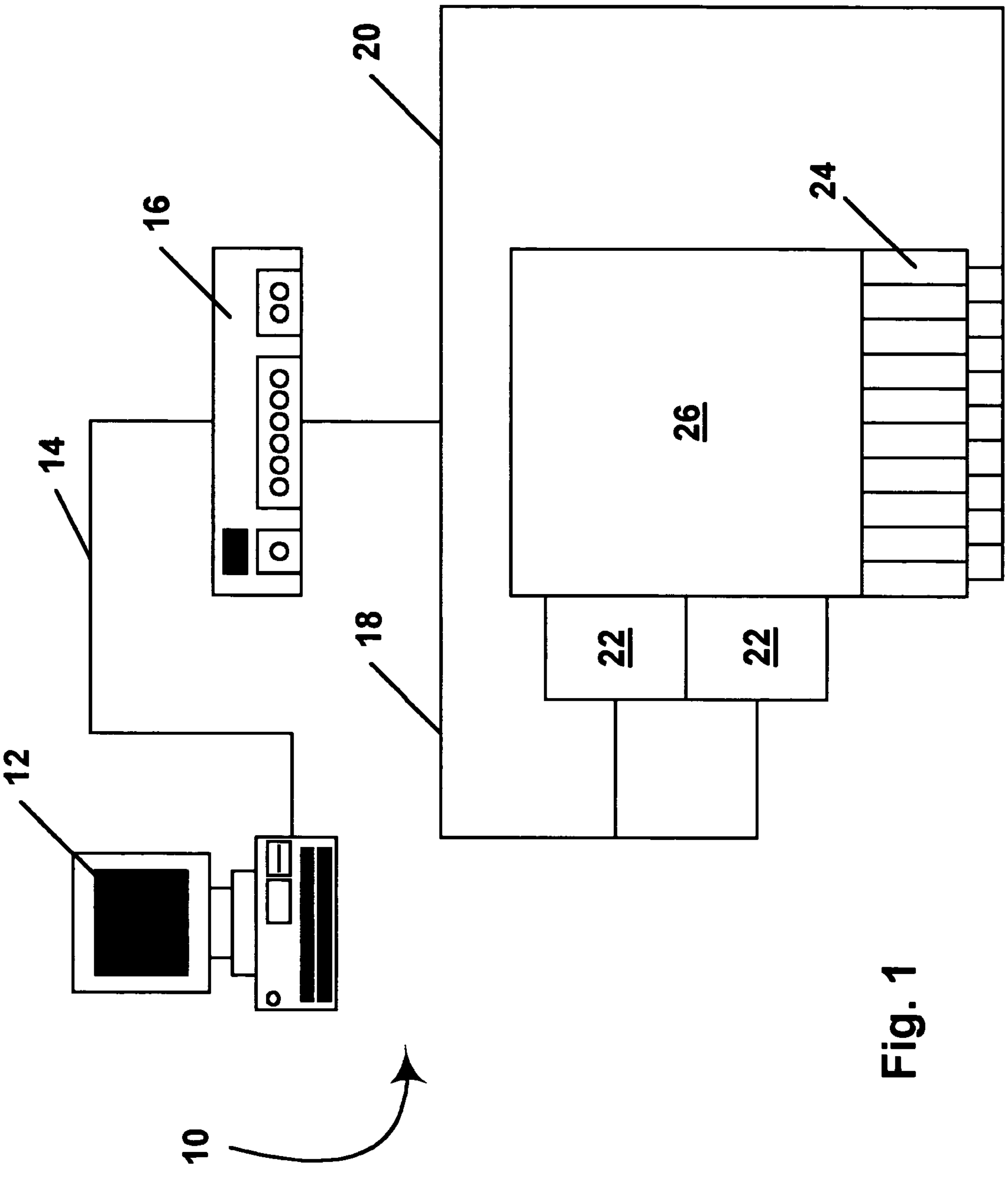
FIG. 1 is a schematic representation of an apparatus of the present invention, a display which is being driven by the apparatus, and associated apparatus, and is designed to show the overall architecture of the system.

From the foregoing, it will be apparent that the present invention provides numerous different improvements in methods for driving electro-optic displays, and in device controllers or other apparatus for carrying out such driving methods. In the description below, the various different improvements provided by the present invention will normally be described separately, although it will be understood by those skilled in the imaging art that in practice a single display may make may make use of more than one of these major aspects; for example, a display which uses the prior temporal/gray level state method of the present invention may also make use of the defined region method.

Basic Look-up Table Method: General Discussion

As already mentioned, the look-up table aspect, and other aspects, of the present invention provides methods and controllers for driving electro-optic displays having a plurality of pixels, each of which is capable of displaying at least three gray levels. The present invention may of course be applied to electro-optic displays having a greater number of gray levels, for example 4, 8, 16 or more.

Also as already mentioned, driving bistable electro-optic displays requires very different methods from those normally used to drive liquid crystal displays ("LCD's"). In a conventional (non-cholesteric) LCD, applying a specific voltage to a pixel for a sufficient period will cause the pixel to attain a specific gray level. Furthermore, the liquid material is only sensitive to the magnitude of the electric field, not its polarity. In contrast, bistable electro-optic displays act as impulse transducers, so there is no one-to-one mapping between applied voltage and gray state attained; the impulse (and thus the voltage) which must be applied to a pixel to achieve a given gray state varies with the "initial" gray state of the relevant pixel. Furthermore, since bistable electro-optic displays need to be driven in both directions (white to black, and black to white) it is necessary to specify both the polarity and the magnitude of the impulse needed.

At this point, it is considered desirable to define certain terms which are used herein in accordance with their conventional meaning in the display art. Most of the discussion below will concentrate upon one or more pixels of a display undergoing a single gray scale transition (i.e., a change from one gray level to another) from an "initial" state to a "final" state. Obviously, the initial state and the final state are so designated only with regard to the particular single transition being considered and in most cases the pixel with have undergone transitions prior to the "initial" state and will undergo further transitions after the "final" state. As explained below, some embodiments of the invention take account not only of the initial and final states of the pixel but also of "prior" states, in which the pixel existed prior to achieving the initial state. Where it is necessary to distinguish between multiple prior states, the term "first prior state" will be used to refer to the state in which the relevant pixel existed prior to the initial state, the term "second prior state" will be used to refer to the state in which the relevant pixel existed prior to the first prior state, and so on. The term "non-zero transition" is used to refer to a transition which effects a change of at least one unit in gray scale; the term "zero transition" may be used to refer to a "transition" which effects no change in gray scale of the selected pixel (although other pixels of the display may be undergoing non-zero transitions at the same time). As discussed in more detail below, prior states which may be taken into account in the methods of the present invention are of two type, "gray level" prior states (i.e., states determined a specific number of non-zero transitions prior to the transition being considered) and "temporal" prior states (i.e., states determined a specific time prior to the transition being considered).

As will readily be apparent to those skilled in image processing, a simple embodiment of the method of the present invention may takes account of only of the initial state of each pixel and the final state, and in such a case the look-up table will be two-dimensional. However, as already mentioned, some electro-optic media display a memory effect and with such media it is desirable, when generating the output signal, to take into account not only the initial state of each pixel but also at least one prior state of the same pixel, in which case the look-up table will be three-dimensional. In some cases, it may be desirable to take into account more than one prior state of each pixel (the plurality of prior states thus taken into account may be any combination of gray level and temporal prior states), thus resulting in a look-up table having four (if only two prior states are taken into account) or more dimensions.

From a formal mathematical point of view, the present invention may be regarded as comprising an algorithm that, given information about the initial, final and (optionally) prior states of an electro-optic pixel, as well as (optionally—see more detailed discussion below) information about the physical state of the display (e. g., temperature and total operating time), will produce a function V(t) which can be applied to the pixel to effect a transition to the desired final state. From this formal point of view, the controller of the present invention may be regarded as essentially a physical embodiment of this algorithm, the controller serving as an interface between a device wishing to display information and an electro-optic display.

Ignoring the physical state information for the moment, the algorithm is, in accordance with the present invention, encoded in the form of a look-up table or transition matrix. This matrix will have one dimension each for the desired final state, and for each of the other states (initial and any prior states) are used in the calculation. The elements of the matrix will contain a function V(t) that is to be applied to the electro-optic medium.

The elements of the look-up table or transition matrix may have a variety of forms. In some cases, each element may comprise a single number. For example, an electro-optic display may use a high precision voltage modulated driver circuit capable of outputting numerous different voltages both above and below a reference voltage, and simply apply the required voltage to a pixel for a standard, predetermined period. In such a case, each entry in the look-up table could simply have the form of a signed integer specifying which voltage is to be applied to a given pixel. In other cases, each element may comprise a series of numbers relating to different portions of a waveform. For example, there are described below embodiments of the invention which use single- or double-prepulse waveforms, and specifying such a waveform necessarily requires several numbers relating to different portions of the waveform. Also described below is an embodiment of the invention which in effect applies pulse length modulation by applying a predetermined voltage to a pixel during selected ones of a plurality of sub-scan periods (frames) during a complete scan (superframe). In such an embodiment, the elements of the transition matrix may have the form of a series of bits specifying whether or not the predetermined voltage is to be applied during each sub-scan period (frame) of the relevant transition. Finally, as discussed in more detail below, in some cases, such as a temperature-compensated display, it may be convenient for the elements of the look-up table to be in the form of functions (or, in practice, more accurately coefficients of various terms in such functions).

It will be apparent that the look-up tables used in some embodiments of the invention may become very large. To take an extreme example, consider a process of the invention for a 256 ($2^8$ ) gray level display using an algorithm that takes account of initial, final and two prior states. The necessary four-dimensional look-up table has $2^{32}$ entries. If each entry requires (say) 64 bits (8 bytes), the total size of the look-up table would be approximately 32 Gbyte. While storing this amount of data poses no problems on a desktop computer, it may present problems in a portable device. However, in practice the size of such large look-up tables can be substantially reduced. In many instances, it has been found that there are only a small number of types of waveforms needed for a large number of different transitions, with, for example, the length of individual pulses of a general waveform being varied between different transitions. Consequently, the length of individual entries in the look-up table can be reduced by making each entry comprises (a) a pointer to an entry in a second table specifying one of a small number of types of waveform to be used; and (b) a small number of parameters specifying how this general waveform should be varied for the relevant transition.

The values for the entries in the look-up table may be determined in advance through an empirical optimization process. Essentially, one sets a pixel to the relevant initial state, applies an impulse estimated to approximately equal that needed to achieve the desired final state and measures the final state of the pixel to determine the deviation, if any, between the actual and desired final state. The process is then repeated with a modified impulse until the deviation is less than a predetermined value, which may be determined by the capability of the instrument used to measure the final state. In the case of methods which take into account one or more prior states of the pixel, in addition to the initial state, it will generally be convenient to first determine the impulse needed for a particular transition when the state of the pixel is constant in the initial state and all preceding states used in determining the impulse, and then to "fine tune" this impulse to allow for differing previous states.

The look-up table method of the present invention desirably provides for modification of the impulse to allow for variation in temperature and/or total operating time of the display; compensation for operating time may be required because some electro-optic media "age" and their behavior changes after extended operation. Such modification may be done in one of two ways. Firstly, the look-up table may be expanded by an additional dimension for each variable that is to be taken into account in calculating the output signal. Obviously, when dealing with continuous variables such as temperature and operating time, it is necessary to quantize the continuous variable in order to maintain the look-up table at a practicable finite size. In order to find the waveform to be applied to the pixel, the calculation means may simply choose the look-up table entry for the table closest to the measured temperature. Alternatively, to provide more accurate temperature compensation, the calculation means may look up the two adjacent look-up table entries on either side of the measured continuous variable, and apply an appropriate interpolation algorithm to calculate the required entry at the measured intermediate value of the variable. For example, assume that the matrix includes entries for temperature in increments of 10° C. If the actual temperature of the display is 25° C., the calculation would look up the entries for 20° and 30° C., and use a value intermediate the two. Note that since the variation of characteristics of electro-optic media with temperature is often not linear, the set of temperatures for which the look-up table stores entries may not be distributed linearly; for example, the variation of many electro-optic media with temperature is most rapid at high temperatures, so that at low temperatures intervals of 20° C. between look-up tables might suffice, whereas at high temperatures intervals of 5° C. might be desirable.

An alternative method for temperature/operating time compensation is to use look-up table entries in the form of functions of the physical variable(s), or perhaps more accurately coefficients of standard terms in such functions. For simplicity consider the case of a display which uses a time modulation drive scheme in which each transition is handled by applying a constant voltage (of either polarity) to each pixel for a variable length of time, so that, absent any correction for environmental variables, each entry in the look-up table could consist only of a single signed number representing the duration of time for which the constant voltage is to be applied, and its polarity. If it is desired to correct such a display for variations in temperature such that the time $T_t$ for which the constant voltage needs to be applied for a specific transition at a temperature t is given by:

$$T_t = T_0 + A\Delta t + B(\Delta t)^2$$

where $T_0$ is the time required at some standard temperature, typically the mid-point of the intended operating temperature range of the display, and Δt is the difference between t and the temperature at which $T_0$ is measured; the entries in the look-up table can consist of the values of $T_0$, A and B for the specific transition to which a given entry relates, and the calculation means can use these coefficients to calculate $T_t$ at the measured temperature. To put it more generally, the calculation means finds the appropriate look-up table entry for the relevant initial and final states, then uses the function defined by that entry to calculate the proper output signal having regard to the other variables to be taken into account.

The relevant temperature to be used for temperature compensation calculations is that of the electro-optic material at the relevant pixel, and this temperature may differ significantly from ambient temperature, especially in the case of displays intended for outdoor use where, for example, sunlight acting through a protective front sheet may cause the temperature of the electro-optic layer to be substantially higher than ambient. Indeed, in the case of large billboard-type outdoor signs, the temperature may vary between different pixels of the same display if, for example, part of the display falls within the shadow of an adjacent building, while the remainder is in full sunlight. Accordingly, it may be desirable to embed one or more thermocouples or other temperature sensors within or adjacent to the electro-optic layer to determine the actual temperature of this layer. In the case of large displays, it may also be desirable to provide for interpolation between temperatures sensed by a plurality of temperature sensors to estimate the temperature of each particular pixel. Finally, in the case of large displays formed from a plurality of modules which can replaced individually, the method and controller of the invention may provide for different operating times for pixels in different modules.

As already indicated, the look-up table method and controller of the present invention may also allow for the residence time (i.e., the period since the pixel last underwent a non-zero transition) of the specific pixel being driven. It has been found that, at least in some cases, the impulse necessary for a given transition various with the residence time of a pixel in its optical state, this phenomenon, which does not appear to have previously been discussed in the literature, hereinafter being referred to as "dwell time dependence" or "DTD", although the term "dwell time sensitivity" was used in the aforementioned Application Ser. No. 60/320,070. Thus, it may be desirable or even in some cases in practice necessary to vary the impulse applied for a given transition as a function of the residence time of the pixel in its initial optical state. In one approach to allowing for DTD, the look-up table contains an additional dimension, which is indexed by a counter indicating the residence time of the pixel in its initial optical state. In addition, the controller may require an additional storage area that contains a counter for every pixel in the display, and a display clock, which increments by one the counter value stored in each pixel at a set interval. The length of this interval must be an integral multiple of the frame time of the display, and therefore must be no less than one frame time. (The frame time of the display may not be constant, but instead may vary from scan to scan, by adjusting either the line time or the delay period at the end of the frame. In this case, the relationship between the frame counter and the elapsed time may be calculated by summing the frame times for the individual frames comprising the update.) The size of this counter and the clock frequency will be determined by the length of time over which the applied impulse will be varied, and the necessary time resolution. For example, storing a 4-bit counter for each pixel would allow the impulse to vary at 0.25 second intervals over a 4-second period (4 seconds*4 counts/sec=16 counts=4 bits). The counter may optionally be reset upon the occurrence of certain events, such as the transition of the pixel to a new state. Upon reaching its maximum value, the counter may be configured to either "roll over" to a count of zero, or to maintain its maximum value until it is reset.

Prior Temporal/Gray Level State Method

The prior temporal/gray level state method of the present invention provides other ways of dealing with the DTD problem. As already explained, according to this method, the stored data include not only the initial state of the relevant pixel and one or more gray level prior states of the same pixel, but also one or more temporal prior states of the pixel, i.e., data representing the state of the relevant pixel at defined points in time prior to the transition being considered. The output signal from the method is determined dependent upon the gray level and temporal prior states, and the initial state of the pixel.

By allowing for both the gray state levels in which a given pixel existed prior to the initial state and the length of time for which the pixel remained in those gray levels, the prior temporal/gray level state method of the present invention reduces "image drift" (i.e., inaccuracy in gray levels). It is believed (although the invention is in no way limited by this belief) that such image drift is due to polarization within the electro-optic medium.

Table 2 below illustrates a relatively simple application of the prior temporal/gray level state method to a two-bit (four gray level) gray scale display in which the various gray levels of denoted 0 (black), 1 (dark gray), 2 (light gray) and 3 (white). (Obviously, the invention can be applied to applied to displays having large numbers of gray levels, for example a four-bit, 16 gray level, display having gray levels denoted from 0 (black) to 15 (white).) The middle line of Table 2 shows successive gray levels of a single pixel of the display; Table 2 assumes that the display is being updated continuously, so that the interval between adjacent columns of the display is one superframe (i.e., the interval necessary for a complete updating of the display). Obviously, if the present invention is applied to a display of a type (for example, a weather radar display) in which each updating if followed by a rest interval during which no rewriting of the display is effected, the interval between columns of Table 2 would be to be taken as one superframe plus the associated rest interval.

TABLE 2

| | | | | | | | | | |
|---|---|---|---|---|---|---|---|---|---|
| $S_{10}$ | $S_9$ | $S_8$ | $S_7$ | $S_6$ | $S_5$ | $S_4$ | $S_3$ | $S_2$ | $S_1$ |
| 2 | 0 | 0 | 0 | 3 | 3 | 1 | 1 | 1 | 2 |
| $R_5$ | $R_4$ | $R_4$ | $R_4$ | $R_3$ | $R_3$ | $R_2$ | $R_2$ | $R_2$ | $R_1$ |

The top line of Table 2 shows the various temporal states $S_x$ of the display, while the bottom of the table shows the corresponding gray level states $R_x$, the difference being that the temporal states change at intervals of one superframe, whereas the gray level states change only when there is a change in gray level (non-zero transition) of the relevant pixel. The right hand column of Table 2 represents the desired final state of the display after the transition being considered, while the penultimate column represents the initial state prior to this transition. Table 2 assumes a non-zero transition (i.e., that the final gray level is different from the initial gray level, since, at least in some cases, a zero transition in any one pixel of a bistable electro-optic display may be effected simply by not applying any voltage to the pixel during the relevant superframe.

Thus, $S_1=R_1$=the desired final state of the pixel;

$S_2=R_2$ =the initial state of the pixel;

$S_3$=the first temporal prior state of the pixel;

$S_4$=the second temporal prior state of the pixel;

and similarly for $S_5$ to $S_{10}$, while:

$R_3$=the first gray level prior state of the pixel;

$R_4$=the second gray level prior state of the pixel; and $R_5$=the third gray level prior state of the pixel.

The basic look-up table method of the present invention, as described in the aforementioned copending application Ser. No. 10/065,795, uses a look-up table indexed by (i.e., having dimensions corresponding to) $R_1$ and $R_2$, and optionally any one or more successive ones of $R_3$, $R_4$ and $R_5$. In contrast, the prior temporal/gray level state method of the present invention uses a look-up table indexed by at least $R_1$ ($=S_1$), $R_2$ ($=S_2$), $R_3$ and $S_3$. Optionally, the prior temporal/gray level state method may use a look-up table indexed by any one or more successive ones of $R_4$, $R_5$ etc., and any one or more successive ones of $S_4$, $S_5$ etc. It is not necessary that the prior temporal/gray level state method take account of an equal number of temporal and gray level prior states, nor is it necessary that the prior temporal/gray level state method take account of successive temporal prior states extending over the same time interval as the gray level prior states of which the method takes account. Indeed, since the variations in impulse due to changes in temporal prior states tend to be smaller than those due to changes in gray level prior states, it may, for example, in some cases be advantageous for the prior temporal/gray level state method to take account of (say) the first and second gray level prior states ($R_3$ and $R_4$ respectively) and only the first temporal prior state ($S_3$), even though clearly the second gray level prior state $R_4$ occurs at a time prior to the first temporal prior state $S_3$.

As compared with the basic look-up table method, the prior temporal/gray level state method allows better compensation for effects (such as polarization fields building up with the electro-optic medium) due to the electro-optic medium "dwelling" in particular gray states for extended periods. This better compensation can reduce the overall complexity of the display controller and/or reduce the magnitude of image artifacts such as prior state ghosting.

The prior temporal/gray level state method may make use of any of the optional features of the basic look-up table method described above. Thus, the elements of the look-up table or transition matrix may have a variety of forms. In some cases, each element may comprise a single number. In other cases, each element may comprise a series of numbers relating to different portions of a waveform. In still other cases, such as a temperature-compensated display, it may be convenient for the elements of the look-up table to be in the form of functions (or, in practice, more accurately coefficients of various terms in such functions). Similarly, to prevent the look-up tables used in some embodiments of the invention becoming too large, the length of individual entries in the look-up table may be reduced by making each entry (a) a pointer to an entry in a second table specifying one of a small number of types of waveform to be used; and (b) a small number of parameters specifying how this general waveform should be varied for the relevant transition. Furthermore, since the data comprising a look-up table can be treated as a general multi-dimensional data set, any standard functions, algorithms and encodings known to those skilled in the art of data storage and processing may be employed to reduce one or more of (a) the size of the storage required for the data set, (b) the computational effort required to extract the data, or (c) the time required to locate and extract a specific element from the set. These storage techniques include, for example, hash functions, loss-less and lossy compression, and representation of the data set as a combination of basis functions.

The values for the entries in the look-up table used in the prior temporal/gray level state method may be determined in advance through an empirical optimization process essentially similar to that described above for the basic look-up table method, although of course modified to allow for consideration of the one or more temporal prior states considered. To take into account the required number of temporal and gray level prior states of the pixel, it will generally be convenient to first determine the impulse needed for a particular transition when the state of the pixel is constant in the initial state and all prior states used in determining the impulse, and then to "fine tune" this impulse to allow for differing temporal and gray level prior states.

The prior temporal/gray level state method desirably provides for modification of the impulse to allow for variation in temperature and/or total operating time of the display, in exactly the same way as described above for the basic look-up table method. Prior state, temperature, operation time and other external variables may be used to modify the structure of the transitions comprising the waveform, for example by inserting 0 V periods within a transition, while leaving the net impulse unchanged.

Both the basic look-up table method and the prior temporal/gray level state method of the present invention may of course be modified to take account of any other physical parameter which has a detectable effect upon the impulse needed to effect any one or more specific transitions of an electro-optic medium. For example, the method could be modified to incorporate corrections for ambient humidity if the electro-optic medium is found to be sensitive to humidity.

For a bistable electro-optic medium, the look-up table may have the characteristic that, for any zero transition in which the initial and final states of the pixel are the same, the entry will be zero, or in other words, no voltage will be applied to the pixel. As a corollary, if no pixels on the display change during a given interval, then no impulses need be applied. This enables ultra-low power operation, as well as ensuring that the electro-optic medium is not overdriven while a static image is being displayed. In general, the look-up table may only retain information about non-null transitions. In other words, for two images, I and I+1, if a given pixel is in the same state in I and I+1, then state I+1 need not be stored in the prior state table, and no further information need be stored until that pixel undergoes a transition. However, as discussed below, at least in some cases it may still be advantageous to apply impulses to pixels undergoing zero transitions.

Basic Look-up Table Method: Apparatus

As will readily be apparent to those skilled in modern electronic technology, the controllers of the present invention can have a variety of physical forms and may use any conventional data processing components. For example, the present method could be practiced using a general purpose digital computer in conjunction with appropriate equipment (for example, one or more digital analog converters, "DAC's") to convert the digital outputs from the computer to appropriate voltages for application to pixels. Alternatively, the present method could be practiced using an application specific integrated circuit (ASIC). In particular, the controller of the present invention could have the form of a video card which could be inserted into a personal computer to enable the images generated by the computer to be displayed on an electro-optic screen instead of or in addition to an existing screen, such as a LCD. Since the construction of the controller of the present invention is well within the level of skill in the image processing art, it is unnecessary to describe its circuitry in detail herein.

A preferred physical embodiment of the controller of the present invention is a timing controller integrated circuit (IC). This IC accepts incoming image data and outputs control signals to a collection of data and select driver IC's, in order to produce the proper voltages at the pixels to produce the desired image. This IC may accept the image data through access to a memory buffer that contains the image data, or it may receive a signal intended to drive a traditional LCD panel, from which it can extract the image data. It may also receive any serial signal containing information that it requires to perform the necessary impulse calculations. Alternately, this timing controller can be implemented in software, or incorporated as a part of the CPU. The timing controller may also have the ability to measure any external parameters that influence the operation of the display, such as temperature.

The controller can operate as follows. The look-up table(s) are stored in memory accessible to the controller. For each pixel in turn, all of the necessary initial, final and (optionally) prior and physical state information is supplied as inputs. The state information is then used to compute an index into the look-up table. In the case of quantized temperature or other correction, the return value from a look-up using this index will be one voltage, or an array of voltages versus time. The controller will repeat this process for the two bracketing temperatures in the look-up table, then interpolate between the values. For the algorithmic temperature correction, the return value of the look-up will be one or more parameters, which can then be inserted into an equation along with the temperature, to determine the proper form of the drive impulse, as already described. This procedure can be accomplished similarly for any other system variables that require real-time modification of the drive impulse. One or more of these system variables may be determined by, for example, the value of a programmable resistor, or a memory location in an EPROM, which is set on the display panel at the time of construction in order to optimize the performance of the display.

An important feature of the display controller is that, unlike most displays, in most practical cases several complete scans of the display will be required in order to complete an image update. The series of scans required for one image update should be considered to be an uninterruptible unit. If the display controller and image source are operating asynchronously, then the controller must ensure that the data being used to calculate applied impulses remains constant across all scans. This can be accomplished in one of two ways. Firstly, the incoming image data could be stored in a separate buffer by the display controller (alternatively, if the display controller is accessing a display buffer through dual-ported memory, it could lock out access from the CPU). Secondly, on the first scan, the controller may store the calculated impulses in an impulse buffer. The second option has the advantage that the overhead for scanning the panel is only incurred once per transition, and the data for the remaining scans can be output directly from the buffer.

Optionally, imaging updating may be conducted in an asynchronous manner. Although it will, in general, take several scans to effect a complete transition between two images, individual pixels can begin transitions, or reverse transitions that have already started, in mid-superframe. In order to accomplish this, the controller must keep track of what portion of the total transition have been accomplished for a given pixel. If a request is received to change the optical state of a pixel that is not currently in transition, then the counter for that pixel can be set to zero, and the pixel will begin transitioning on the next frame. If the pixel is actively transitioning when a new request is received, then the controller will apply an algorithm to determine how to reach the new state from the current mid-transition state. This may be effected, for example, by adding an extra dimension to the look-up table to indicate how many frames into the update a given pixel is before the request to transition to a new state is given. In this way, transitions can be specified not just between final gray states, but also between intermediate points in any transition to a new final gray state.

In order to minimize the power necessary to operate a display, and to maximize the image stability of the electro-optic medium, the display controller may stop scanning the display and reduce the voltage applied to all pixels to, or close to, zero, when there are no pixels in the display that are undergoing transitions. Very advantageously, the display controller may turn off the power to its associated row and column drivers while the display is in such a "hold" state, thus minimizing power consumption. In this scheme, the drivers would be reactivated when the next pixel transition is requested.

FIG. 1 of the accompanying drawings shows schematically an apparatus of the invention in use, together with associated apparatus. The overall apparatus (generally designated 10) shown in FIG. 1 comprises an image source, shown as a personal computer 12 which outputs on a data line 14 data representing an image. The data line 14 can be of any conventional type and may be a single data line or a bus; for example, the data line 14 could comprise a universal serial bus (USB), serial, parallel, IEEE-1394 or other line. The data which are placed on the line 14 can be in the form of a conventional bit mapped image, for example a bit map (BMP), tagged image file format (TIF), graphics interchange format (GIF) or Joint Photographic Experts Group (JPEG) file. Alternatively, however, the data placed on the line 14 could be in the form of signals intended for driving a video device; for example, many computers provide a video output for driving an external monitor and signals on such outputs may be used in the present invention. It will be apparent to those skilled in imaging processing that the apparatus of the present invention described below may have to perform substantial file format conversion and/or decoding to make use of the disparate types of input signals which can be used, but such conversion and/or decoding is well within the level of skill in the art, and accordingly, the apparatus of the present invention will be described only from the point at which the image data used as its original inputs have been converted to a format in which they can be processed by the apparatus.

The data line 14 extends to a controller unit 16 of the present invention, as described in detail below. This controller unit 16 generates one set of output signals on a data bus 18 and a second set of signals on a separate data bus 20. The data bus 18 is connected to two row (or gate) drivers 22, while the data bus 20 is connected to a plurality of column (or source) drivers 24. (The number of column drivers 24 is greatly reduced in FIG. 1 for ease of illustration.) The row and column drivers control the operation of a bistable electro-optic display 26.

The apparatus shown in FIG. 1 is chosen to illustrate the various units used, and is most suitable for a developmental, "breadboard" unit. In actual commercial production, the controller 16 will typically be part of the same physical unit as the display 26, and the image source may also be part of this physical unit, as in conventional laptop computers equipped with LCD's, and in personal digital assistants. Also, the present invention is illustrated in FIG. 1 and will be mainly described below, in conjunction with an active matrix display architecture which has a single common, transparent electrode (not shown in FIG. 1) on one side of the electro-optic layer, this common electrode extending across all the pixels of the display. Typically, this common electrode lies between the electro-optic layer and the observer and forms a viewing surface through which an observer views the display. On the opposed side of the electro-optic layer is disposed a matrix of pixel electrodes arranged in rows and columns such that each pixel electrode is uniquely defined by the intersection of a single row and a single column. Thus, the electric field experienced by each pixel of the electro-optic layer is controlled by varying the voltage applied to the associated pixel electrode relative to the voltage (normally designated "Vcom") applied to the common front electrode. Each pixel electrode is associated with at least one transistor, typically a thin film transistor. The gates of the transistors in each row are connected via a single elongate row electrode to one of the row drivers 22. The source electrodes of the transistors in each column are connected via a single elongate column electrode to one of column drivers 24. The drain electrode of each transistor is connected directly to the pixel electrode. It will be appreciated that the assignment of the gates to rows and the source electrodes to columns is arbitrary, and could be reversed, as could the assignment of source and drain electrodes. However, the following description will assume the conventional assignments.

During operation, the row drivers 22 apply voltages to the gates such that the transistors in one and only one row are conductive at any given time. Simultaneously, the column drivers 24 apply predetermined voltages to each of the column electrodes. Thus, the voltages applied to the column drivers are applied to only one row of the pixel electrodes, thus writing (or at least partially writing) one line of the desired image on the electro-optic medium. The row driver then shifts to make the transistors in the next row conductive, a different set of voltages are applied to the column electrodes, and the next line of the image is written.

It is emphasized that the present invention is not confined to such active matrix displays. Once the correct waveforms for each pixel of the image have been determined in accordance with the present invention, any switching scheme may be used to apply the waveforms to the pixels. For example, the present invention can use a so-called "direct drive" scheme, in which each pixel is provided with a separate drive line. In principle, the present invention can also use a passive matrix drive scheme of the type used in some LCD's, but it should be noted that, since many bistable electro-optic media lack a threshold for switching (i.e., the media will change optical state if even a small electric field is applied for a prolonged period), such media are unsuitable for passive matrix driving. However, since it appears that the present invention will find its major application in active matrix displays, it will be described herein primarily with reference to such displays.

The controller unit 16 (FIG. 1) has two main functions. Firstly, using the method of the present invention, the controller calculates a two-dimensional matrix of impulses (or waveforms) which must be applied to the pixels of a display to change an initial image to a final image. Secondly, the controller 16 calculates, from this matrix of impulses, all the timing signals necessary to provide the desired impulses at the pixel electrodes using the conventional drivers designed for use with LCD's to drive a bistable electro-optic display.

Figure 2:
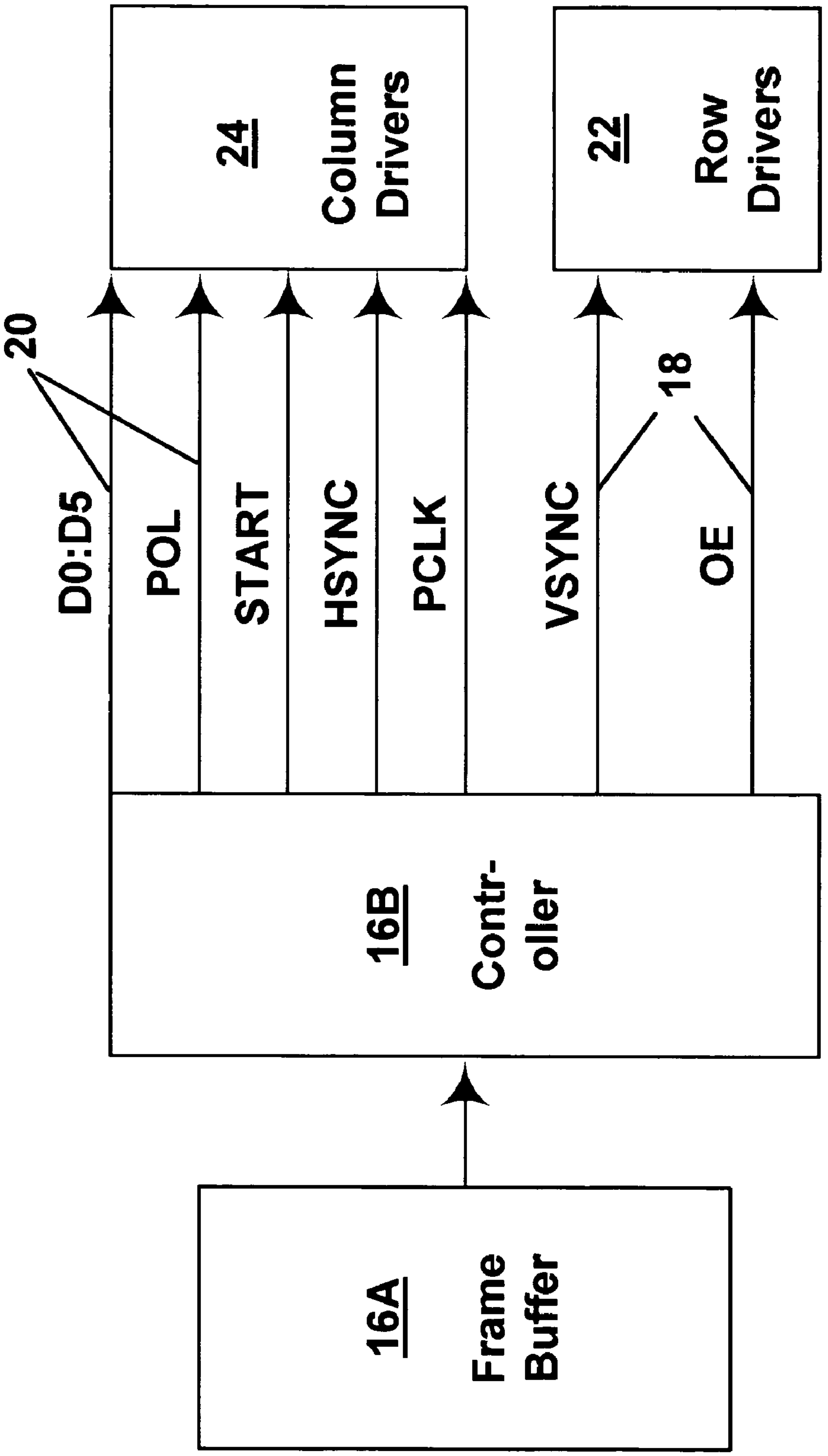
FIG. 2 is a schematic block diagram of the controller unit shown in FIG. 1 and illustrates the output signals generated by this unit.

As shown in FIG. 2, the controller unit 16 shown in FIG. 1 has two main sections, namely a frame buffer 16A, which buffers the data representing the final image which the controller 16B is to write to the display 26 (FIG. 1), and the controller proper, denoted 16B. The controller 16B reads data from the buffer 16A pixel by pixel and generates various signals on the data buses 18 and 20 as described below.

The signals shown in FIG. 2 are as follows:

D0:D5—a six-bit voltage value for a pixel (obviously, the number of bits in this signal may vary depending upon the specific row and column drivers used)

POL—pixel polarity with respect to Vcom (see below)

START—places a start bit into the column driver 24 to enable loading of pixel values HSYNC—horizontal synchronization signal, which latches the column driver PCLK—pixel clock, which shifts the start bit along the row driver VSYNC—vertical synchronization signal, which loads a start bit into the row driver OE—output enable signal, which latches the row driver.

Of these signals, VSYNC and OE supplied to the row drivers 22 are essentially the same as the corresponding signals supplied to the row drivers in a conventional active matrix LCD, since the manner of scanning the rows in the apparatus shown in FIG. 1 is in principle identical to the manner of scanning an LCD, although of course the exact timing of these signals may vary depending upon the precise electro-optic medium used. Similarly, the START, HSYNC and PCLK signals supplied to the column drivers are essentially the same as the corresponding signals supplied to the column drivers in a conventional active matrix LCD, although their exact timing may vary depending upon the precise electro-optic medium used. Hence, it is considered that no further description of these output signals in necessary.

Figure 3:
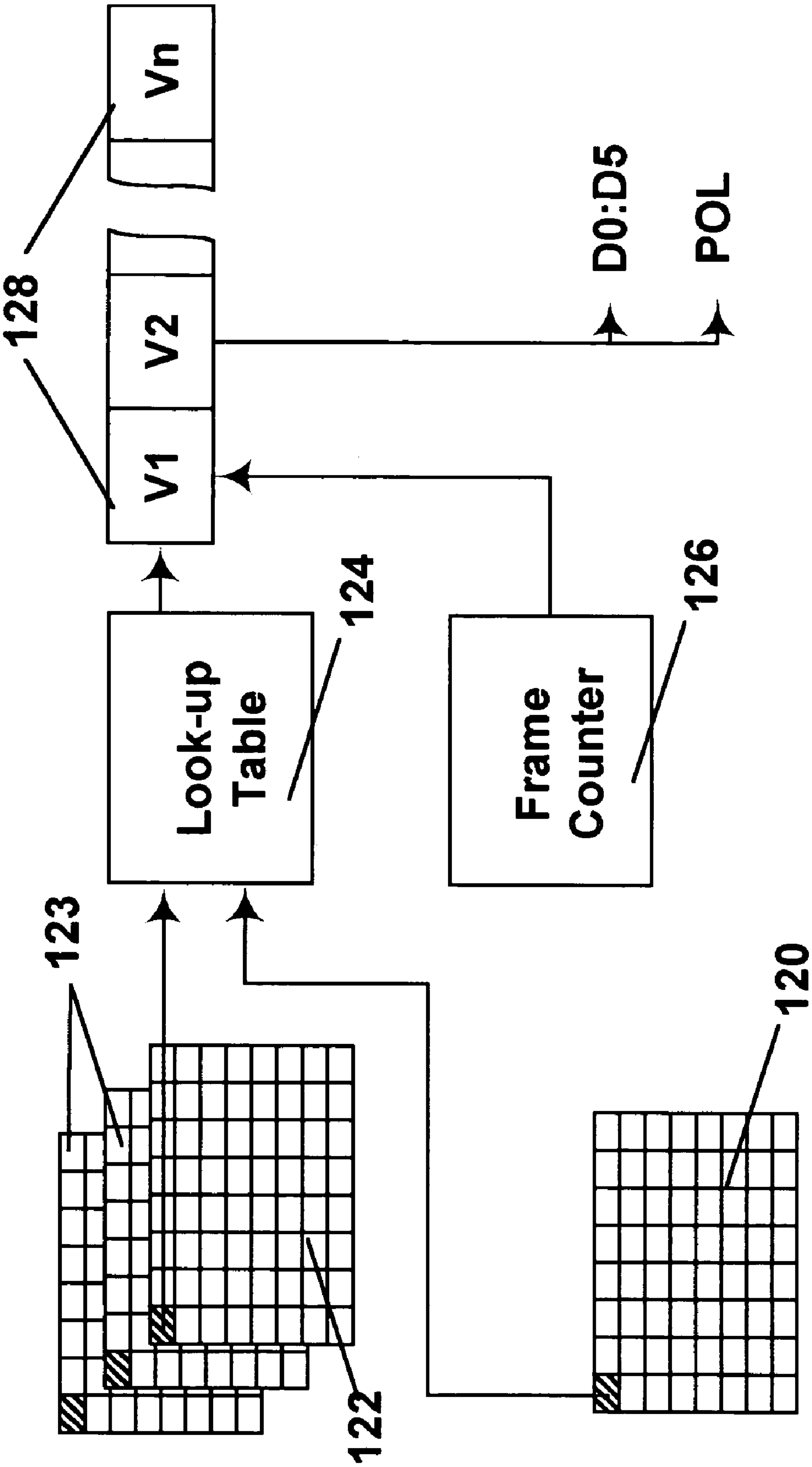
FIG. 3 is a schematic block diagram showing the manner in which the controller unit shown in FIGS. 1 and 2 generates certain output signals shown in FIG. 2.

FIG. 3 illustrates, in a highly schematic manner, the way in which the controller 16B shown in FIG. 2 generates the D0:D5 and POL signals. As described above, the controller 16B stores data representing the final image 120 (the image which it is desired to write to the display), the initial image 122 previously written to the display, and optionally one or more prior images 123 which were written to the display before the initial image. The embodiment of the invention shown in FIG. 3 stores two such prior images 123. (Obviously, the necessary data storage can be within the controller 16B or in an external data storage device.) The controller 16B uses the data for a specific pixel (illustrated as the first pixel in the first row, as shown by the shading in FIG. 3) in the initial, final and prior images 120. 122 and 123 as pointers into a look-up table 124, which provides the value of the impulse which must be applied to the specific pixel to change the state of that pixel to the desired gray level in the final image. The resultant output from the look-up table 124, and the output from a frame counter 126, are supplied to a voltage v. frame array 128, which generates the D0:D5 and POL signals.

The controller 16B is designed for use with a TFT LCD driver that is equipped with pixel inversion circuitry, which ordinarily alternates the polarity of neighboring pixels with respect to the top plane. Alternate pixels will be designated as even and odd, and are connected to opposing sides of the voltage ladder. Furthermore, a driver input, labeled "polarity", serves to switch the polarity of the even and odd pixels. The driver is provided with four or more gamma voltage levels, which can be set to determine the local slope of the voltage-level curve. A representative example of a commercial integrated circuit (IC) with these features is the Samsung KS0652 300/309 channel TFT-LCD source driver. As previously discussed, the display to be driven uses a common electrode on one side of the electro-optic medium, the voltage applied to this common electrode being referred to as the "top plane voltage" or "Vcom".

Figure 4:
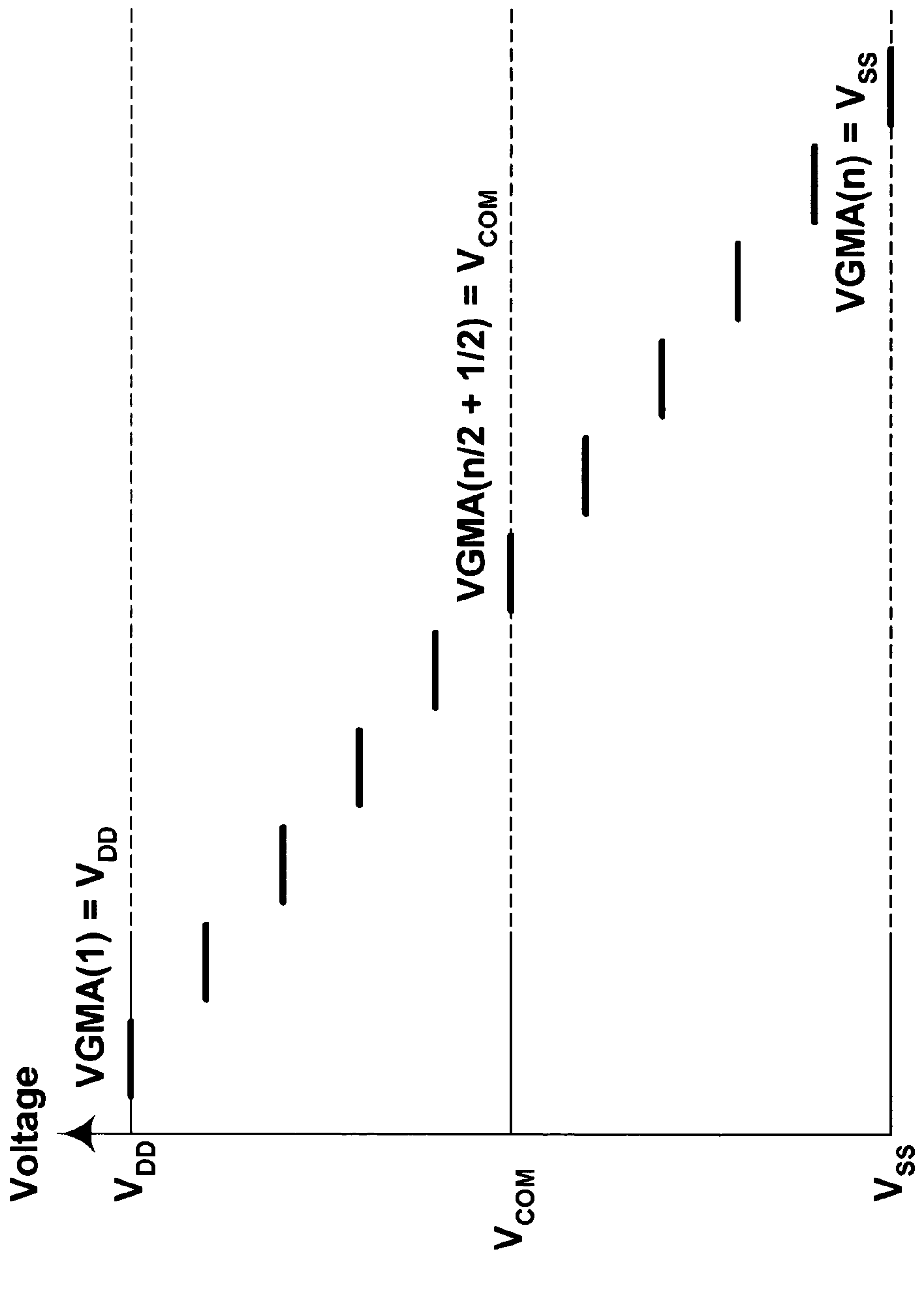
FIGS. 4 and 5 illustrate two different sets of reference voltages which can be used in the display shown in FIG. 1.
Figure 5:
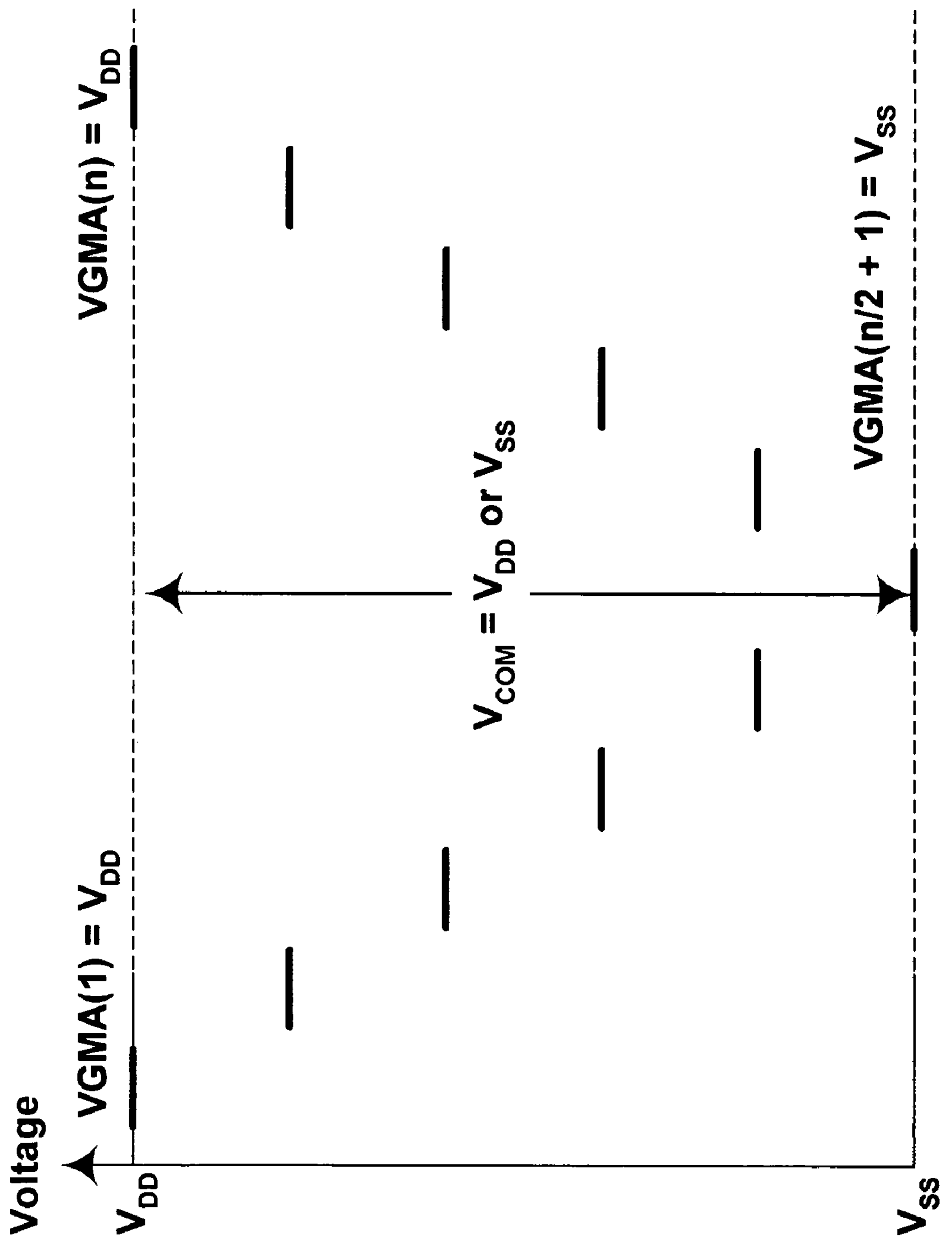

In one embodiment, illustrated in FIG. 4 of the accompanying drawings, the reference voltages of the driver are arranged so that the top plane voltage is placed at one half the maximum voltage (Vmax) which the driver can supply, i.e.

$$Vcom=Vmax/2$$

and the gamma voltages are arranged to vary linearly above and below the top plane voltage. (FIGS. 4 and 5 are drawn assuming an odd number of gamma voltages so that, for example, in FIG. 4 the gamma voltage VGMA(n/2+½) is equal to Vcom. If an even number of gamma voltages are present, both VGMA(n/2) and VGMA(n/2+1) are set equal to $V_{com}$. Similarly, in FIG. 5, if an even number of gamma voltages are present, both VGMA(n/2) and VGMA(n/2+1) are set equal to the ground voltage Vss.) The pulse length necessary to achieve all needed transitions is determined by dividing the largest impulse needed to create the new image by Vmax/2. This impulse can be converted into a number of frames by multiplying by the scan rate of the display. The necessary number of frames is then multiplied by two, to give an equal number of even and odd frames. These even and odd frames will correspond to whether the polarity bit is set high or low for the frame. For each pixel in each frame, the controller 16B must apply an algorithm which takes as its inputs (1) whether the pixel is even or odd; (2) whether the polarity bit is high or low for the frame being considered;

(3) whether the desired impulse is positive or negative; and (4) the magnitude of the desired impulse. The algorithm then determines whether the pixel can be addressed with the desired polarity during that frame. If so, the proper drive voltage (impulse/pulse length) is applied to the pixel. If not, then the pixel is brought to the top plane voltage (Vmax/2) to place it in a hold state, in which no electric field is applied to the pixel during that frame.

For example, consider two neighboring pixels in the display, an odd pixel 1 and an even pixel 2. Further, assume that when the polarity bit is high, the odd pixels will be able to access the positive drive voltage range (i.e. above the top plane voltage), and the even pixels will be able to access the negative voltages (i.e. below the top plane voltage ). If both pixels 1 and 2 need to be driven with a positive impulse, then the following sequence must occur:

(a) during the positive polarity frames, pixel 1 is driven with a positive voltage, and pixel 2 is held at the top plane voltage; and (b) during the negative polarity frames, pixel 1 is held at the top plane voltage, while pixel 2 is driven with a positive voltage.

Although typically frames with positive and negative polarity will be interleaved 1:1 (i.e., will alternate with each other), but this is not necessary; for example, all the odd frames could be grouped together, followed by all the even frames. This would result in alternate columns of the display being driven in two separate groups.

The major advantage of this embodiment is that the common front electrode does not have to be switched during operation. The primary disadvantage is that the maximum drive voltage available to the electro-optic medium is only half of the maximum voltage of the driver, and that each line may only be driven 50% of the time. Thus the refresh time of such a display is four times the switching time of the electro-optic medium under the same maximum drive voltage.

In a second embodiment of this form of the invention, the gamma voltages of the driver are arranged as shown in FIG. 5, and the common electrode switches between V=0 and V=Vmax. Arranging the gamma voltages in this way allows both even and odd pixels to be driven simultaneously in a single direction, but requires that the common electrode be switched to access the opposite drive polarity. In addition, because this arrangement is symmetric about the top plane voltage, a particular input to the drivers will result in the same voltage being applied on either an odd or an even pixel. In this case, the inputs to the algorithm are the magnitude and sign of the desired impulse, and the polarity of the top plane. If the current common electrode setting corresponds to the sign of the desired impulse, then this value is output. If the desired impulse is in the opposite direction, then the pixel is set to the top plane voltage so that no electric field is applied to the pixel during that frame.

As in the embodiment previously described, in this embodiment the necessary length of the drive pulse can be calculated by dividing the maximum impulse by the maximum drive voltage, and this value converted into frames by multiplying by the display refresh rate. Again, the number of frames must be doubled, to account for the fact that the display can only be driven in one direction with respect to the top plane at a time.

The major advantage of this second embodiment is that the full voltage of the driver can be used, and all of the outputs can be driven at once. However, two frames are required for driving in opposed directions. Thus, the refresh time of such a display is twice the switching time of the electro-optic medium under the same maximum drive voltage. The major drawback is the need to switch the common electrode, which may result in unwanted voltage artifacts in the electro-optic medium, the transistors associated with the pixel electrodes, or both.

In either embodiment, the gamma voltages are normally arranged on a linear ramp between the maximum voltages of the driver and the top plane voltage. Depending upon the design of the driver, it may be necessary to set one or more of the gamma voltages at the top plane value, in order to ensure that the driver can actually produce the top plane voltage on the output.

Reference has already been made above to the need to adapt the method of the present invention to the limitations of conventional drivers designed for use with LCD's. More specifically, conventional column drivers for LCD's, and particularly super twisted nematic (STN) LCD's (which can usually handle higher voltages than other types of column drivers), are only capable of applying one of two voltages to a drive line at any given time, since this is all that a polarity-insensitive LC material requires. In contrast, to drive polarity-sensitive electro-optic displays, a minimum of three driver voltage levels are necessary. The three driver voltages required are V−, which drives a pixel negative with respect to the top plane voltage, V+, which drives a pixel positive with respect to the top plane voltage, and 0 V with respect to the top plane voltage, which will hold the pixel in the same display state.

The methods of the present invention can, however, be practiced with this type of conventional LCD driver, provided that the controller is arranged to apply an appropriate sequence of voltages to the inputs of one or more column drivers, and their associated row drivers, in order to apply the necessary impulses to the pixels of an electro-optic display.

There are two principal variants of this approach. In the first variant, all the impulses applied must have one of three values: +I, −I or 0, where:

$$+I=-(-I)=V\mathrm{app}*t_{pulse}$$

where Vapp is the applied voltage above the top plane voltage, and $t_{pulse}$ is the pulse length in seconds. This variant only allows the display to operate in a binary (black/white) mode. In the second variant, the applied impulses may vary from +I to −I, but must be integral multiples of Vapp/freq, where freq is the refresh frequency of the display.

This aspect of the present invention takes advantage of the fact that, as already noted, conventional LCD drivers are designed to reverse polarity at frequent intervals to avoid certain undesirable effects which might otherwise be produced in the display. Consequently, such drivers are arranged to receive from the controller a polarity or control voltage, which can either be high or low. When a low control voltage is asserted, the output voltage on any given driver output line can adopt one of two out of the possible three voltages required, say V1 or V2, while when a high control voltage is asserted, the output voltage on any given line can adopt one of a different two of the possible three voltages required, say V2 or V3. Thus, while only two out of the three required voltages can be addressed at any specific time, all three voltages can be achieved at differing times. The three required voltages will usually satisfy the relationship:

$$V2=(V3+V1)/2$$

and V1 may be at or near the logic ground.

In this method of the invention, the display will be scanned $2*t_{pulse}*$freq times. For half these scans (i.e., for $t_{pulse}$*freq scans), the driver will be set to output either V1 or V2, which will normally be equal to −V and Vcom, respectively. Thus, during these scans, the pixels are either driven negative, or held in the same display state. For the other half of the scans, the driver will be switched to output either V2 or V3, which will normally be at Vcom and +V respectively. In these scans, the pixels are driven positive or held in the same display state. Table 3 below illustrates how these options can be combined to produce a drive in either direction or a hold state; the correlation of positive driving with approach to a dark state and negative driving with approach to a light state is of course a function of the specific electro-optic medium used.

TABLE 3

Drive sequence for achieving bi-directional drive plus hold with STN drivers

| | Driver outputs | |
|---|---|---|
| Desired Drive | V1–V2 | V2–V3 |
| positive (drive dark) | V2 | V3 |
| negative (drive white) | V1 | V2 |
| hold | V2 | V2 |

There are several different ways to arrange the two portions of the drive scheme (i.e., the two different types of scans or "frames"). For example, the two types of frames could alternate. If this is done at a high refresh rate, then the electro-optic medium will appear to be simultaneously lightening and darkening, when in fact it is being driven in opposed direction in alternate frames. Alternatively, all of the frames of one type could occur before any of the frames of the second type; this would result in a two-step drive appearance. Other arrangements are of course possible; for example two or more frames of one type followed by two or more of the opposed type. Additionally, if there are no pixels that need to be driven in one of the two directions, then the frames of that polarity can be dropped, reducing the drive time by 50%.

While this first variant can only produce binary images, the second variant can render images with multiple gray scale levels. This is accomplished by combining the drive scheme described above with modulation of the pulse widths for different pixels. In this case, the display is again scanned 2*$t_{pulse}$*freq times, but the driving voltage is only applied to any particular pixel during enough of these scans to ensure that the desired impulse for that particular pixel is achieved. For example, for each pixel, the total applied impulse could be recorded, and when the pixel reached its desired impulse, the pixel could be held at the top plane voltage for all subsequent scans. For pixels that need to be driven for less than the total scanning time, the driving portion of this time (i.e., the portion of the time during which an impulse is applied to change the display state of the pixel, as opposed to the holding portion during which the applied voltage simply maintains the display state of the pixel) may be distributed in a variety of ways within the total time. For example, all driving portions could be set to start at the beginning of the total time, or all driving portions could instead be timed to complete at the end of the total time. As in the first variant, if at any time in the second variant no further impulses of a particular polarity need to be applied to any pixel, then the scans applying pulses of that polarity can be eliminated. This may mean that the entire pulse is shortened, for example, if the maximum impulse to be applied in both the positive and negative directions is less than the maximum allowable impulse.

To take a highly simplified case for purposes of illustration, consider the application of the gray scale scheme described above to a display having four gray levels, namely black (level 0), dark gray (level 1), light gray (level 2) and white (level 3). One possible drive scheme for such a display is summarized in Table 4 below.

TABLE 4

| | Frame No. | | | | | |
|---|---|---|---|---|---|---|
| | 1 | 2 | 3 | 4 | 5 | 6 |
| | Parity | | | | | |
| Transition | Odd | Even | Odd | Even | Odd | Even |
| 0–3 | + | 0 | + | 0 | + | 0 |
| 0–2 | + | 0 | + | 0 | 0 | 0 |
| 0–1 | + | 0 | 0 | 0 | 0 | 0 |
| 0—0 | 0 | 0 | 0 | 0 | 0 | 0 |
| 3–0 | 0 | − | 0 | − | 0 | − |
| 2–0 | 0 | − | 0 | − | 0 | 0 |
| 1–0 | 0 | − | 0 | 0 | 0 | 0 |

For ease of illustration, this drive scheme is assumed to use only six frames although in practice a greater number would typically be employed. These frames are alternately odd and even. White-going transitions (i.e., transitions in which the gray level is increased) are driven only on the odd frames, while black-going transitions (i.e., transitions in which the gray level is decreased) are driven only on the even frames. On any frame when a pixel is not being driven, it is held at the same voltage as the common front electrode, as indicated by "0" in Table 4. For the 0–3 (black-white) transition, a white-going impulse is applied (i.e., the pixel electrode is held at a voltage relative to the common front electrode which tends to increase the gray level of the pixel) in each of the odd frames, Frames 1, 3 and 5. For a 0–2 (black to light gray) transition, on the other hand, a white-going impulse is applied only in Frames 1 and 3, and no impulse is applied in Frame 5; this is of course arbitrary, and, for example, a white-going impulse could be applied in Frames 1 and 5 and no impulse applied in Frame 3. For a 0–1 (black to dark gray) transition, a white-going impulse is applied only in Frame 1, and no impulse is applied in Frames 3 and 5; again, this is arbitrary, and, for example, a white-going impulse could be applied in Frame 3 and no impulse applied in Frames 1 and 5.

The black-going transitions are handled in a manner exactly similar to the corresponding white-going transitions except that the black-going impulses are applied only in the even frames of the drive scheme. It is believed that those skilled in driving electro-optic displays will readily be able to understand the manner in which the transitions not shown in Table 4 are handled from the foregoing description.

The sets of impulses described above can either be stand-alone transitions between two images (as in general image flow), or they may be part of a sequence of impulses designed to accomplish an image transition (as in a slide-show waveform, as discussed in more detail below).

Although emphasis has been laid above on methods of the present invention which permit the use of conventional drivers designed for use with LCD's, the present invention can make use of custom drivers, and a driver which is intended to enable accurate control of gray states in an electro-optic display, while achieving rapid writing of the display will now be described with reference to FIGS. 6 and 7.

As already discussed, to first order, many electro-optic media respond to a voltage impulse, which can be expressed as V times t (or more generally, by the integral of V with respect to t) where V is the voltage applied to a pixel and t is the time over which the voltage is applied. Thus, gray states can be obtained by modulating the length of the voltage pulse applied to the display, or by modulating the applied voltage, or by a combination of these two.

In the case of pulse width modulation in an active matrix display, the attainable pulse width resolution is simply the inverse of the refresh rate of the display. In other words, for a display with a 100 Hz refresh rate, the pulse length can be subdivided into 10 ms intervals. This is because each pixel in the display is only addressed once per scan, when the select line for the pixels in that row are activated. For the rest of the time, the voltage on the pixel may be maintained by a storage capacitor, as described in the aforementioned WO 01/07961. As the response speed of the electro-optic medium becomes faster, the slope of the reflectivity versus time curve becomes steeper and steeper. Thus, to maintain the same gray scale resolution, the refresh rate of the display must increase accordingly. Increasing the refresh rate results in higher power consumption, and eventually becomes impractical as the transistors and drivers are expected to charge the pixel and line capacitance in a shorter and shorter time.

On the other hand, in a voltage modulated display, the impulse resolution is simply determined by the number of voltage steps, and is independent of the speed of the electro-optic medium. The effective resolution can be increased by imposing a nonlinear spacing of the voltage steps, concentrating them where the voltage/reflectivity response of the electro-optic medium is steepest.

Figure 6:
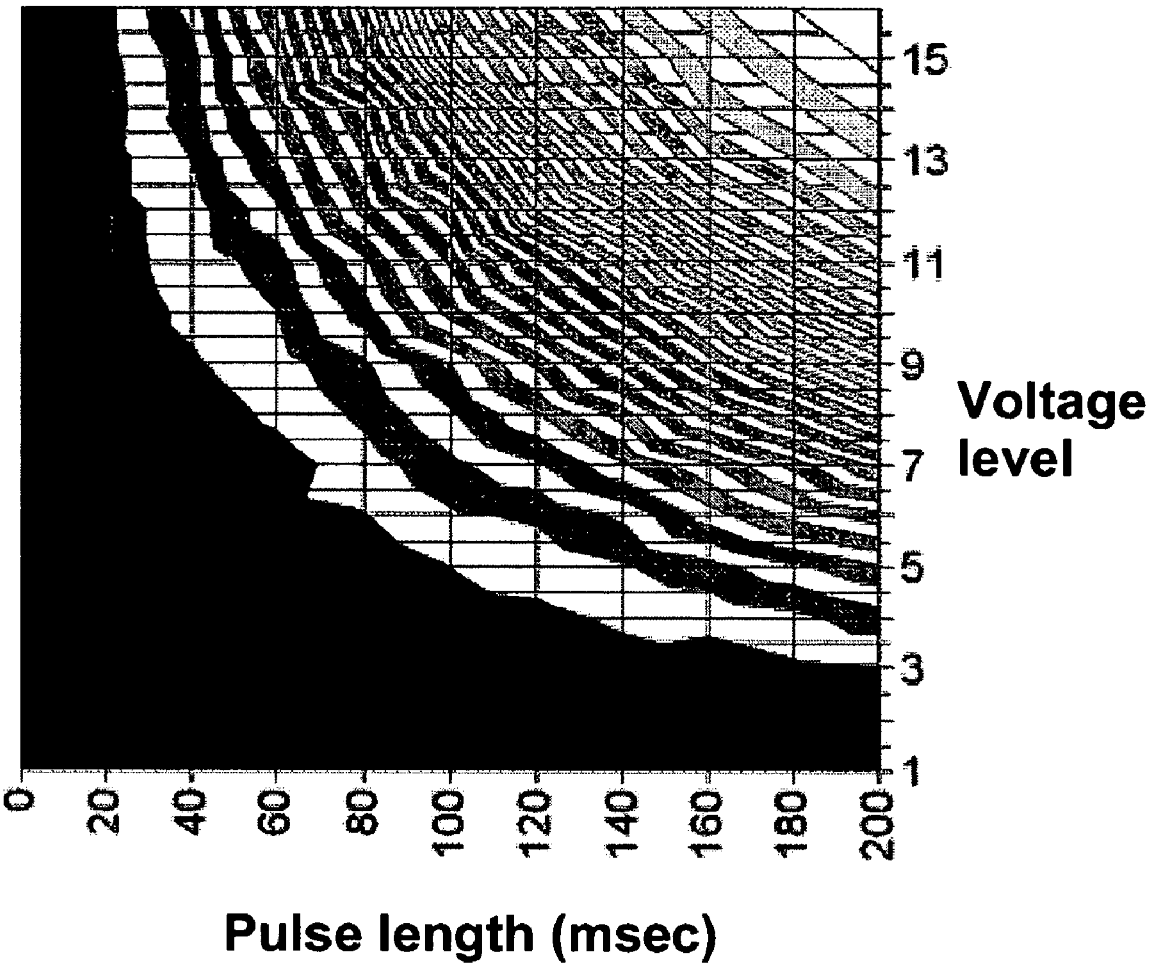
FIG. 6 is a schematic representation of tradeoffs between pulse width modulation and voltage modulation approaches in a look-up table method of the present invention.

FIG. 6 of the accompanying drawings is a schematic representation of the tradeoffs between the pulse width modulation (PWM) and voltage modulation (VM) approaches. The horizontal axis represents pulse length, while the vertical axis represents voltage. The reflectivity of the particle-based electrophoretic display as a function of these two parameters is represented as a contour plot, with the bands and spaces representing differences of 1 L* in the reflected luminance of the display. (It has been found empirically that a difference in luminance of 1 L* is just noticeable to an average subject in dual stimulus experiments.) The particular particle-based electrophoretic medium used in the experiments summarized in FIG. 6 had a response time of 200 ms at the maximum voltage (16 V) shown in the Figure.

The effects of pulse width modulation alone can be determined by traversing the plot horizontally along the top, while the effects of voltage modulation alone are seen by examining the right vertical edge. From this plot, it is clear that, if a display using this particular medium were driven at a refresh rate of 100 Hz in a pulse width modulation (PWM) mode, it would not be possible to obtain a reflectivity within ±1 L* in the middle gray region, where the contours are steepest. In voltage modulation (VM) mode, achieving a reflectivity within ±1 L* would require 128 equally spaced voltage levels, while running at a frame rate as low as 5 Hz (assuming, of course, that the voltage holding capability of the pixel, provided by a capacitor, is high enough). In addition, these two approaches can be combined to achieve the same accuracy with fewer voltage levels. To further reduce the required number of voltage levels, they could be concentrated in the steep middle portion of the curves shown in FIG. 6 but made sparse in the outer regions. This could be accomplished with a small number of input gamma voltages. To further reduce the required number of voltage levels, they could be concentrated at advantageous values. For example, very small voltages are not useful for achieving transitions if application of such a small voltage over the allotted address time is not sufficient to make any of the desired gray state transitions. Choosing a distribution of voltages that excludes such small voltages allows the allowed voltages to be more advantageously placed.

Since bistable electro-optic displays are sensitive to the polarity of the applied electric field, as noted above, it is not desirable to reverse the polarity of the drive voltage on successive frames (images), as is usually done with LCD's, and frame, pixel and line inversion are unnecessary, and indeed counterproductive. For example, LCD drivers with pixel inversion deliver voltages of alternating polarity in alternate frames. Thus, it is only possible to deliver an impulse of the proper polarity in one half of the frames. This is not a problem in an LCD, where the liquid crystal material in not sensitive to polarity, but in a bistable electro-optic display it doubles the time required to address the electro-optic medium.

Similarly, because bistable electro-optic displays are impulse transducers and not voltage transducers, the displays integrate voltage errors over time, which can result in large deviations of the pixels of the display from their desired optical states. This makes it important to use drivers with high voltage accuracy, and a tolerance of ±3 mV or less is recommended.

To enable a driver to address a monochrome XGA (1024×768) display panel at a 75 Hz refresh rate, a maximum pixel clock rate of 60 MHz is required; achieving this clock rate is within the state of the art.

As already mentioned, one of the primary virtues of particle-based electrophoretic and other similar bistable electro-optic displays is their image stability, and the consequent opportunity to run the display at very low power consumption. To take maximum advantage of this opportunity, power to the driver should be disabled when the image is not changing. Accordingly, the driver should be designed to power down in a controlled manner, without creating any spurious voltages on the output lines. Because entering and leaving such a "sleep" mode will be a common occurrence, the power-down and power-up sequences should be as rapid as possible, and should have minimal effects on the lifetime of the driver.

In addition, there should be an input pin that brings all of the driver output pins to Vcom, which will hold all of the pixels at their current optical state without powering down the driver.

The drivers of the present invention are useful, inter alia, for driving medium to high resolution, high information content portable displays, for example a 7 inch (178 mm) diagonal XGA monochrome display. To minimize the number of integrated circuits required in such high resolution panels, it is desirable to use drivers with a high number (for example, 324) of outputs per package. It is also desirable that the driver have an option to run in one or more other modes with fewer of its outputs enabled. The preferred method for attaching the integrated circuits to the display panel is tape carrier package (TCP), so it is desirable to arrange the sizing and spacing of the driver outputs to facilitate use of this method.

The present drivers will typically be used to drive small to medium size active matrix panels at around 10–30 V.

Accordingly, the drivers should be capable of driving capacitative loads of approximately 100 pF.

Figure 7:
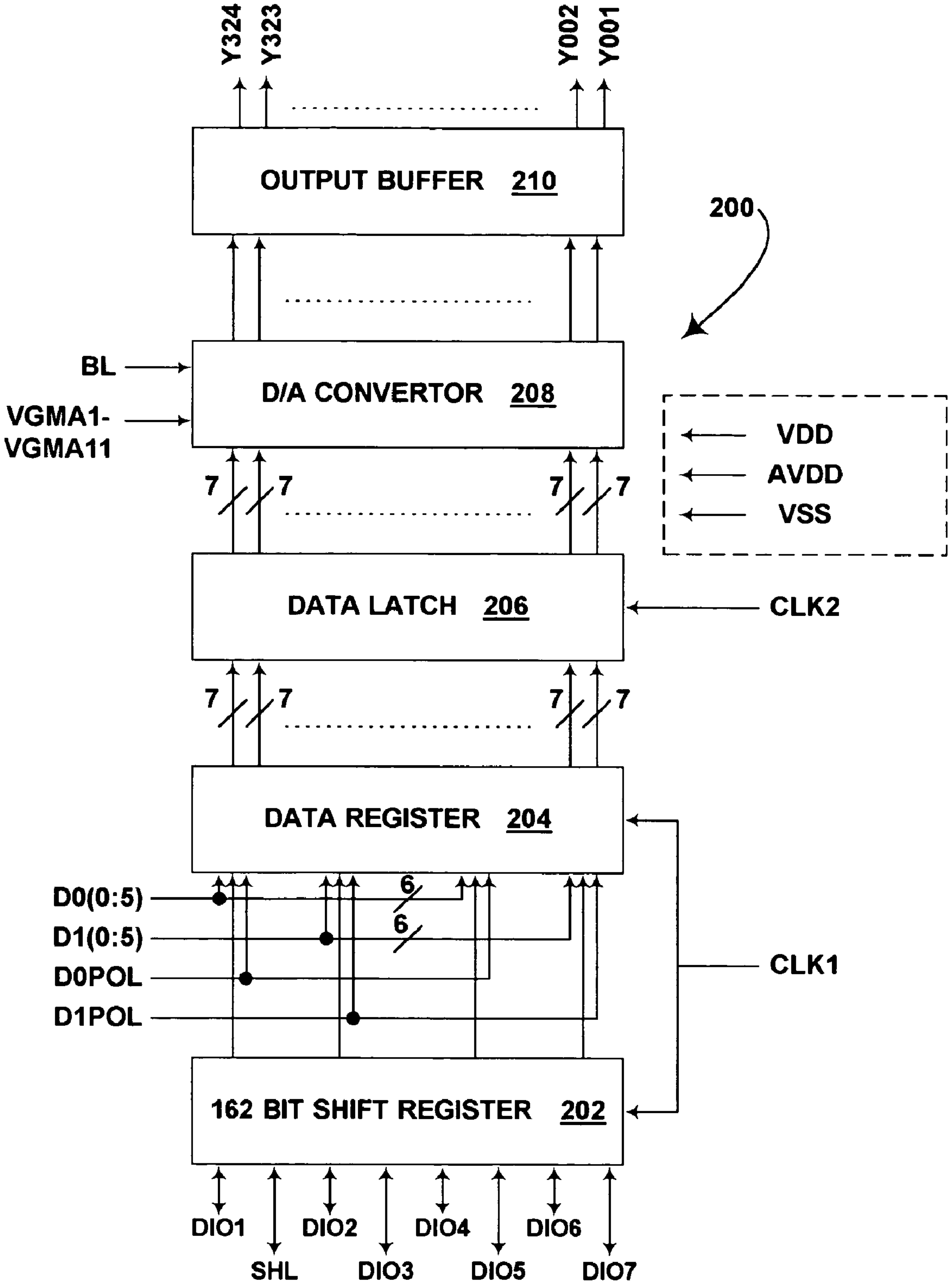
FIG. 7 is a block diagram of a custom driver useful in a look-up table method of the present invention.

A block diagram of a preferred driver (generally designated 200) of the invention is given in FIG. 7 of the accompanying drawings. This driver 200 comprises a shift register 202, a data register 204, a data latch 206, a digital to analogue converter (DAC) 208 and an output buffer 210. This driver differs from those typically used to drive LCD's in that it provides for a polarity bit associated with each pixel of the display, and for generating an output above or below the top plane voltage controlled by the relevant polarity bit.

The signal descriptions for this preferred driver are given in the following Table 5:

TABLE 5

| Symbol | Pin Name | Description |
|---|---|---|
| VDD | Logic power supply | 2.7–3.6 V |
| AVDD | Driver power supply | 10–30 V |
| VSS | Ground | 0 V |
| Y1–Y324 | Driver outputs, fed to the column electrodes of the display | D/A converted 64 level analog outputs |
| D0(0:5) | Display data input, odd dots | 6 bit gray scale data for odd dots, D0:0 = least significant bit (LSB) |
| D1(0:5) | Display data input, even dots | 6 bit gray scale data for even dots, D1:0 = LSB |
| D0POL | Odd dot polarity control input | Determines which set of gamma voltages current odd dot will reference. D0POL = 1: odd dot will reference VGAM6–11 D0POL = 0: odd dot will reference VGAM1–6 |
| D1POL | Even dot polarity control input | Determines which set of gamma voltages current even dot will reference. D1POL = 1: odd dot will reference VGAM6–11 D1POL = 0: odd dot will reference VGAM1–6 |
| SHL | Shift direction control input | Controls shift direction in 162 bit shift register SHL = H: DIO1 input, Y1 -> Y324 SHL = L: DIO1 output, Y324 -> Y1 |
| DIO1 | Start pulse input/output | SHL = H: Used as the start pulse input pin SHL = L: Used as the start pulse output pin |
| DIO2 | Start pulse input/output for 256 lines | SHL = H: Used as the start pulse output pin for 256 lines active SHL = L: Used as the start pulse input pin for 256 lines, tie low if not used |
| DIO3 | Start pulse input/output for 260 lines | SHL = H: Used as the start pulse output pin for 260 lines active SHL = L: Used as the start pulse input pin for 260 lines, tie low if not used |
| DIO4 | Start pulse input/output for 300 lines | SHL = H: Used as the start pulse output pin for 300 lines active SHL = L: Used as the start pulse input pin for 300 lines, tie low if not used |
| DIO5 | Start pulse input/output for 304 lines | SHL = H: Used as the start pulse output pin for 304 lines active SHL = L: Used as the start pulse input pin for 304 lines, tie low if not used |
| DIO6 | Start pulse input/output for 320 lines | SHL = H: Used as the start pulse output pin for 320 lines active SHL = L: Used as the start pulse input pin for 320 lines, tie low if not used |
| DIO7 | Start pulse input/output for 324 lines | SHL = H: Used as the start pulse output pin for 324 lines active SHL = L: Used as the start pulse input pin for 324 lines, tie low if not used |
| CLK1 | Shift clock input | Two 6 bit gray values and two polarity control values for two display dots are loaded at every rising edge |
| CLK2 | Latch input | Latches the contents of the data register on a rising edge and transfers latched values to the D/A converter block. |
| BL | Blanking input (this does not actually blank the bistable display, but simply stops the driver writing to the display, thus allowing the image already written to remain) | Sets all outputs to VGAM6 level BL = H: All outputs set to VGAM6 BL = L: All outputs reflect D/A values |
| VGAM1–6 | Lower gamma reference voltages | Determine grayscale voltage outputs through resistive DAC system |
| VGAM6–11 | Upper gamma reference voltages | Determine grayscale voltage outputs through resistive DAC system |

The driver 200 operates in the following manner. First, a start pulse is provided by setting (say) DIO1 high to reset the shift register 202 to a starting location. (As will readily be apparent to those skilled in display driver technology, the various DIOx inputs to the shift register are provided to enable the driver to be used with displays having varying numbers of columns, and only one of these inputs is used with any given display, the others being tied permanently low.) The shift register now operates in the conventional manner used in LCD's; at each pulse of CLK1, one and only one of the 162 outputs of the shift register 202 goes high, the others being held low, and the high output being shifted one place at each pulse of CLK1. As schematically indicated in FIG. 7, each of the 162 outputs of the shift register 202 is connected to two inputs of data register 204, one odd input and one even input.

The display controller (cf. FIG. 2) provides two six-bit impulse values D0(0:5) and D1(0:5) and two single-bit polarity signals D0POL and D1POL on the inputs of the data register 204. At the rising edge of each clock pulse CLK1, two seven-bit numbers (D0POL+D0(0:5) and D1POL+D1(0:5)) are written into registers in data register 204 associated with the selected (high) output of shift register 202. Thus, after 162 clock pulses CLK1, 324 seven-bit numbers (corresponding to the impulse values for one complete line of the display for one frame) have been written into the 324 registers present in data register 204.

At the rising edge of each clock pulse CLK2, these 324 seven-bit numbers are transferred from the data register 204 to the data latch 206. The numbers thus placed in the data latch 206 are read by the DAC 208 and, in conventional fashion, corresponding analogue values are placed on the outputs of the DAC 208 and fed, via the buffer 210 to the column electrodes of the display, where they are applied to pixel electrodes of one row selected in conventional fashion by a row driver (not shown). It should be noted, however, that the polarity of each column electrode with respect to Vcom is controlled by the polarity bit D0POL or D1POL written into the data latch 206 and thus these polarities do not alternate between adjacent column electrodes in the conventional manner used in LCD's.

Figure 8:
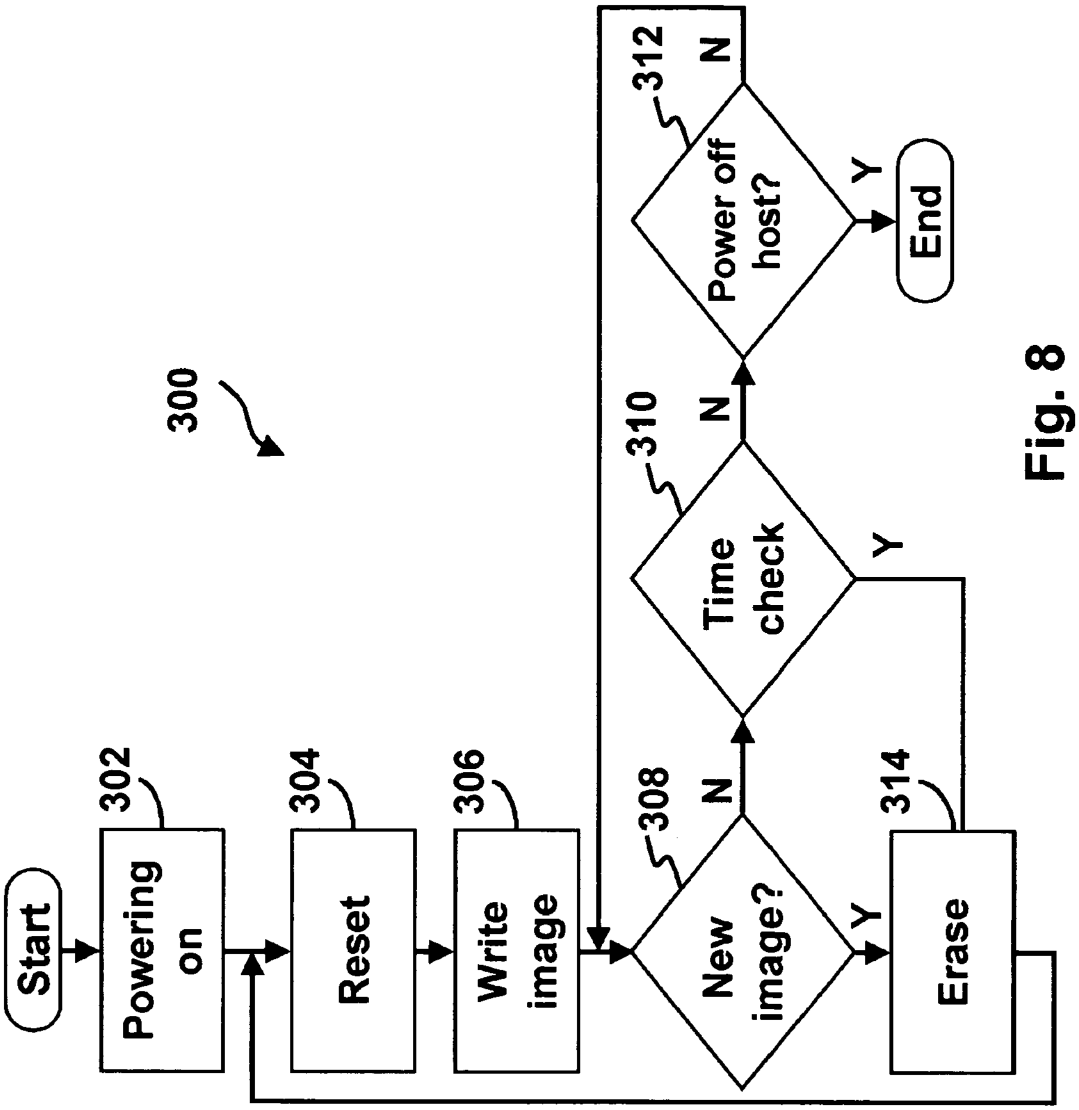
FIG. 8 is a flow chart illustrating a program which may be run by the controller unit shown in FIGS. 1 and 2.

FIG. 8 is a flow chart illustrating a program which may be run by the controller unit shown in FIGS. 1 and 2. This program (generally designated 300) is intended for use with a look-up table method of the invention (described in more detail below) in which all pixels of a display are erased and then re-addressed each time an image is written or refreshed.

The program begins with a "powering on" step 302 in which the controller is initialized, typically as a result of user input, for example a user pushing the power button of a personal digital assistant (PDA). The step 302 could also be triggered by, for example, the opening of the case of a PDA (this opening being detected either by a mechanical sensor or by a photodetector), by the removal of a stylus from its rest in a PDA, by detection of motion when a user lifts a PDA, or by a proximity detector which detects when a user's hand approaches a PDA.

The next step 304 is a "reset" step in which all the pixels of the display are driven alternately to their black and white states. It has been found that, in at least some electro-optic media, such "flashing" of the pixels is necessary to ensure accurate gray states during the subsequent writing of an image on the display. It has also been found that typically at least 5 flashes (counting each successive black and white state as one flash) are required, and in some cases more. The greater the number of flashes, the more time and energy that this step consumes, and thus the longer the time that must elapse before the user can see a desired image upon the display. Accordingly, it is desirable that the number of flashes be kept as small as possible consistent with accurate rendering of gray states in the image subsequently written. At the conclusion the reset step 304, all the pixels of the display are in the same black or white state.

The next step 306 is a writing or "sending out image" step in which the controller 16 sends out signals to the row and column drivers 22 and 24 respectively (FIGS. 1 and 2) in the manner already described, thus writing a desired image on the display. Since the display is bistable, once the image has been written, it does not need to be rewritten immediately, and thus after writing the image, the controller can cause the row and column drivers to cease writing to the display, typically by setting a blanking signal (such as setting signal BL in FIG. 7 high).

The controller now enters a decision loop formed by steps 308, 310 and 312. In step 308, the controller 16 checks whether the computer 12 (FIG. 1) requires display of a new image. If so, the controller proceeds, in an erase step 314 to erase the image written to the display at step 306, thus essentially returning the display to the state reached at the end of reset step 304. From erase step 314, the controller returns to step 304, resets as previously described, and proceeds to write the new image.

If at step 308 no new image needs to be written to the display, the controller proceeds to a step 310, at which it determines when the image has remained on the display for more than a predetermined period. As is well known to those skilled in display technology, images written on bistable media do not persist indefinitely, and the images gradually fade (i.e., lose contrast). Furthermore, in some types of electro-optic medium, especially electrophoretic media, there is often a trade-off between writing speed of the medium and bistability, in that media which are bistable for hours or days have substantially longer writing times than media which are only bistable for seconds or minutes. Accordingly, although it is not necessary to rewrite the electro-optic medium continuously, as in the case of LCD's, to provide an image with good contrast, it may be desirable to refresh the image at intervals of (say) a few minutes. Thus, at step 310 the controller determines whether the time which has elapsed since the image was written at step 306 exceeds some predetermined refresh interval, and if so the controller proceeds to erase step 314 and then to reset step 304, resets the display as previously described, and proceeds to rewrite the same image to the display.

(The program shown in FIG. 8 may be modified to make use of both local and global rewriting, as discussed in more detail below. If so, step 310 may be modified to decide whether local or global rewriting is required. If, in this modified program, at step 310 the program determines that the predetermined time has not expired, no action is taken. If, however, the predetermined time has expired, step 310 does not immediately invoke erasure and rewriting of the image; instead step 310 simply sets a flag (in the normal computer's sense of that term) indicating that the next image update should be effected globally rather than locally. The next time the program reaches step 306, the flag is checked; if the flag is set, the image is rewritten globally and then the flag is cleared, but if the flag is not set, only local rewriting of the image is effected.)

If at step 310 it is determined that the refresh interval has not been exceeded, the controller proceeds to a step 312, where it determines whether it is time to shut down the display and/or the image source. In order to conserve energy in a portable apparatus, the controller will not allow a single image to be refreshed indefinitely, and terminates the program shown in FIG. 8 after a prolonged period of inactivity. Accordingly, at step 310 the controller determines whether a predetermined "shut-down" period (greater than the refresh interval mentioned above) has elapsed since a new image (rather than a refresh of a previous image) was written to the display, and if so the program terminates, as indicated at 314. Step 314 may include powering down the image source. Naturally, the user still has access to a slowly-fading image on the display after such program termination. If the shut-down period has not been exceeded, the controller proceeds from step 312 back to step 308.

Basic Look-up Table Method: Waveforms

Various possible waveforms for carrying out the look-up table method of the present invention will now be described, though by way of example only. However, first some general considerations regarding waveforms to be used in the present invention will be discussed.

Waveforms for bistable displays that exhibit the aforementioned memory effect can be grouped into two major classes, namely compensated and uncompensated. In a compensated waveform, all of the pulses are precisely adjusted to account for any memory effect in the pixel. For example, a pixel undergoing a series of transitions through gray scale levels 1-3-4-2 might receive a slightly different impulse for the 4-2 transition than a pixel that undergoes a transition series 1-2-4-2. Such impulse compensation could occur by adjusting the pulse length, the voltage, or by otherwise changing the V(t) profile of the pulses. In an uncompensated waveform, no attempt is made to account for any prior state information (other than the initial state). In an uncompensated waveform, all pixels undergoing the 4-2 transition would receive precisely the same pulse. For an uncompensated waveform to work successfully, one of two criteria must be met. Either the electro-optic material must not exhibit a memory effect in its switching behavior, or each transition must effectively eliminate any memory effect on the pixel.

In general, uncompensated waveforms are best suited for use with systems capable of only coarse impulse resolution. Examples would be a display with tri-level drivers, or a display capable of only 2–3 bits of voltage modulation. A compensated waveform requires fine impulse adjustments, which are not possible with these systems. Obviously, while a coarse-impulse system is preferably restricted to uncompensated waveforms, a system with fine impulse adjustment can implement either type of waveform.

The simplest uncompensated waveform is 1-bit general image flow (1-bit GIF). In 1-bit GIF, the display transitions smoothly from one pure black-and-white image to the next. The transition rule for this sequence can be stated simply: If a pixel is switching from white to black, then apply an impulse I. If it is switching from black to white, apply the impulse of the opposite polarity, −I. If a pixel remains in the same state, then no impulse is applied to that pixel. As previously stated, the mapping of the impulse polarity to the voltage polarity of the system will depend upon the response function of the material.

Another uncompensated waveform that is capable of producing grayscale images is the uncompensated n-prepulse slide show (n-PP SS). The uncompensated slide show waveform has three basic sections. First, the pixels are erased to a uniform optical state, typically either white or black. Next, the pixels are driven back and forth between two optical states, again typically white and black. Finally, the pixel is addressed to a new optical state, which may be one of several gray states. The final (or writing) pulse is referred to as the addressing pulse, and the other pulses (the first (or erasing) pulse and the intervening (or blanking) pulses) are collectively referred to as prepulses. A waveform of this type will be described below with reference to FIGS. 9 and 10.

Prepulse slide show waveforms can be divided into two basic forms, those with an odd number of prepulses, and those with an even number of prepulses. For the odd-prepulse case, the erasing pulse may be equal in impulse and opposite in polarity to the immediately previous writing pulse (again, see FIG. 9 and discussion thereof below). In other words, if the pixel is written to gray from black, the erasing pulse will take the pixel back to the black state. In the even-prepulse case, the erasing pulse should be of the same polarity as the previous writing pulse, and the sum of the impulses of the previous writing pulse and the erasing pulse should be equal to the impulse necessary to fully transition from black to white. In other words, if a pixel is written from black in the even-prepulse case, then it must be erased to white.

After the erasing pulse, the waveform includes either zero or an even number of blanking pulses. These blanking pulses are typically pulses of equal impulse and opposite polarity, arranged so that the first pulse is of opposite polarity to the erasing pulse. These pulses will generally be equal in impulse to a full black-white pulse, but this is not necessarily the case. It is also only necessary that pairs of pulses have equal and opposite impulses it is possible that there may be pairs of widely varying impulses chained together, i.e. +I, −I, +0.1I, −0.1I, +4I, −4I.

The last pulse to be applied is the writing pulse. The impulse of this pulse is chosen based only upon the desired optical state (not upon the current state, or any prior state). In general, but not necessarily, the pulse will increase or decrease monotonically with gray state value. Since this waveform is specifically designed for use with coarse impulse systems, the choice of the writing pulse will generally involve mapping a set of desired gray states onto a small number of possible impulse choices, e.g. 4 gray states onto 9 possible applied impulses.

Examination of either the even or odd form of the uncompensated n-prepulse slide show waveform will reveal that the writing pulse always begins from the same direction, i.e. either from black or from white. This is an important feature of this waveform. Since the principle of the uncompensated waveform is that the pulse length can not be compensated accurately to ensure that pixels reach the same optical state, one cannot to expect to reach an identical optical state when approaching from opposite extreme optical states (black or white). Accordingly, there are two possible polarities for either of these forms, which can be labeled "from black" and "from white."

One major shortcoming of this type of waveform is that it has large-amplitude optical flashes between images. This can be improved by shifting the update sequence by one superframe time for half of the pixels, and interleaving the pixels at high resolution, as discussed below with reference to FIGS. 9 and 10. Possible patterns include every other row, every other column, or a checkerboard pattern. Note, this does not mean using the opposite polarity, i.e. "from black" versus "from white", since this would result in non-matching gray scales on neighboring pixels. Instead, this can be accomplished by delaying the start of the update by one "superframe" (a grouping of frames equivalent to the maximum length of a black-white update) for half of the pixels (i.e. the first set of pixels completes the erase pulse, then the second set of pixels begin the erase pulse as the first set of pixels begin the first blanking pulse). This will require the addition of one superframe for the total update time, to allow for this synchronization.

It might at first appear that the ideal method for addressing an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. As already mentioned in part, some such errors encountered in practice include:

(a) Prior State Dependence; The impulse required to switch a pixel to a new optical state depends not only on the initial and desired optical state, but also on the previous optical states of the pixel.

(b) Dwell Time Dependence; The impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. Compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation, as discussed above.

Thus, general grayscale image flow requires very precise control of applied impulse to give good results, and empirically it has been found that, in the present state of the technology of electro-optic displays, general grayscale image flow is typically infeasible in a commercial display.

Almost all electro-optic media have a built-in resetting (error limiting) mechanism, namely their extreme (typically black and white) optical states, which function as "optical rails". After a specific impulse has been applied to a pixel of an electro-optic display, that pixel cannot get any whiter (or blacker). For example, in an encapsulated electrophoretic display, after a specific impulse has been applied, all the electrophoretic particles are forced against one another or against the capsule wall, and cannot move further, thus producing a limiting optical state or optical rail. Because there is a distribution of electrophoretic particle sizes and charges in such a medium, some particles hit the rails before others, creating a "soft rails" phenomenon, whereby the impulse precision required is reduced when the final optical state of a transition approaches the extreme black and white states, whereas the optical precision required increases dramatically in transitions ending near the middle of the optical range of the pixel. Obviously, a pure general grayscale image flow drive scheme cannot rely upon using the optical rails to prevent errors in gray levels since in such a drive scheme any given pixel can undergo an infinitely large number of changes in gray level without ever touching either optical rail.

To avoid the aforementioned problems, it may be desirable to arrange the drive scheme used in the present invention so that any given pixel can only undergo a predetermined maximum number of gray scale transitions before passing through one extreme optical state (black or white). A transition away from the extreme optical state start from an accurately known optical state, in effect canceling out any previously accumulated errors. Various techniques for minimizing the optical effects of such passage of pixels through extreme optical states (such as flashing of the display) are discussed below.

A first, simple drive scheme useful in the present invention will now be described with reference to a simple two-bit gray scale system having black (level 0), dark gray (level 1), light gray (level 2) and white (level 3) optical states, transitions being effected using a pulse width modulation technique, and a look-up table for transitions as set out in Table 6 below.

TABLE 6

| Transition | Impulse | Transition | Impulse |
|---|---|---|---|
| 0—0 | 0 | 0—0 | 0 |
| 0–1 | n | 1–0 | −n |
| 0–2 | 2n | 2–0 | −2n |
| 0–3 | 3n | 3–0 | −3n |

where n is a number dependent upon the specific display, and −n indicates a pulse having the same length as a pulse n but of opposite polarity. It will further be assumed that at the end of the reset pulse 304 in FIG. 8 all the pixels of the display are black (level 0). Since, as described below, all transitions take place through an intervening black state, the only transitions effected are those to or from this black state. Thus, the size of the necessary look-up table is significantly reduced, and obviously the factor by which look-up table size is thus reduced increases with the number of gray levels of the display.

Figure 9:
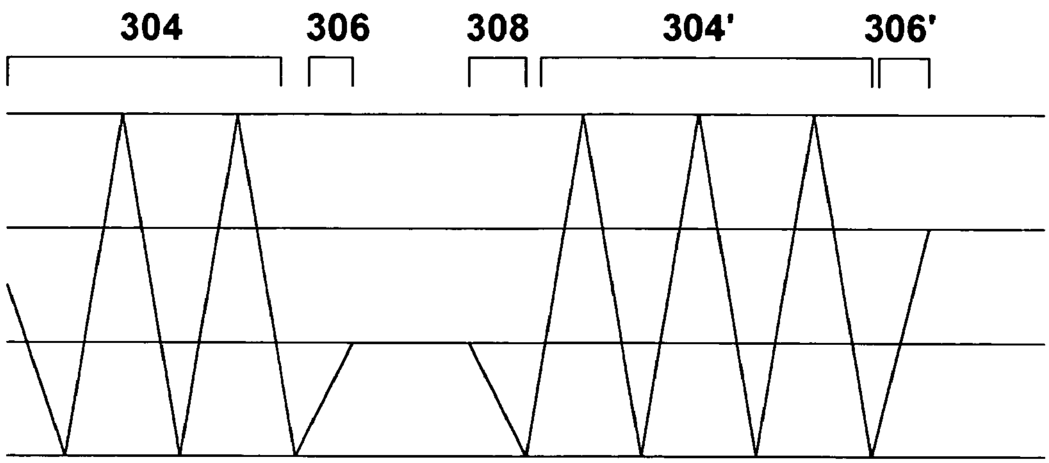
FIGS. 9 and 10 illustrate two drive schemes of the present invention.

FIG. 9 shows the transitions of one pixel associated with the drive scheme of FIG. 8. At the beginning of the reset step 304, the pixel is in some arbitrary gray state. During the reset step 304, the pixel is driven alternately to three black states and two intervening white states, ending in its black state. The pixel is then, at 306, written with the appropriate gray level for a first image, assumed to be level 1. The pixel remains at this level for some time during which the same image is displayed; the length of this display period is greatly reduced in FIG. 9 for ease of illustration. At some point, a new image needs to be written, and at this point, the pixel is returned to black (level 0) in erase step 308, and is then subjected, in a second reset step designated 304', to six reset pulses, alternately white and black, so that at the end of this reset step 304', the pixel has returned to its black state. Finally, in a second writing step designated 306', the pixel is written with the appropriate gray level for a second image, assumed to be level 2.

Figure 10:
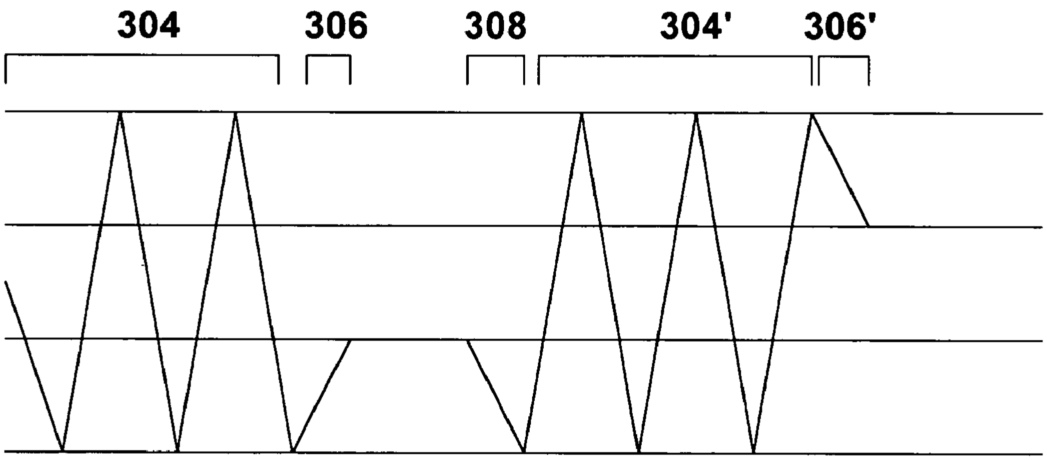

Numerous variations of the drive scheme shown in FIG. 9 are of course possible. One useful variation is shown in FIG. 10. The steps 304, 306 and 308 shown in FIG. 10 are identical to those shown in FIG. 9. However, in step 304', five reset pulses are used (obviously a different odd number of pulses could also be used), so that at the end of step 304', the pixel is in its white state (level 3), and in the second writing step 306', writing of the pixel is effected from this white state rather than the black state as in FIG. 9. Successive images are then written alternately from black and white states of the pixel.

In a further variation of the drive schemes shown in FIGS. 9 and 10, erase step 308 is effected to as to drive the pixel white (level 3) rather than black. An even number of reset pulses are then applied to that the pixel ends the reset step in a white state, and the second image is written from this white state. As with the drive scheme shown in FIG. 10, in this scheme successive images are written alternately from black and white states of the pixel.

It will be appreciated that in all the foregoing schemes, the number and duration of the reset pulses can be varied depending upon the characteristics of the electro-optic medium used. Similarly, voltage modulation rather than pulse width modulation may be used to vary the impulse applied to the pixel.

The black and white flashes which appear on the display during the reset steps of the drive schemes described above are of course visible to the user and may be objectionable to many users. To lessen the visual effect of such reset steps, it is convenient to divide the pixels of the display into two (or more) groups and to apply different types of reset pulses to the different groups. More specifically, if it necessary to use reset pulses which drive any given pixel alternately black and white, it is convenient to divide the pixels into at least two groups and to arrange the drive scheme so that one group of pixels are driven white at the same time that another group are driven black. Provided the spatial distribution of the two groups is chosen carefully and the pixels are sufficiently small, the user will experience the reset step as an interval of gray on the display (with perhaps some slight flicker), and such a gray interval is typically less objectionable than a series of black and white flashes.

For example, in one form of such a "two group reset" step, the pixel in odd-numbered columns may be assigned to one "odd" group and the pixels in the even-numbered columns to the second "even" group. The odd pixels could then make use of the drive scheme shown in FIG. 9, while the even pixels could make use of a variant of this drive scheme in which, during the erase step, the pixels are driven to a white rather a black state. Both groups of pixels would then be subjected to an even number of reset pulses during reset step 304', so that the reset pulses for the two groups are essentially 180° out of phase, and the display appears gray throughout this reset step. Finally, during the writing of the second image at step 306', the odd pixels are driven from black to their final state, while the even pixels are driven from white to their final state. In order to ensure that every pixel is reset in the same manner over the long term (and thus that the manner of resetting does not introduce any artifacts on to the display), it is advantageous for the controller to switch the drive schemes between successive images, so that as a series of new images are written to the display, each pixel is written to its final state alternately from black and white states.

Obviously, a similar scheme can be used in which the pixels in odd-numbered rows form the first group and the pixels in even-numbered rows the second group. In a further similar drive scheme, the first group comprises pixels in odd-numbered columns and odd-numbered rows, and even-numbered columns and even-numbered rows, while the second group comprises in odd-numbered columns and even-numbered rows, and even-numbered columns and odd-numbered rows, so that the two groups are disposed in a checkerboard fashion.

Instead of or in addition to dividing the pixels into two groups and arranging for the reset pulses in one group to be 180° out of phase with those of the other group, the pixels may be divided into groups which use different reset steps differing in number and frequency of pulses. For example, one group could use the six pulse reset sequence shown in FIG. 9, while the second could use a similar sequence having twelve pulses of twice the frequency. In a more elaborate scheme, the pixels could be divided into four groups, with the first and second groups using the six pulse scheme but 180° out of phase with each other, while the third and fourth groups use the twelve pulse scheme but 180° out of phase with each other.

Another scheme for reducing the objectionable effects of reset steps will now be described with reference to FIGS. 11A and 11B. In this scheme, the pixels are again divided into two groups, with the first (even) group following the drive scheme shown in FIG. 11A and the second (odd) group following the drive scheme shown in FIG. 11B. Also in this scheme, all the gray levels intermediate black and white are divided into a first group of contiguous dark gray levels adjacent the black level, and a second group of contiguous light gray levels adjacent the white level, this division being the same for both groups of pixels. Desirably but not essentially, there are the same number of gray levels in these two groups; if there are an odd number of gray levels, the central level may be arbitrarily assigned to either group. For ease of illustration, FIGS. 11A and 11B show this drive scheme applied to an eight-level gray scale display, the levels being designated 0 (black) to 7 (white); gray levels 1, 2 and 3 are dark gray levels and gray levels 4, 5 and 6 are light gray levels.

Figure 11A:
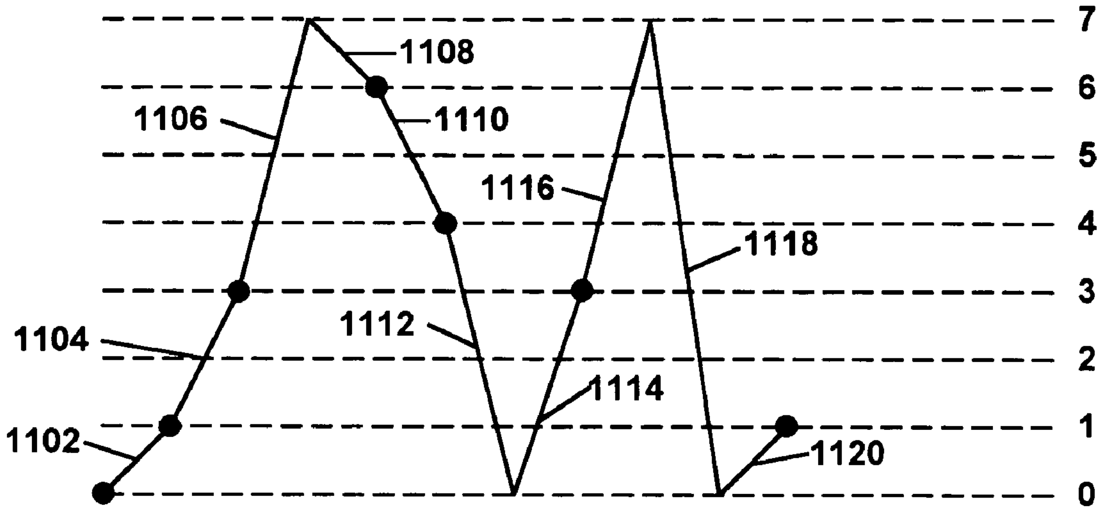
FIGS. 11A and 11B illustrate two parts of a further drive scheme of the present invention.
Figure 11B:
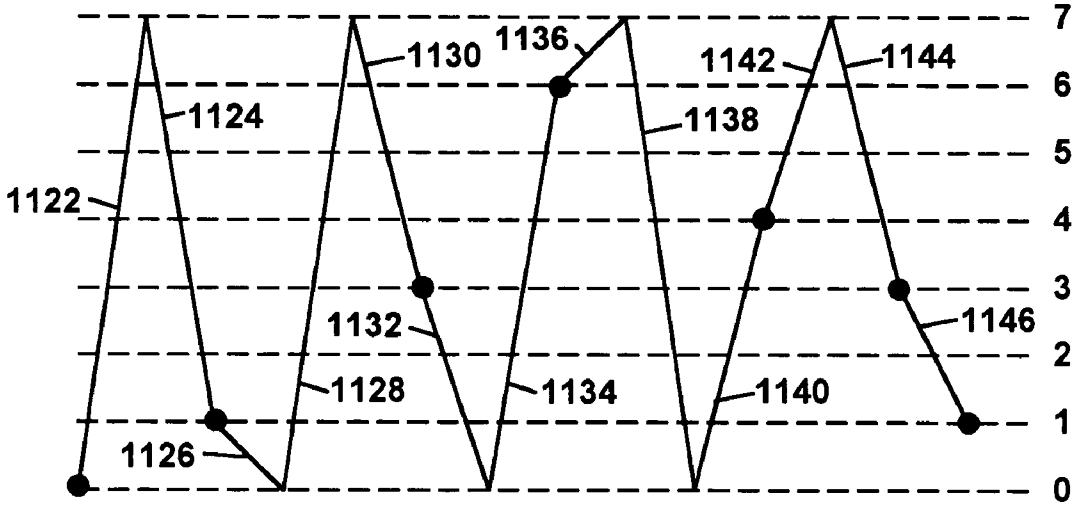
Figure 12A:
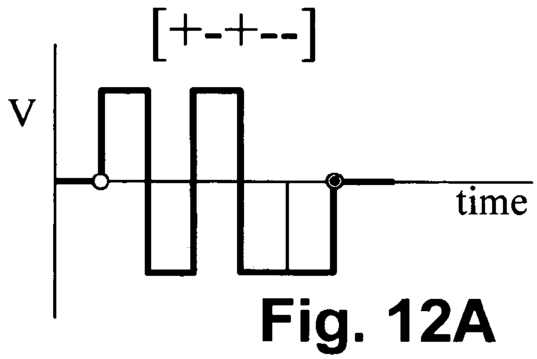
FIGS. 12A–12E show five waveforms which can be used in the non-contiguous addressing method of the present invention.
Figure 12B:
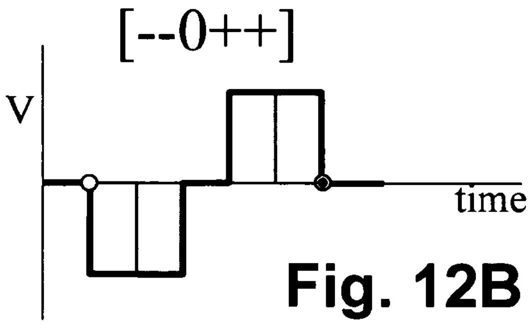
Figure 12C:
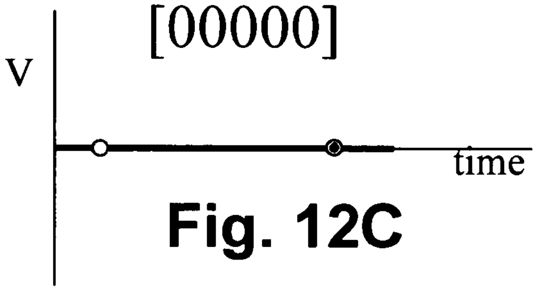
Figure 12D:
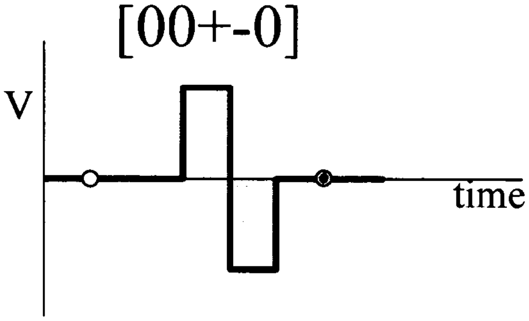
Figure 12E:
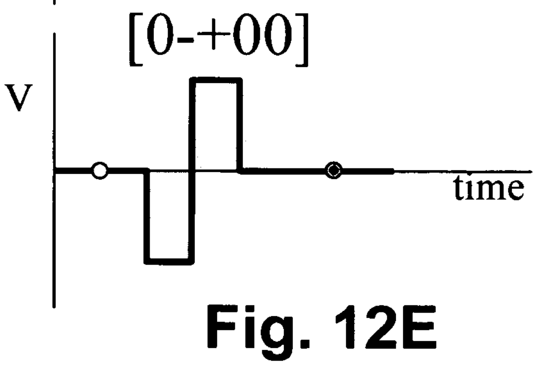

In the drive scheme of FIGS. 11A and 11B, gray to gray transitions are handled according to the following rules:

(a) in the first, even group of pixels, in a transition to a dark gray level, the last pulse applied is always a white-going pulse (i.e., a pulse having a polarity which tends to drive the pixel from its black state to its white state), whereas in a transition to a light gray level, the last pulse applied is always a black-going pulse;

(b) in the second, odd group of pixels, in a transition to a dark gray level, the last pulse applied is always a black-going pulse, whereas in a transition to a light gray level, the last pulse applied is always a white-going pulse;

(c) in all cases, a black-going pulse may only succeed a white-going pulse after a white state has been attained, and a white-going pulse may only succeed a black-going pulse after a black state has been attained; and (d) even pixels may not be driven from a dark gray level to black by a single black-going pulse nor odd pixels from a light gray level to white using a single white-going pulse.

(Obviously, in all cases, a white state can only be achieved using a final white-going pulse and a black state can only be achieved using a final black-going pulse.)

The application of these rules allows each gray to gray transition to be effected using a maximum of three successive pulses. For example, FIG. 11A shows an even pixel undergoing a transition from black (level 0) to gray level 1. This is achieved with a single white-going pulse (shown of course with a positive gradient in FIG. 11A) designated 1102. Next, the pixel is driven to gray level 3. Since gray level 3 is a dark gray level, according to rule (a) it must be reached by a white-going pulse, and the level 1/level 3 transition can thus be handled by a single white-going pulse 1104, which has an impulse different from that of pulse 1102.

The pixel is now driven to gray level 6. Since this is a light gray level, it must, by rule (a) be reached by a black-going pulse. Accordingly, application of rules (a) and (c) requires that this level 3/level 6 transition be effected by a two-pulse sequence, namely a first white-going pulse 1106, which drives the pixel white (level 7), followed by a second black-going pulse 1108, which drives the pixel from level 7 to the desired level 6.

The pixel is next driven to gray level 4. Since this is a light gray level, by an argument exactly similar to that employed for the level 1/level 3 transition discussed earlier, the level 6/level 4 transition is effected by a single black-going pulse 1110. The next transition is to level 3. Since this is a dark gray level, by an argument exactly similar to that employed for the level 3/level 6 transition discussed earlier, the level 4/level 3 transition is handled by a two-pulse sequence, namely a first black-going pulse 1112, which drives the pixel black (level 0), followed by a second white-going pulse 1114, which drives the pixels from level 0 to the desired level 3.

The final transition shown in FIG. 11A is from level 3 to level 1. Since level 1 is a dark gray level, it must, according to rule (a) be approached by a white-going pulse. Accordingly, applying rules (a) and (c), the level 3/level 1 transition must be handled by a three-pulse sequence comprising a first white-going pulse 1116, which drives the pixel white (level 7), a second black-going pulse 1118, which drives the pixel black (level 0), and a third white-going pulse 1120, which drives the pixel from black to the desired level 1 state.

FIG. 11B shows an odd pixel effecting the same 0-1-3-6-4-3-1 sequence of gray states as the even pixel in FIG. 11A. It will be seen, however, that the pulse sequences employed are very different. Rule (b) requires that level 1, a dark gray level, be approached by a black-going pulse. Hence, the 0-1 transition is effected by a first white-going pulse 1122, which drives the pixel white (level 7), followed by a black-going pulse 1124, which drives the pixel from level 7 to the desired level 1. The 1-3 transition requires a three-pulse sequence, a first black-going pulse 1126, which drives the pixel black (level 0), a second white-going pulse 1128, which drives the pixel white (level 7), and a third black-going pulse 1130, which drives the pixel from level 7 to the desired level 3. The next transition is to level 6 is a light gray level, which according to rule (b) is approached by a white-going pulse, the level 3/level 6 transition is effected by a two-pulse sequence comprising a black-going pulse 1132, which drives the pixel black (level 0), and a white-going pulse 1134, which drives the pixel to the desired level 6. The level 6/level 4 transition is effected by a three-pulse sequence, namely a white-going pulse 1136, which drives the pixel white (level 7), a black-going pulse 1138, which drives the pixel black (level 0) and a white-going pulse 1140, which drives the pixel to the desired level 4. The level 4/level transition 3 transition is effected by a two-pulse sequence comprising a white-going pulse 1142, which drives the pixel white (level 7), followed by a black-going pulse 1144, which drives the pixel to the desired level 3. Finally, the level 3/level 1 transition is effected by a single black-going pulse 1146.

It will be seen from FIGS. 11A and 11B that this drive scheme ensures that each pixel follows a "sawtooth" pattern in which the pixel travels from black to white without change of direction (although obviously the pixel may rest at any intermediate gray level for a short or long period), and thereafter travels from white to black without change of direction. Thus, rules (c) and (d) above may be replaced by a single rule (e) as follows:

(e) once a pixel has been driven from one extreme optical state (i.e., white or black) towards the opposed extreme optical state by a pulse of one polarity, the pixel may not receive a pulse of the opposed polarity until it has reached the aforesaid opposed extreme optical state.

Thus, this drive scheme is a "rail-stabilized gray scale" or "RSGS" drive scheme in the sense that the drive scheme ensures that a pixel can only undergo, at most, a number of transitions equal to (N-1)/2 transitions, where N is the number of gray levels, before being driven to one extreme optical state; this prevents slight errors in individual transitions (caused, for example, by unavoidable minor fluctuations in voltages applied by drivers) accumulating indefinitely to the point where serious distortion of a gray scale image is apparent to an observer. Furthermore, this drive scheme is designed so that even and odd pixels always approach a given intermediate gray level from opposed directions, i.e., the final pulse of the sequence is white-going in one case and black-going in the other. If a substantial area of the display, containing substantially equal numbers of even and odd pixels, is being written to a single gray level, this "opposed directions" feature minimizes flashing of the area.

For reasons similar to those discussed above relating to other drive schemes which divide pixels into two discrete groups, when implementing the sawtooth drive scheme of FIGS. 11A and 11B, careful attention should be paid to the arrangements of the pixels in the even and odd groups. This arrangement will desirably ensure that any substantially contiguous area of the display will contain a substantially equal number of odd and even pixels, and that the maximum size of a contiguous block of pixels of the same group is sufficiently small not to be readily discernable by an average observer. As already discussed, arranging the two groups of pixels in a checkerboard pattern meets these requirements. Stochastic screening techniques may also be employed to arrange the pixels of the two groups.

However, in this sawtooth drive scheme, use of a checkerboard pattern tends to increase the energy consumption of the display. In any given column of such a pattern, adjacent pixels will belong to opposite groups, and in a contiguous area of substantial size in which all pixels are undergoing the same gray level transition (a not uncommon situation), the adjacent pixels will tend to require impulses of opposite polarity at any given time. Applying impulses of opposite polarity to consecutive pixels in any column requires discharging and recharging the column (source) electrodes of the display as each new line is written. It is well known to those skilled in driving active matrix displays that discharging and recharging column electrodes is a major factor in the energy consumption of a display. Hence, a checkerboard arrangement tends to increase the energy consumption of the display.

A reasonable compromise between energy consumption and the desire to avoid large contiguous areas of pixels of the same group is to have pixels of each group assigned to rectangles, the pixels of which all lie in the same column but extend for several pixels along that column. With such an arrangement, when rewriting areas having the same gray level, discharging and recharging of the column electrodes will only be necessary when shifting from one rectangle to the next. Desirably, the rectangles are 1×4 pixels, and are arranged so that rectangles in adjacent columns do not end on the same row, i.e., the rectangles in adjacent columns should have differing "phases". The assignment of rectangles in columns to phases may be effected either randomly or in a cyclic manner.

One advantage of the sawtooth drive scheme shown in FIGS. 11A and 11B is that any areas of the image which are monochrome are simply updated with a single pulse, either black to white or white to black, as part of the overall updating of the display. The maximum time taken for rewriting such monochrome areas is only one-half of the maximum time for rewriting areas which require gray to gray transitions, and this feature can be used to advantage for rapid updating of image features such as characters input by a user, drop-down menus etc. The controller can check whether an image update requires any gray to gray transitions; if not, the areas of the image which need rewriting can be rewritten using the rapid monochrome update mode. Thus, a user can have fast updating of input characters, drop-down menus and other user-interaction features of the display seamlessly superimposed upon a slower updating of a general grayscale image.

As discussed in the aforementioned U.S. Pat. Nos. 6,504,524 and 6,531,997, in many electro-optic media, especially particle-based electrophoretic media, it is desirable that the drive scheme used to drive such media be direct current (DC) balanced, in the sense that, over an extended period, the algebraic sum of the currents passed through a specific pixel should be zero or as close to zero as possible, and the drive schemes of the present invention should be designed with this criterion in mind. More specifically, look-up tables used in the present invention should be designed so that any sequence of transitions beginning and ending in one extreme optical state (black or white) of a pixel should be DC balanced. From what has been said above, it might at first appear that such DC balancing may not be achievable, since the impulse, and thus the current through the pixel, required for any particular gray to gray transition is substantially constant. However, this is only true to a first approximation, and it has been found empirically that, at least in the case of particle-based electrophoretic media (and the same appears to be true of other electro-optic media), the effect of (say) applying five spaced 50 msec pulses to a pixel is not the same as applying one 250 msec pulse of the same voltage. Accordingly, there is some flexibility in the current which is passed through a pixel to achieve a given transition, and this flexibility can be used to assist in achieving DC balance. For example, the look-up table used in the present invention can store multiple impulses for a given transition, together with a value for the total current provided by each of these impulses, and the controller can maintain, for each pixel, a register arranged to store the algebraic sum of the impulses applied to the pixel since some prior time (for example, since the pixel was last in a black state). When a specific pixel is to be driven from a white or gray state to a black state, the controller can examine the register associated with that pixel, determine the current required to DC balance the overall sequence of transitions from the previous black state to the forthcoming black state, and choose the one of the multiple stored impulses for the white/gray to black transition needed which will either accurately reduce the associated register to zero, or at least to as small a remainder as possible (in which case the associated register will retain the value of this remainder and add it to the currents applied during later transitions). It will be apparent that repeated applications of this process can achieve accurate long term DC balancing of each pixel.

Non-contiguous Addressing Method

Fine control of gray scale levels in the methods of the present invention may be achieved by using the non-contiguous addressing method of the present invention. As mentioned above, the non-contiguous addressing method has two principal variants, a DC imbalanced variant and a DC balanced variant. The DC imbalanced variant effects at least one transition between gray levels using an output signal which has a non-zero net impulse (i.e., the length of positive and negative segments is not equal), and therefore is not internally DC balanced, and is non-contiguous, (i.e. the pulse contains portions of zero voltage or opposite polarity). The output signal used in the non-contiguous addressing method may or may not be non-periodic (i.e., it may or may not consist of repeating units such as +/−/+/− or ++/−−/++/−−).

Such a non-contiguous waveform (which may hereinafter be referred to as a "fine tuning" or "FT" waveform) may have no frames of opposite polarity, and/or may include only three voltage levels, +V, 0, and −V with respect to the effective front plane voltage of the display (assuming, as is typically the case, an active matrix display having a pixel electrode associated with each pixel and a common front electrode extending across multiple pixels, and typically the whole display, so the electric field applied to any pixel of the electro-optic medium is determined by the voltage difference between its associated pixel electrode and the common front electrode). Alternatively, an FT waveform may include more than three voltage levels. An FT waveform may consist of any one of the types of waveforms described above (such n-prepulse etc), with a non-contiguous waveform appended.

An FT waveform may (and typically will) be dependent on one or more prior image states, and can be used in order to achieve a smaller change in optical state than can be achieved using standard pulse width modulation (PWM) techniques. (Thus, the exact FT waveform employed will vary from one transition to another in a look-up table, in contrast to certain prior art waveforms in which pulses of alternating polarity are employed, for example, allegedly to prevent sticking of electrophoretic particles to surfaces such as capsule walls.) In a preferred variant of the non-contiguous addressing method, there is provided a combination of all waveforms required to achieve all allowed optical transitions in a display (a "transition matrix"), in which at least one waveform is an FT waveform of the present invention and the combination of waveforms is DC-balanced. In another preferred variant of the non-contiguous addressing method, the lengths of all voltage segments are integer multiples of a single interval (the "frame time"); a voltage segment is a portion of a waveform in which the voltage remains constant.

The non-contiguous addressing method of the present invention is based upon the discovery that, in many impulse driven electro-optic media, a waveform which has zero net impulse, and which thus might theoretically be expected to effect no overall change in the gray level of a pixel, can in fact, because of certain non-linear effects in the properties of such media, effect a small change in gray level, which can be used to achieve finer adjustment of gray levels than is possible using a simple PWM drive scheme or drivers with limited ability to vary the width and/or height of a pulse. The pulses which may up such a "fine tuning" waveform may be separate from the "major drive" pulses which effect a major change in gray level, and may precede or follow such major drive pulses. Alternatively, in some cases, the fine adjustment pulses may be intermingled with the major drive pulses, either a separate block of fine tuning pulses at a single point in the sequence of major drive pulses, or interspersed singly or in small groups at multiple points in the sequence of major drive pulses.

Although the non-contiguous addressing method has very general applicability, it will primarily be described using as an example drive schemes using source drivers with three voltage outputs (positive, negative, and zero) and waveforms constructed from the following three types of waveform elements (since it is believed that the necessary modifications of the present invention for use with other types of drivers and waveform elements will readily be apparent to those skilled in the technology of electro-optic displays):

1) Saturation pulse: A sequence of frames with voltages of one sign or one sign and zero volts that drives the reflectance approximately to one extreme optical state (an optical rail, either the darkest state, here called the black state, or the brightest state, here called the white state);

2) Set pulse: A sequence of frames with voltages of one sign or one sign and zero volts that drives the reflectance approximately to a desired gray level (black, white or an intermediate gray level); and 3) FT sequence: A sequence of frames with voltages that are individually selected to be positive, negative, or zero, such that the optical state of the ink is moved much less than a single-signed sequence of the same length. Examples of FT drive sequences having a total length of five scan frames are: [+−+−−] (here, the voltage of each frame is represented sequentially by a + for positive voltage, 0 for zero voltage, and − for a negative voltage), [−−0++], [00000], [00+−0], and [0−+00]. These sequences are shown schematically in FIGS. 12A–12E respectively of the accompanying drawings, in which the circles represent the starting and end points of the FT sequence, and there are five scan frames between these points.

An FT sequence may be used either to allow fine control of the optical state, as previously described, or to produce a change in the optical state similar to that for a sequence of monopolar (single-signed) voltages but having a different net voltage impulse (where impulse is defined as the integral of the applied voltage over time). FT sequences in the waveform can thus be used as a tool to achieve DC balance.

Figure 13:
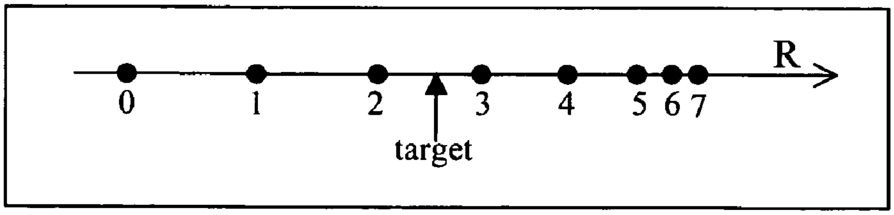
FIG. 13 illustrates a problem in addressing an electro-optic display using various numbers of frames of a monopolar voltage.

The use of an FT sequence to achieve fine control of the optical state will first be described. In FIG. 13, the optical states achievable using zero, one, two, three, or more frames of a monopolar voltage are indicated schematically as points on the reflectivity axis. From this Figure, it will be seen that the length of the monopolar pulse can be chosen to achieve a reflectance represented by its corresponding point on this axis. However, one may wish to achieve a gray level, such as that indicated by "target" in FIG. 13, that is not well approximated by any of these gray levels. An FT sequence can be used to fine-tune the reflectance to the desired state, either by fine tuning the final state achieved after a monopolar drive pulse, or by fine-tuning the initial state and then using a monopolar drive sequence.

Figure 14:
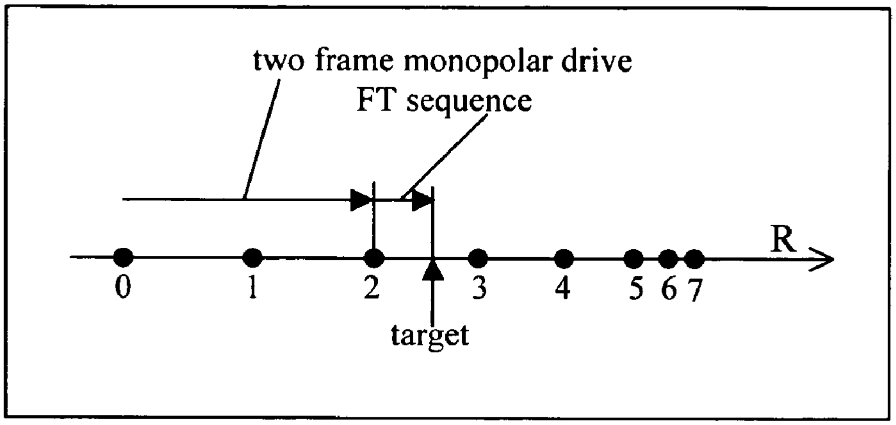
FIG. 14 illustrates one approach to solving the problem shown in FIG. 13 using the non-contiguous addressing method of the present invention.

A first example of an FT sequence, shown in FIG. 14, shows an FT sequence being used after a two-pulse monopolar drive. The FT sequence is used to fine-tune the final optical state to the target state. Like FIG. 13, FIG. 14 shows the optical states achievable using various numbers of scan frames, as indicated by the solid points. The target optical state is also shown. The optical change by applying two scan frames is indicated, as is an optical shift induced by the FT sequence.

Figure 15:
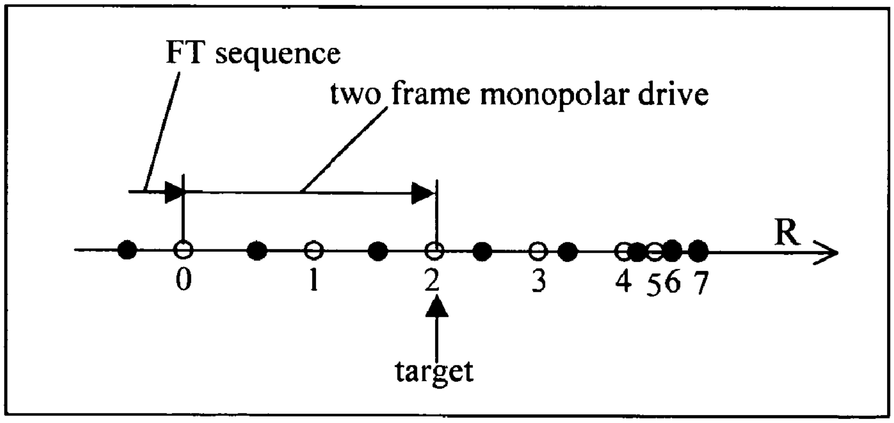
FIG. 15 illustrates a second approach to solving the problem shown in FIG. 13 using the non-contiguous addressing method of the present invention.

A second example of an FT sequence is shown in FIG. 15; in this case, the FT sequence is used first to fine tune the optical state into a position where a monopolar drive sequence can be used to achieve the desired optical state. The optical states achievable after the FT sequence are shown by the open circles in FIG. 15.

An FT sequence can also be used with a rail-stabilized gray scale (RSGS) waveform, such as that described above with reference to FIGS. 11A and 11B. As mentioned above, the essence of an RSGS waveform is that a given pixel is only allowed to make a limited number of gray-to-gray transitions before being driven to one of its extreme optical states. Thus, such waveforms use frequent drives into the extreme optical states (referred to as optical rails) to reduce optical errors while maintaining DC balance (where DC balance is a net voltage impulse of zero and is described in more detail below). Well resolved gray scale can be achieved using these waveforms by selecting fine-adjust voltages for one or more scan frames. However, if these fine-adjust voltages are not available, another method must be used to achieve fine tuning, preferably while maintaining DC balance as well. FT sequences may be used to achieve these goals.

First, consider a cyclic version of a rail-stabilized grayscale waveform, in which each transition consists of zero, one, or two saturation pulses (pulses which drive the pixel into an optical rail) followed by a set pulse as described above (which takes the pixel to the desired gray level). To illustrate how FT sequences can be used in this waveform, a symbolic notation will be used for the waveform elements: "sat" to represent a saturation pulse; "set" to represent a set pulse; and "N" to represent an FT drive sequence. The three basic types of cyclic rail-stabilized grayscale waveforms are:

set (for example, transition 1104 in FIG. 11A)

sat-set (for example, transition 1106/1108 in FIG. 11A)

sat-sat'-set (for example, transition 1116/1118/1120 in FIG. 11A) where sat and sat' are two distinct saturation pulses.

Modification of the first of these types with an FT sequence gives the following waveforms:

N-set set-N that is, an FT sequence followed by a set pulse or the same elements in reverse order.

Modification of the second of these types with one or more FT sequences gives, for example, the following FT-modified waveforms:

N-sat-set sat-N-set sat-set-N sat-N-set-N'

N-sat-set-N'

N-sat-N'-set

N-sat-N'-set-N"

where N, N', and N" are three FT sequences, which may or may not be different from one another.

Modification of the second of these types can be achieved by interspersing FT sequences between the three waveform elements following essentially the previously described forms. An incomplete list of examples includes:

N-sat-sat'-set

N-sat-sat'-set-N' sat-N-sat'-N'-set-N"

N-sat-N'-sat'-N"-set-N'".

Another base waveform which can be modified with an FT sequence is the single-pulse slide show gray scale with drive to black (or white). In this waveform, the optical state is first brought to an optical rail, then to the desired image. The waveform of each transition can be symbolically represented by either of the two sequences:

sat-set set.

Such a waveform may be modified by inclusion of FT drive sequence elements in essentially the same manner as already described for the rail-stabilized gray scale sequence, to produce sequences such as:

sat-set-N sat-N-set etc.

The above two examples describe the insertion of FT sequences before or after saturation and set pulse elements of a waveform. It may be advantageous to insert FT sequences part way through a saturation or set pulse, that is the base sequence:

sat-set would be modified to a form such as:

{sat, part I}-N-{sat, part II}-set or sat-{set, part I}-N-{set, part II}.

As already indicated, it has been discovered that the optical state of many electro-optic media achieved after a series of transitions is sensitive to the prior optical states and also to the time spent in those prior optical states, and methods have been described for compensating for prior state and prior dwell time sensitivities by adjusting the transition waveform accordingly. FT sequences can be used in a similar manner to compensate for prior optical states and/or prior dwell times.

To describe this concept in more detail, consider a sequence of gray levels that are to be represented on a particular pixel; these levels are denoted $R_1$, $R_2$, $R_3$, $R_4$, and so on, where $R_1$ denotes the next desired (final) gray level of the transition being considered, $R_2$ is the initial gray level for that transition, $R_3$ is the first prior gray level, $R_4$ is the second prior gray level and so on. The gray level sequence can then be represented by:

$$R_n\ R_{n-1}\ R_{n-2}\ \ldots\ R_3\ R_2\ R_1$$

The dwell time prior to gray level i is denoted $D_i$. $D_i$ may represent the number of frame scans of dwell in gray level i.

The FT sequences described above could be chosen to be appropriate for the transition from the current to the desired gray level. In the simplest form, these FT sequences are then functions of the current and desired gray level, as represented symbolically by:

$$N=N(R_2, R_1)$$

to indicate that the FT sequence N depends upon $R_2$ and $R_1$.

To improve device performance, and specifically to reduce residual gray level shifts correlated to prior images, it is advantageous to make small adjustments to a transition waveform. Selection of FT sequences could be used to achieve these adjustments. Various FT sequences give rise to various final optical states. A different FT sequence may be chosen for different optical histories of a given pixel. For example, to compensate for the first prior image ($R_3$), one could choose an FT sequence that depends on $R_3$, as represented by:

$$N=N(R_3, R_2, R_1)$$

That is, an FT sequence could be selected based not only on $R_1$ and $R_2$, but also on $R_3$.

Generalizing this concept, the FT sequence can be made dependent on an arbitrary number of prior gray levels and/or on an arbitrary number of prior dwell times, as represented symbolically by:

$$N=N(D_m, D_{m-1}, \ldots D_3, D_2; R_n, R_{n-1}, \ldots R_3, R_2, R_1)$$

where the symbol $D_k$ represents the dwell time spent in the gray level $R_k$ and the number of optical states, n, need not equal the number of dwell times, m, required in the FT determination function. Thus FT sequences may be functions of prior images and/or prior and current gray level dwell times.

Figure 16:
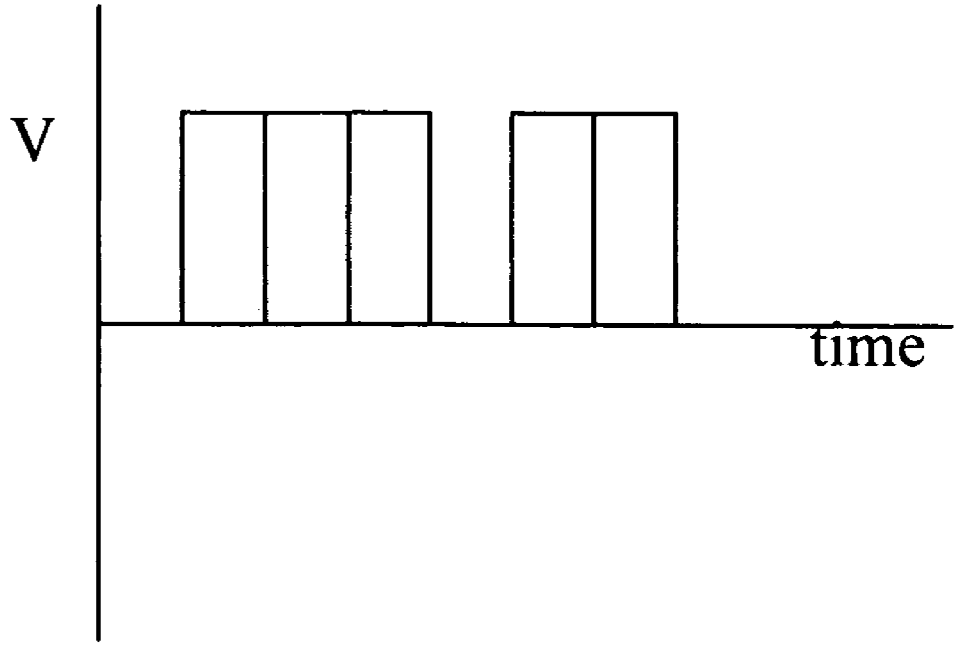
FIG. 16 illustrates a waveform which may be used in the non-contiguous addressing method of the present invention.
Figure 17:
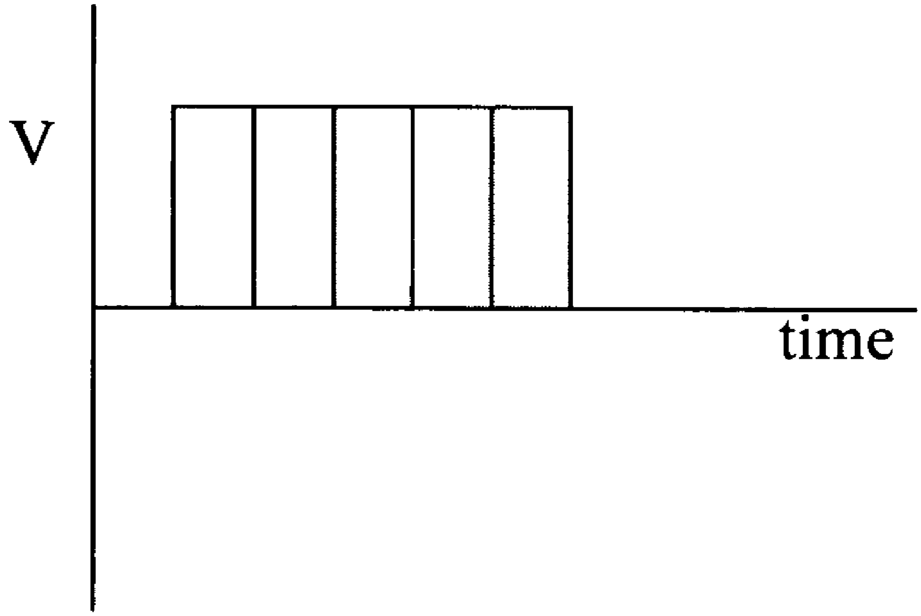
FIG. 17 illustrates a base waveform which can be modified in accordance with the present invention to produce the waveform shown in FIG. 16.

As a special case of this general concept, it has been found that insertion of zero voltage scan frames into an otherwise monopolar pulse can change the final optical state achieved. For example, the optical state achieved after the sequence of FIG. 16, into which a zero voltage scan frame has been inserted, will differ somewhat from the optical state achieved after the corresponding monopolar sequence of FIG. 17, with no zero voltage scan frame but the same total impulse as the sequence of FIG. 16.

It has also been found that the impact of a given pulse on the final optical state depends upon the length of delay between this pulse and a previous pulse. Thus, one can insert zero voltage frames between pulse elements to achieve fine tuning of a waveform.

The present invention extends to the use of FT drive elements and insertion of zero-volt scan frames in monopolar drive elements in other waveform structures. Other examples include but are not limited to double-prepulse (including triple-prepulse, quadruple-prepulse and so on) slide show gray scale waveforms, where both optical rails are visited (more than once in the case of higher numbers of prepulses) in going from one optical state to another, and other forms of rail-stabilized gray scale waveforms. FT sequences could also be used in general image flow gray scale waveforms, where direct transitions are made between gray level.

While insertion of zero voltage frames can be thought of as a specific example of insertion of an FT sequence, where the FT sequence is all zeros, attention is directed to this special case because it has been found to be effective in modifying final optical states.

The preceding discussion has focused on the use of FT sequences to achieve fine tuning of gray levels. The use of such FT sequences to achieve DC balance will now be considered. FT sequences can be used to change the degree of DC imbalance (preferably to reduce or eliminate DC imbalance) in a waveform. By DC balance is meant that all full-circuit gray level sequences (sequences that begin and end with the same gray level), have zero net voltage impulse. A waveform can be made DC balanced or less strongly DC imbalanced by use of one or more FT sequences, taking advantage of the fact that FT sequences can either (a) change the optical state in the same way as a saturation or set pulse but with a substantially different net voltage impulse; or (b) result in an insubstantial change in the optical state but with a net DC imbalance.

The following illustration shows how FT sequences can be used to achieve DC balance. In this example, a set pulse can be of variable length, namely one, two, three or more scan frames. The final gray levels achieved for each of the number of scan frames are shown in FIG. 18, in which the number next to each point represents the number of scan frames used to achieve the gray level.

Figure 18:
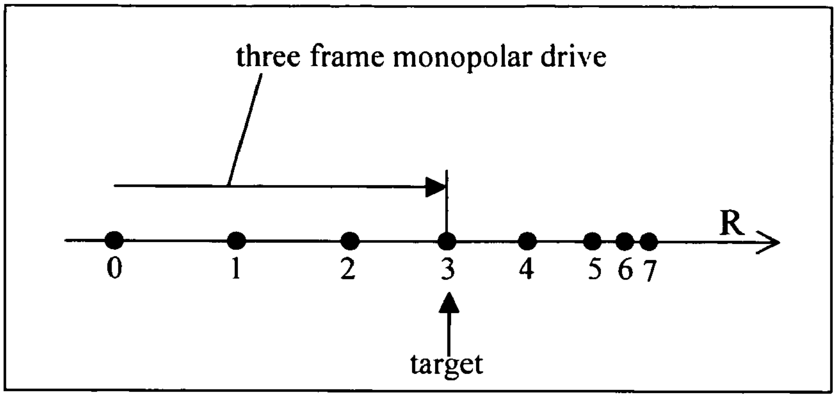
FIG. 18 illustrates a problem in addressing an electro-optic display using various numbers of frames of a monopolar voltage while maintaining DC balance.

FIG. 18 shows the optical states available using scan frames of positive voltage, monopolar drive where the number labels specify the number of monopolar frames used to produce the final gray level. Suppose that, in order to maintain DC balance in this example, a net voltage impulse of two positive voltage frames need to be applied. The desired (target) gray level could be achieved by using three scan frames of impulse; however, in doing so, the system would be left DC imbalanced by one frame. On the other hand, DC balance could be achieved by using two positive voltage scan frames instead of three, but the final optical state will deviate significantly from the target.

Figure 19:
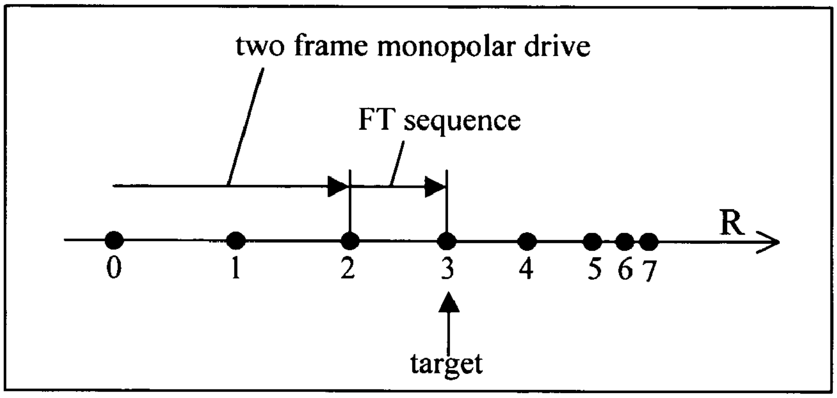
FIG. 19 illustrates one approach to solving the problem shown in FIG. 18 using the non-contiguous addressing method of the present invention.

One way to achieve DC balance is to use two positive voltage frames to drive the electro-optic medium to the vicinity of the desired gray level, and also use a DC balanced FT sequence (an FT sequence that has zero net voltage impulse) to make the final adjustment sufficiently close to the target gray level, as illustrated symbolically in FIG. 19, in which the target gray level is achieved using two scan frames followed by an FT sequence of zero net voltage impulse chosen to give the proper change in optical state.

Figure 20:
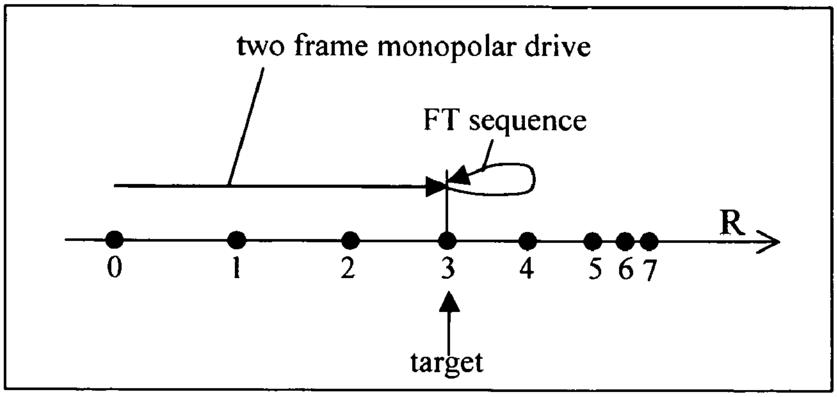
FIG. 20 illustrates a second approach to solving the problem shown in FIG. 18 using the non-contiguous addressing method of the present invention.

Alternatively, one could use three positive voltage scan frames of monopolar drive to bring the reflectance to the target optical state, then use an FT sequence that has a net DC imbalance equivalent to one negative voltage scan frame. If one chooses an FT sequence that results in a substantially unchanged optical state, then the final optical state will remain correct and DC-balance will be restored. This example is shown in FIG. 20. It will be appreciated that typically use of FT sequences will involve some adjustment of optical state along with some effect on DC balance, and that the above two examples illustrate extreme cases.

The following Example is now given, though by way of illustration only, to show experimental uses of FT sequences in accordance with the present invention.

EXAMPLE

Use of FT Sequences in Cyclic RSGS Waveform

This Example illustrates the use of FT sequences in improving the optical performance of a waveform designed at achieve 4 gray level (2-bit) addressing of a single pixel display. This display used an encapsulated electrophoretic medium and was constructed substantially as described in Paragraphs [0069] to [0076] of the aforementioned 2002/0180687. The single-pixel display was monitored by a photodiode.

Waveform voltages were applied to the pixel according to a transition matrix (look-up table), in order to achieve a sequence of gray levels within the 2-bit (4-state) grayscale. As already explained, a transition matrix or look-up table is simply a set of rules for applying voltages to the pixel in order to make a transition from one gray level to another within the gray scale.

The waveform was subject to voltage and timing constraints. Only three voltage levels, −15V, 0V and +15V were applied across the pixel. Also, in order to simulate an active matrix drive with 50 Hz frame rate, voltages were applied in 20 ms increments. Tuning algorithms were employed iteratively in order to optimize the waveform, i.e. to achieve a condition where the spread in the actual optical state for each of the four gray levels across a test sequence was minimized.

In an initial experiment, a cyclic rail-stabilized grayscale (cRSGS) waveform was optimized using simple saturation and set pulses. Consideration of prior states was limited to the initial ($R_2$) and desired final ($R_1$) gray levels in determining the transition matrix. The waveform was globally DC balanced. Because of the coarseness of the minimum impulse available for tuning (20 ms at 15 V), and the absence of states prior to $R_2$ in the transition matrix, quite poor performance was anticipated from this waveform.

Figure 21:
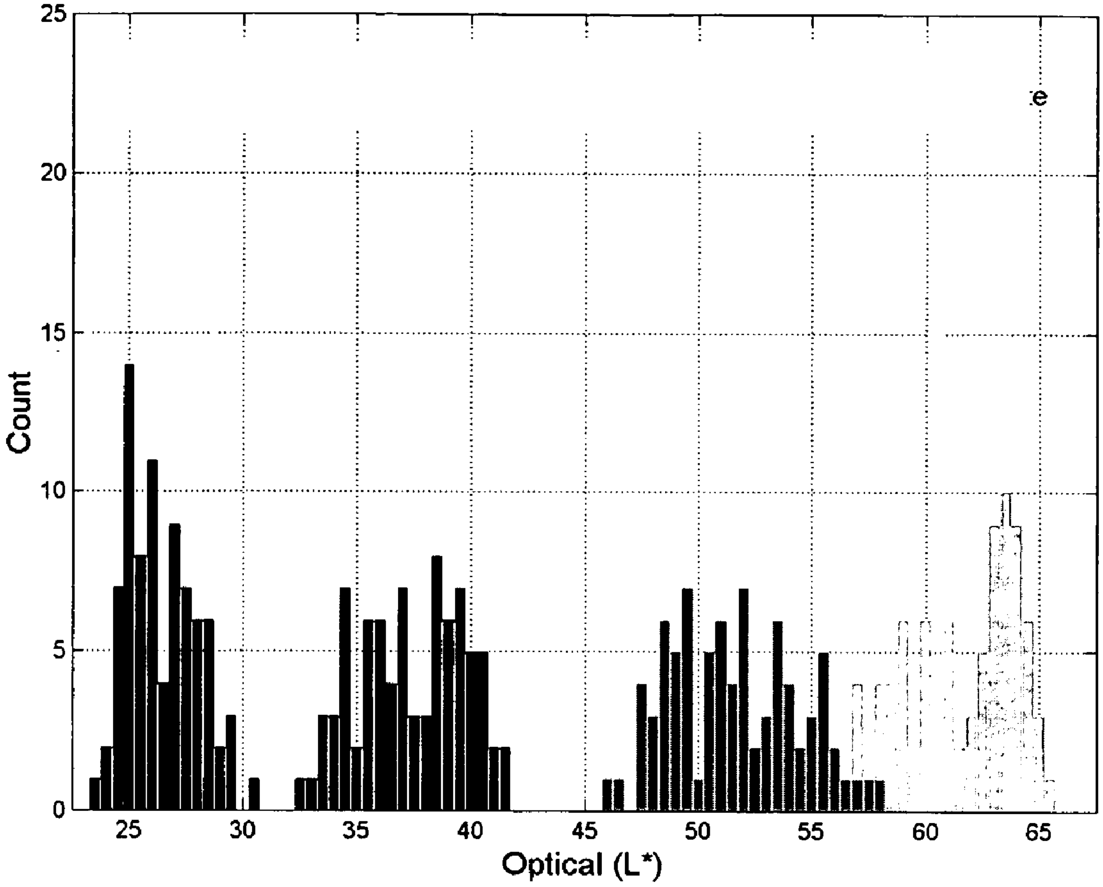
FIG. 21 illustrates the gray levels obtained in a nominally four gray level electro-optic display without using the non-contiguous addressing method of the present invention, as described in the Example below.

The performance of the transition matrix was tested by switching the test pixel through a "pentad-complete" gray level sequence, which contained all gray level pentad sequences in a random arrangement. (Pentad sequence elements are sequences of five gray levels, such as 0-1-0-2-3 and 2-1-3-0-3, where 0, 1, 2 and 3 represent the four gray levels available.) For a perfect transition matrix, the reflectivity of each of the four gray levels is exactly the same for all occurrences of that gray level in the random sequence. The reflectivity of each of the gray levels will vary significantly for realistic transition matrices. The bar graph of FIG. 21 indeed shows the poor performance of the voltage and timing limited transition matrix. The measured reflectivity of the various occurrences of each of the target gray levels is highly variable. The cRSGS waveform optimized without FT sequences developed in this part of the experiment is hereinafter referred to as the base waveform.

FT sequences were then incorporated into the cRSGS waveform; in this experiment, the FT sequences were limited to five scan frames, and included only DC balanced FT sequences. The FT sequences were placed at the end of the base waveform for each transition, i.e., the waveform for each transition had one of the following forms:

set-N sat-set-N sat-sat'-set-N.

Successful incorporation of FT sequence elements into the waveform required two steps; first, ascertaining the effect of various FT sequences on the optical state at each gray level and second selecting FT sequences to append to the various waveform elements.

To ascertain the effect of various FT sequences on the optical state of each gray level, an "FT efficacy" experiment was performed. First, a consistent starting point was established by switching the electrophoretic medium repeatedly between black and white optical rails. Then, the film was taken to one of the four gray levels (0, 1, 2, or 3), here referred to as the optical state $R_2$. Then, the base waveform appropriate to make the transition from $R_2$ to one of the other gray levels (here called $R_1$) with an appended FT sequence was applied. This step was repeated with all of the 51 DC balanced, 5-frame FT sequences. The final optical state was recorded for each of the FT sequences. The FT sequences were then ordered according to their associated final reflectivity. This process was repeated for all combinations of initial ($R_2$) and final ($R_1$) gray levels. The ordering of FT sequences for the final gray level 1 ($R_1$=1) and the current gray level 0, 2 and 3 ($R_2$=0, 2, 3) are shown in Tables 7–9, respectively, where the columns labeled "Frame 1" to "Frame 5" show the potential in volts applied during the five successive frames of the relevant FT sequence. The final optical states achieved for the waveform using the various FT sequences are plotted in FIG. 22. From this Figure, it will be seen that FT sequences can be used to affect a large change in the final optical state, and that the choices of five-scan-frame FT sequences afforded fine control over the final optical state, all with no net voltage impulse difference.

TABLE 7

Final optical states for gray level 0 to 1 for various FT sequences.

| Index Number | Optical (L*) | Frame 1 | Frame 2 | Frame 3 | Frame 4 | Frame 5 |
|---|---|---|---|---|---|---|
| 1 | 35.13 | 0 | 15 | 15 | −15 | −15 |
| 2 | 35.20 | 15 | 0 | 15 | −15 | −15 |
| 3 | 35.22 | 15 | 15 | 0 | −15 | −15 |
| 4 | 35.48 | 15 | 15 | −15 | −15 | 0 |
| 5 | 35.65 | 15 | 15 | −15 | 0 | −15 |
| 6 | 36.07 | 0 | 15 | −15 | 15 | −15 |
| 7 | 36.10 | 15 | −15 | 0 | 15 | −15 |
| 8 | 36.23 | 15 | 0 | −15 | 15 | −15 |
| 9 | 36.26 | 15 | −15 | 15 | 0 | −15 |
| 10 | 36.32 | 15 | −15 | 15 | −15 | 0 |
| 11 | 36.34 | −15 | 0 | 15 | 15 | −15 |
| 12 | 36.36 | −15 | 15 | 0 | 15 | −15 |
| 13 | 36.37 | 0 | 0 | 15 | 0 | −15 |
| 14 | 36.42 | 0 | 15 | 0 | 0 | −15 |
| 15 | 36.47 | 0 | 0 | 0 | 15 | −15 |
| 16 | 36.51 | −15 | 15 | 15 | 0 | −15 |
| 17 | 36.51 | 0 | 15 | 0 | −15 | 0 |
| 18 | 36.55 | 0 | 0 | 15 | −15 | 0 |
| 19 | 36.59 | −15 | 15 | 15 | −15 | 0 |
| 20 | 36.59 | 0 | 15 | −15 | 0 | 0 |

TABLE 7-continued

Final optical states for gray level 0 to 1 for various FT sequences.

| Index Number | Optical (L*) | Frame 1 | Frame 2 | Frame 3 | Frame 4 | Frame 5 |
|---|---|---|---|---|---|---|
| 21 | 36.59 | 0 | −15 | 15 | 15 | −15 |
| 22 | 36.68 | 15 | 0 | 0 | 0 | −15 |
| 23 | 36.73 | 15 | −15 | −15 | 0 | 15 |
| 24 | 36.76 | 15 | 0 | 0 | −15 | 0 |
| 25 | 36.79 | 15 | 0 | −15 | 0 | 0 |
| 26 | 36.86 | 0 | 15 | −15 | −15 | 15 |
| 27 | 36.87 | 15 | −15 | 0 | 0 | 0 |
| 28 | 37.00 | 15 | 0 | −15 | −15 | 15 |
| 29 | 37.03 | −15 | 0 | 0 | 0 | 15 |
| 30 | 37.05 | 15 | −15 | −15 | 15 | 0 |
| 31 | 37.11 | −15 | 0 | 0 | 15 | 0 |
| 32 | 37.19 | 15 | −15 | 0 | −15 | 15 |
| 33 | 37.19 | −15 | 15 | −15 | 0 | 15 |
| 34 | 37.22 | 0 | −15 | 0 | 0 | 15 |
| 35 | 37.24 | −15 | 0 | 15 | 0 | 0 |
| 36 | 37.26 | −15 | 0 | 15 | −15 | 15 |
| 37 | 37.33 | 0 | −15 | 0 | 15 | 0 |
| 38 | 37.43 | 0 | 0 | −15 | 0 | 15 |
| 39 | 37.43 | −15 | 15 | −15 | 15 | 0 |
| 40 | 37.49 | −15 | −15 | 15 | 0 | 15 |
| 41 | 37.50 | −15 | 15 | 0 | 0 | 0 |
| 42 | 37.53 | −15 | 15 | 0 | −15 | 15 |
| 43 | 37.55 | 0 | −15 | 15 | −15 | 15 |
| 44 | 37.58 | 0 | −15 | 15 | 0 | 0 |
| 45 | 37.61 | 0 | 0 | −15 | 15 | 0 |
| 46 | 37.62 | −15 | −15 | 0 | 15 | 15 |
| 47 | 37.69 | 0 | 0 | 0 | −15 | 15 |
| 48 | 37.72 | 0 | 0 | 0 | 0 | 0 |
| 49 | 37.85 | −15 | −15 | 15 | 15 | 0 |
| 50 | 37.96 | −15 | 0 | −15 | 15 | 15 |
| 51 | 37.99 | 0 | −15 | −15 | 15 | 15 |

TABLE 8

Final optical states for gray level 2 to 1 for various FT sequences.

| Index Number | Optical (L*) | Frame 1 | Frame 2 | Frame 3 | Frame 4 | Frame 5 |
|---|---|---|---|---|---|---|
| 1 | 34.85 | 0 | 15 | 15 | −15 | −15 |
| 2 | 34.91 | 15 | 0 | 15 | −15 | −15 |
| 3 | 35.07 | 15 | 15 | −15 | −15 | 0 |
| 4 | 35.15 | 15 | 15 | 0 | −15 | −15 |
| 5 | 35.35 | 15 | 15 | −15 | 0 | −15 |
| 6 | 35.43 | 0 | 15 | −15 | 15 | −15 |
| 7 | 35.46 | 15 | −15 | 0 | 15 | −15 |
| 8 | 35.51 | 0 | 0 | 15 | −15 | 0 |
| 9 | 35.52 | 0 | 15 | −15 | 0 | 0 |
| 10 | 35.52 | 0 | 0 | 0 | 15 | −15 |
| 11 | 35.61 | 15 | −15 | 15 | −15 | 0 |
| 12 | 35.62 | 0 | 0 | 15 | 0 | −15 |
| 13 | 35.63 | 15 | −15 | 0 | 0 | 0 |
| 14 | 35.65 | −15 | 15 | 0 | 15 | −15 |
| 15 | 35.67 | 0 | 15 | 0 | −15 | 0 |
| 16 | 35.70 | −15 | 0 | 15 | 15 | −15 |
| 17 | 35.75 | 15 | −15 | 15 | 0 | −15 |
| 18 | 35.76 | 0 | 15 | 0 | 0 | −15 |
| 19 | 35.77 | 15 | 0 | −15 | 0 | 0 |
| 20 | 35.78 | 15 | 0 | −15 | 15 | −15 |
| 21 | 35.80 | −15 | 15 | 15 | −15 | 0 |
| 22 | 35.97 | −15 | 15 | 15 | 0 | −15 |
| 23 | 35.98 | 15 | 0 | 0 | −15 | 0 |
| 24 | 36.00 | 0 | −15 | 15 | 15 | −15 |
| 25 | 36.06 | 0 | 0 | 0 | 0 | 0 |
| 26 | 36.09 | −15 | 0 | 0 | 15 | 0 |
| 27 | 36.10 | −15 | 0 | 0 | 0 | 15 |
| 28 | 36.10 | 15 | 0 | 0 | 0 | −15 |
| 29 | 36.14 | −15 | 0 | 15 | 0 | 0 |
| 30 | 36.28 | −15 | 15 | 0 | 0 | 0 |
| 31 | 36.38 | 15 | −15 | −15 | 0 | 15 |
| 32 | 36.40 | 0 | 15 | −15 | −15 | 15 |

TABLE 8-continued

Final optical states for gray level 2 to 1 for various FT sequences.

| Index Number | Optical (L*) | Frame 1 | Frame 2 | Frame 3 | Frame 4 | Frame 5 |
|---|---|---|---|---|---|---|
| 33 | 36.41 | 0 | −15 | 0 | 0 | 15 |
| 34 | 36.44 | 0 | −15 | 0 | 15 | 0 |
| 35 | 36.45 | 15 | −15 | −15 | 15 | 0 |
| 36 | 36.49 | −15 | 15 | −15 | 0 | 15 |
| 37 | 36.49 | 0 | −15 | 15 | 0 | 0 |
| 38 | 36.55 | −15 | 0 | 15 | −15 | 15 |
| 39 | 36.57 | −15 | 15 | −15 | 15 | 0 |
| 40 | 36.59 | 0 | 0 | −15 | 0 | 15 |
| 41 | 36.63 | 0 | 0 | −15 | 15 | 0 |
| 42 | 36.72 | 15 | −15 | 0 | −15 | 15 |
| 43 | 36.72 | 15 | 0 | −15 | −15 | 15 |
| 44 | 36.77 | 0 | 0 | 0 | −15 | 15 |
| 45 | 36.81 | −15 | 15 | 0 | −15 | 15 |
| 46 | 36.89 | 0 | −15 | 15 | −15 | 15 |
| 47 | 36.98 | −15 | −15 | 15 | 0 | 15 |
| 48 | 37.16 | −15 | −15 | 15 | 15 | 0 |
| 49 | 37.19 | −15 | −15 | 0 | 15 | 15 |
| 50 | 37.42 | −15 | 0 | −15 | 15 | 15 |
| 51 | 37.51 | 0 | −15 | −15 | 15 | 15 |

TABLE 9

Final optical states for gray level 3 to 1 for various FT sequences.

| Index Number | Optical (L*) | Frame 1 | Frame 2 | Frame 3 | Frame 4 | Frame 5 |
|---|---|---|---|---|---|---|
| 1 | 36.86 | 0 | 15 | 15 | −15 | −15 |
| 2 | 36.92 | 15 | 0 | 15 | −15 | −15 |
| 3 | 37.00 | 15 | 15 | −15 | −15 | 0 |
| 4 | 37.13 | 15 | 15 | 0 | −15 | −15 |
| 5 | 37.39 | 15 | 15 | −15 | 0 | −15 |
| 6 | 37.47 | 0 | 15 | −15 | 15 | −15 |
| 7 | 37.48 | 15 | −15 | 0 | 15 | −15 |
| 8 | 37.50 | 0 | 15 | −15 | 0 | 0 |
| 9 | 37.52 | 0 | 0 | 15 | −15 | 0 |
| 10 | 37.53 | 0 | 0 | 0 | 15 | −15 |
| 11 | 37.60 | 15 | −15 | 15 | −15 | 0 |
| 12 | 37.62 | 15 | −15 | 0 | 0 | 0 |
| 13 | 37.63 | 0 | 0 | 15 | 0 | −15 |
| 14 | 37.65 | 0 | 15 | 0 | −15 | 0 |
| 15 | 37.67 | −15 | 15 | 0 | 15 | −15 |
| 16 | 37.71 | −15 | 0 | 15 | 15 | −15 |
| 17 | 37.76 | 0 | 15 | 0 | 0 | −15 |
| 18 | 37.77 | 15 | −15 | 15 | 0 | −15 |
| 19 | 37.79 | 15 | 0 | −15 | 15 | −15 |
| 20 | 37.80 | 15 | 0 | −15 | 0 | 0 |
| 21 | 37.82 | −15 | 15 | 15 | −15 | 0 |
| 22 | 37.96 | 15 | 0 | 0 | −15 | 0 |
| 23 | 38.01 | −15 | 15 | 15 | 0 | −15 |
| 24 | 38.03 | 0 | −15 | 15 | 15 | −15 |
| 25 | 38.04 | 0 | 0 | 0 | 0 | 0 |
| 26 | 38.09 | −15 | 0 | 0 | 15 | 0 |
| 27 | 38.09 | 15 | 0 | 0 | 0 | −15 |
| 28 | 38.15 | −15 | 0 | 0 | 0 | 15 |
| 29 | 38.16 | −15 | 0 | 15 | 0 | 0 |
| 30 | 38.24 | −15 | 15 | 0 | 0 | 0 |
| 31 | 38.40 | 15 | −15 | −15 | 0 | 15 |
| 32 | 38.43 | 0 | −15 | 0 | 0 | 15 |
| 33 | 38.44 | 0 | −15 | 0 | 15 | 0 |
| 34 | 38.44 | 0 | 15 | −15 | −15 | 15 |
| 35 | 38.46 | 15 | −15 | −15 | 15 | 0 |
| 36 | 38.51 | −15 | 15 | −15 | 0 | 15 |
| 37 | 38.52 | 0 | −15 | 15 | 0 | 0 |
| 38 | 38.59 | −15 | 0 | 15 | −15 | 15 |
| 39 | 38.61 | −15 | 15 | −15 | 15 | 0 |
| 40 | 38.65 | 0 | 0 | −15 | 0 | 15 |
| 41 | 38.66 | 0 | 0 | −15 | 15 | 0 |
| 42 | 38.74 | 15 | 0 | −15 | −15 | 15 |
| 43 | 38.74 | 15 | −15 | 0 | −15 | 15 |
| 44 | 38.82 | 0 | 0 | 0 | −15 | 15 |

TABLE 9-continued

Final optical states for gray level 3 to 1 for various FT sequences.

| Index Number | Optical (L*) | Frame 1 | Frame 2 | Frame 3 | Frame 4 | Frame 5 |
|---|---|---|---|---|---|---|
| 45 | 38.89 | −15 | 15 | 0 | −15 | 15 |
| 46 | 38.95 | 0 | −15 | 15 | −15 | 15 |
| 47 | 39.02 | −15 | −15 | 15 | 0 | 15 |
| 48 | 39.21 | −15 | −15 | 15 | 15 | 0 |
| 49 | 39.22 | −15 | −15 | 0 | 15 | 15 |
| 50 | 39.44 | −15 | 0 | −15 | 15 | 15 |
| 51 | 39.53 | 0 | −15 | −15 | 15 | 15 |

Figure 22:
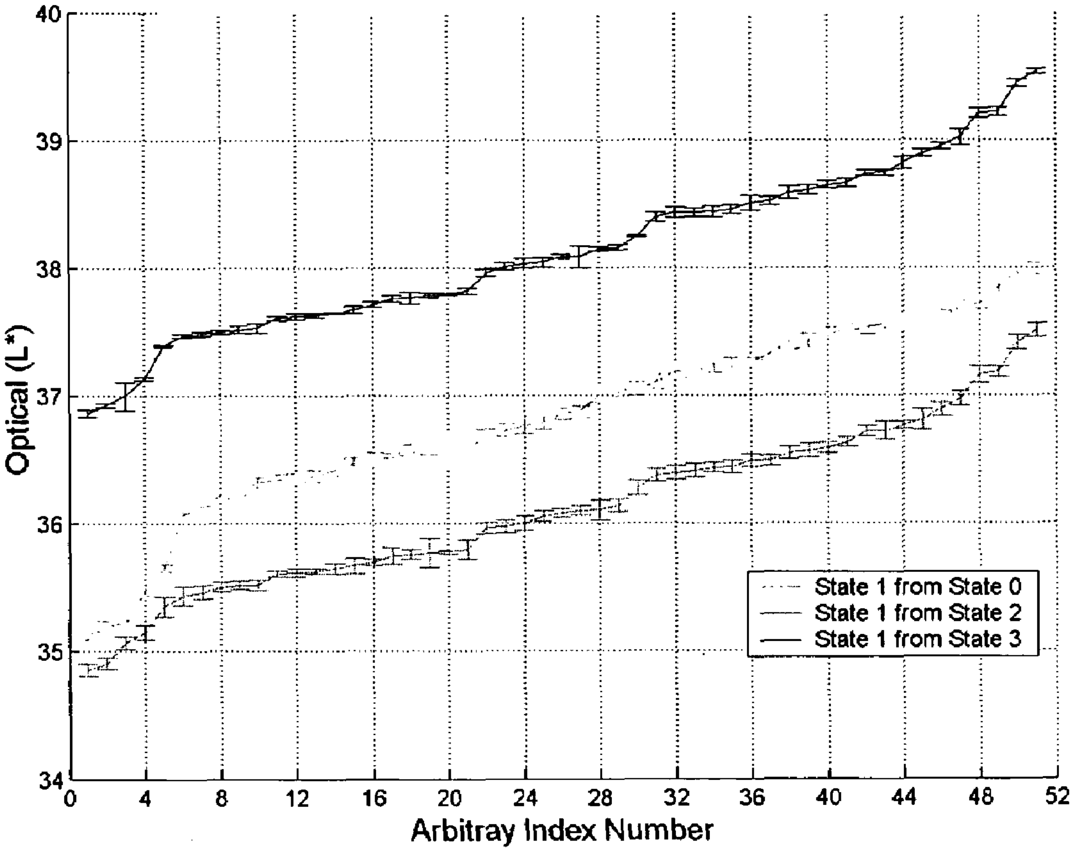
FIG. 22 illustrates the gray levels obtained from the same display as in FIG. 21 using various non-contiguous addressing sequences.

Next, a cRSGS waveform was constructed using FT sequences chosen using the results represented in Tables 7 to 9 and FIG. 22 (specifically Sequence 33 from Table 7, Sequence 49 from Table 8 and Sequence 4 from Table 9), and their analogs for the other final gray levels. It is noted that the region between ~36.9 and ~37.5 L* on the y-axis in FIG. 22 shows the overlap between optical reflectance of the same final ($R_1$) state with different initial ($R_2$) states made available by using DC balanced FT sequences. Therefore, a target gray level for $R_1$=1 was chosen at 37.2 L*, and the FT sequence for each $R_2$ that gave the final optical state closest to this target was selected. This process was repeated for the other final optical states ($R_1$=0, 2 and 3).

Figure 23:
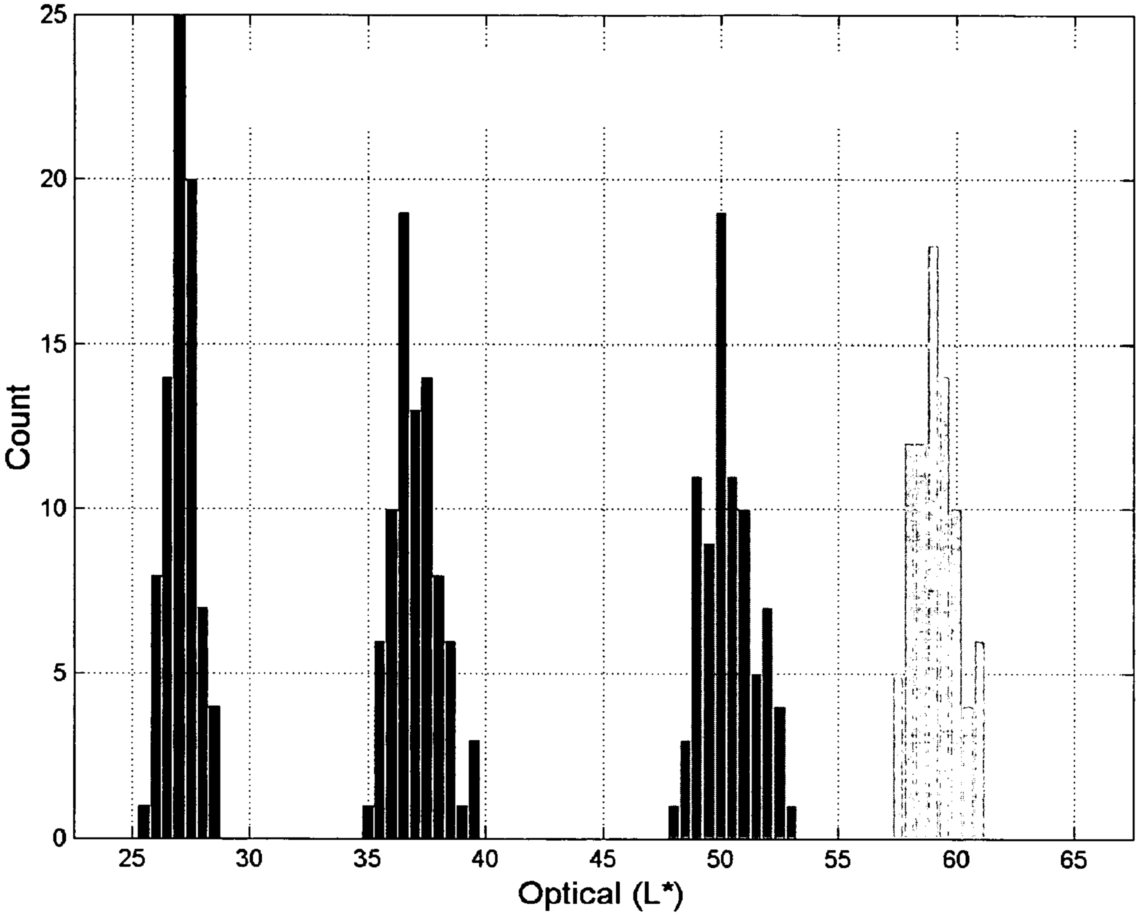
FIG. 23 illustrates the gray levels obtained from the same display as in FIG. 21 using a modified drive scheme in accordance with the non-contiguous addressing method of the present invention.

Finally, the resultant waveform was tested using the pseudo-random sequence containing all five-deep state histories that was described earlier. This sequence contains 324 transitions of interest. The cRSGS waveform modified by the selected FT sequences was used to achieve all the transitions in this sequence, and the reflectivity of each of the optical states achieved was recorded. The optical states achieved are plotted in FIG. 23. It is apparent by comparing FIG. 23 with FIG. 21 that the spread in reflectivity of each of the gray levels was greatly reduced by incorporation of the FT sequences.

In summary, the non-contiguous addressing aspect of this invention provides FT sequences which either (i) allow changes in the optical state or (ii) allow a means of achieving DC balance, or at least a change in the degree of DC imbalance, of a waveform. As already noted, it is possible to give a rather mathematical definition of an FT sequence, for example, for the DC imbalanced variant of the method:

(a) Application of a DC imbalanced FT sequence that results in a change in optical state that is substantially different from the change in optical state of its DC reference pulse. The "DC reference pulse" is a pulse of voltage $V_0$, where $V_0$ is the voltage corresponding to the maximum voltage amplitude applied during the FT sequence but with the same sign as the net impulse of the FT sequence. The net impulse of a sequence is the area under the voltage versus time curve, and is denoted by the symbol G The duration of the reference pulse is $T=G/V_0$. This FT sequence is utilized to introduce a DC imbalance that differs significantly from the net DC imbalance of its reference pulse.

(b) Application of a DC imbalanced FT sequence that results in a change in optical state that is much smaller in magnitude than the optical change one would achieve with its time reference pulse. The "time-reference pulse" is defined as a single-signed-voltage pulse of the same duration as the FT sequence, but where the sign of the reference pulse is chosen to give the largest change in optical state. That is, when the electro-optic medium is near its white state, a negative voltage pulse may drive the electro-optic medium only slightly more white, whereas a positive voltage may drive the electro-optic medium strongly toward black. The sign of the reference pulse in this case is positive. The goal of this type of FT pulse is to adjust the net voltage impulse (for DC balancing, for example) while not strongly affecting the optical state.

The non-contiguous addressing aspect of the present invention also relates to the concept of using one or more FT sequences between or inserted into pulse elements of a transition waveform, and to the concept of using FT sequences to balance against the effect of prior gray levels and prior dwell times One specific example of the present invention is the use of zero voltage frames inserted in the middle of a pulse element of a waveform or in between pulse elements of a waveform to change the final optical state.

The non-contiguous addressing aspect of the present invention also allows fine tuning of waveforms to achieve desired gray levels with desired precision, and a means by which a waveform can be brought closer to DC balanced (that is, zero net voltage impulse for any cyclic excursion to various gray levels), using source drivers that do not permit fine tuning of the voltage, especially source drivers with only two or three voltage levels.

DC Balanced Addressing Method

It should be noted that the sawtooth drive scheme described above with reference to FIGS. 11A and 11B is well adapted for use in DC balancing, in that this sawtooth drive scheme ensures that only a limited number of transitions can elapse between successive passes of any given pixel though the black state, and indeed that on average a pixel will pass through the black state on one-half of its transitions.

However, as already indicated, DC balancing according to the present invention is not confined to balancing the aggregate of the impulses applied to the electro-optic medium during a succession of transitions, but also extends to making at least some of the transitions undergone by the pixels of the display "internally" DC balanced, in accordance with the DC balanced addressing method of the present invention; this method will now be described in detail.

The DC balanced addressing method of the present invention relates to DC balanced transitions that are advantageous for driving encapsulated electrophoretic and other impulse-driven electro-optic media for display applications. This method can be applied, for example, to an active-matrix display that has source drivers that can output only two or three voltages. Although other types of drivers can be used, most of the detailed description below will focus on examples using source drivers with three voltage outputs (positive, negative, and zero).

In the following description of the DC balanced addressing method of the present invention, as in preceding description of other aspects of the invention, the gray levels of an electro-optic medium will be denoted 1 to N, where 1 denotes the darkest state and N the lightest state. The intermediate states are numbered increasing from darker to lighter. A drive scheme for an impulse driven imaging medium makes use of a set of rules for achieving transitions from an initial gray level to a final gray level. The drive scheme can be expressed as a voltage as a function of time for each transition, as shown in Table 10 for each of the 16 possible transitions in a 2-bit (4 gray level) gray scale display.

TABLE 10

| initial gray level | final gray level | | | |
|---|---|---|---|---|
| level | 1 | 2 | 3 | 4 |
| 1 | $V_{11}(t)$ | $V_{12}(t)$ | $V_{13}(t)$ | $V_{14}(t)$ |
| 2 | $V_{21}(t)$ | $V_{22}(t)$ | $V_{23}(t)$ | $V_{24}(t)$ |
| 3 | $V_{31}(t)$ | $V_{32}(t)$ | $V_{33}(t)$ | $V_{34}(t)$ |
| 4 | $V_{41}(t)$ | $V_{42}(t)$ | $V_{43}(t)$ | $V_{44}(t)$ |

In Table 10, Vij(t) denotes the waveform used to make the transition from gray level i to gray level j. DC-balanced transitions are ones where the time integral of the waveform Vij(t) is zero.

The term "optical rails" has already been defined above as meaning the extreme optical states of an electro-optic medium. The phrase "pushing the medium towards or into an optical rail" will be employed below. By "towards", is meant that a voltage is applied to move the optical state of the medium toward one of the optical rails. By "pushing", is meant that the voltage pulse is of sufficient duration and amplitude that the optical state of the electro-optic medium is brought substantially close to one of the optical rails. It is important to note that "pushing into an optical rail" does not mean that the optical rail state is necessarily achieved at the end of the pulse, but that an optical state substantially close to the final optical state is achieved at the end of the pulse. For example, consider an electro-optic medium with optical rails at 1% and 50% reflectivities. A 300 msec pulse was found to bring the final optical state (from 1% reflectivity) to 50% reflectivity. One may speak of a 200 msec pulse as pushing the display into the high-reflectivity optical rail even though it achieves a final reflectivity of only 45% reflectance. This 200 msec pulse is thought of as pushing the medium into one of the optical rails because the 200 msec duration is long compared to the time required to traverse a large fraction of the optical range, such as the middle third of the optical range (in this case, 200 msec is long compared to the pulse required to bring the medium across the middle third of the reflectivity range, in this case, from 17% to 34% reflectance).

Three different types of DC balanced transitions in accordance with the DC balanced addressing method of the present invention will now be described, together with a hybrid drive scheme using both DC balanced and DC imbalanced transitions. In the following description for convenience pulses will a denoted by a number, the magnitude of the number indicating the duration of the pulse. If the number is positive, the pulse is positive, and if the number is negative, the pulse is negative. Thus, for example, if the available voltages are +15V, 0V, and −15V, and the pulse duration is measured in milliseconds (msec), then a pulse characterized by x=300 indicates a 300 msec, 15V pulse, and x=−60 indicates a 60 msec, −15V pulse.

Figure 24:
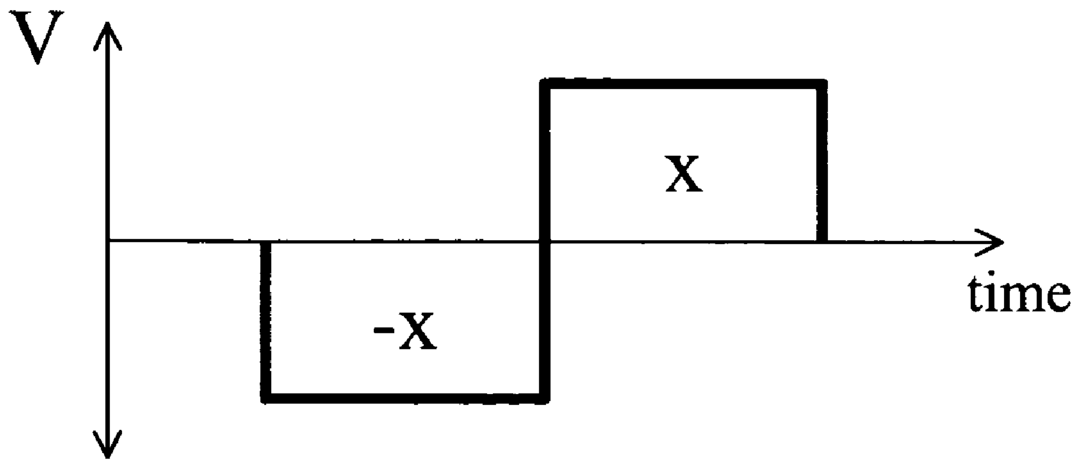
FIG. 24 illustrates a simple DC balanced waveform which may be used to drive an electro-optic display.

Type I:

In the first and simplest type of DC balanced transition of the present invention, a voltage pulse ("x") is preceded by a pulse ("−x") of equal length but of opposite sign, as illustrated in FIG. 24. (Note that the value of x can itself be negative, so the positive and negative pulses may appear in the opposite order from that shown in FIG. 24.)

Figure 25:
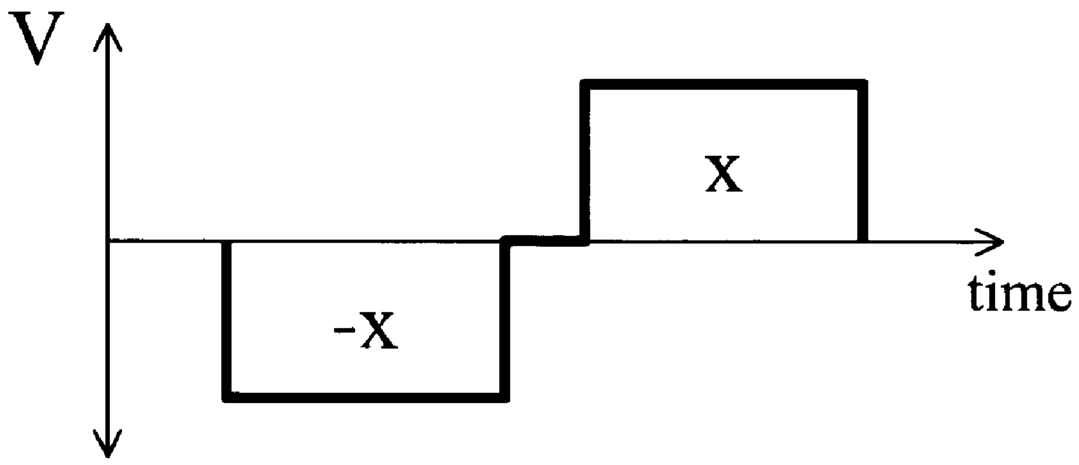
FIGS. 25 and 26 illustrate two modifications of the waveform shown in FIG. 24 to incorporate a period of zero voltage.
Figure 26:
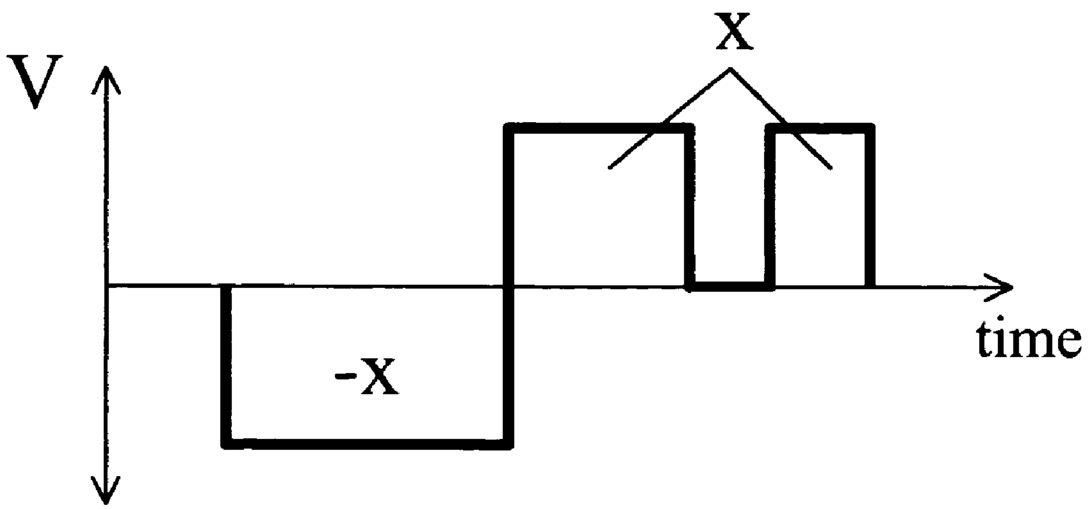

As mentioned above, it has been found that the effect of the waveform used to effect a transition is modified by the presence of a period of zero voltage (in effect a time delay) during or before any of the pulses in the waveform, in accordance with the non-contiguous addressing method of the present invention. FIGS. 25 and 26 illustrate modifications of the waveform of FIG. 24. In FIG. 25, a time delay is inserted between the two pulses of FIG. 24 while in FIG. 26 the time delay in inserted within the second pulse of FIG. 24, or, which amounts to the same thing, the second pulse of FIG. 24 is split into two separate pulses separated by the time delay. As already described, time delays can be incorporated into a waveform to achieve optical states not achievable without such delays. Time delays can also be used to fine-tune the final optical state. This fine-tuning ability is important, because in an active matrix drive, the time resolution of each pulse is defined by the scan rate of the display. The time resolution offered by the scan rate can be coarse enough that precise final optical states cannot be achieved without some additional means of fine tuning. While time delays offer a small degree of fine tuning of the final optical state, additional features such as those described below offer additional means of coarse and fine tuning of the final optical state.

Figure 27:
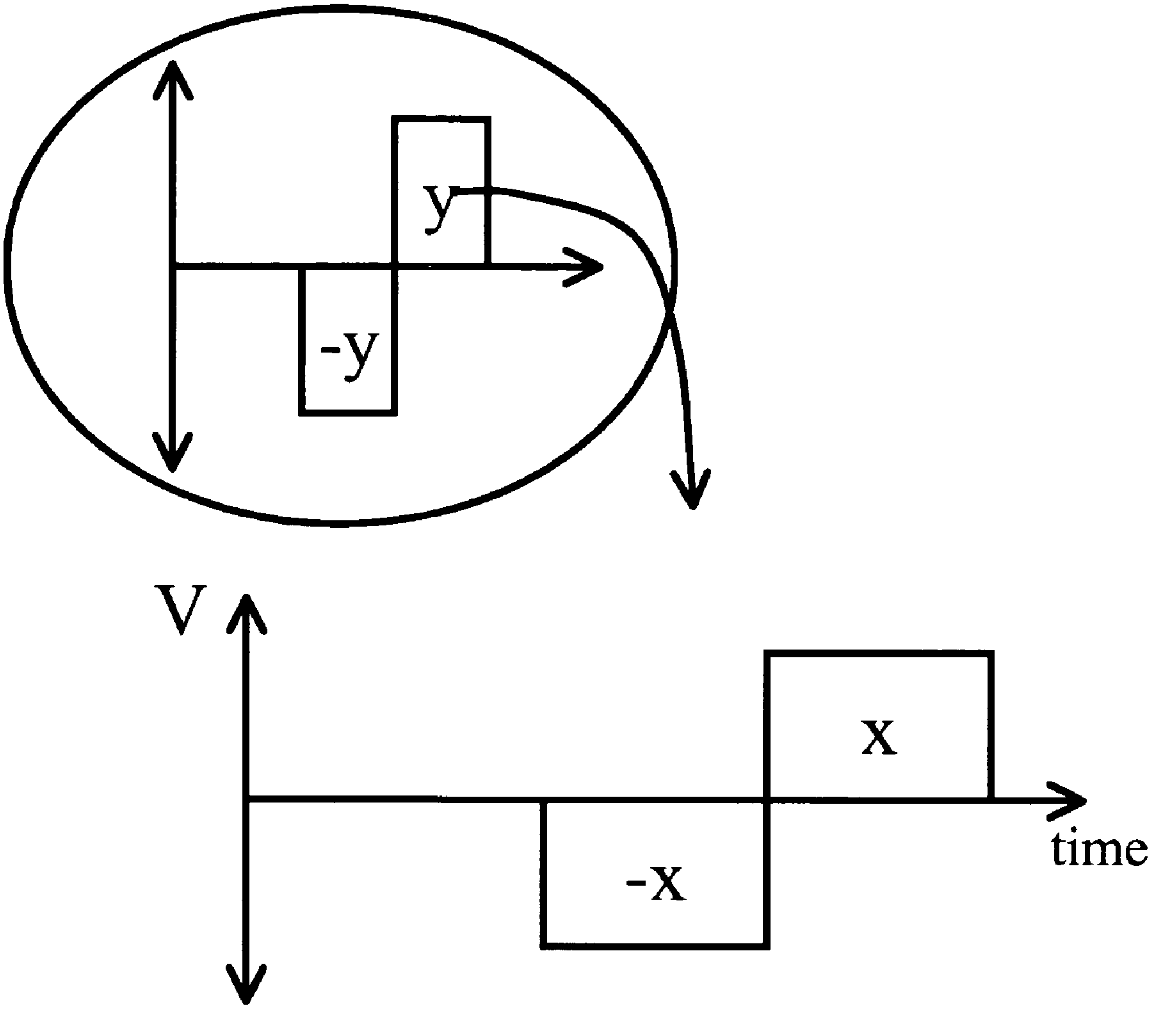
FIG. 27 illustrates schematically how the waveform shown in FIG. 24 may be modified to include an additional pair of drive pulses.

Type II:

A Type II waveform consists of a Type I waveform as described above with the insertion of a positive and negative pulse pair (denoted "y" and "−y" pulses) at some point into the Type I waveform, as indicated symbolically in FIG. 27. The y and −y pulses do not have to be consecutive, but can be present at different places into the original waveform. There are two especially advantageous forms of the Type II waveform.

Figure 28:
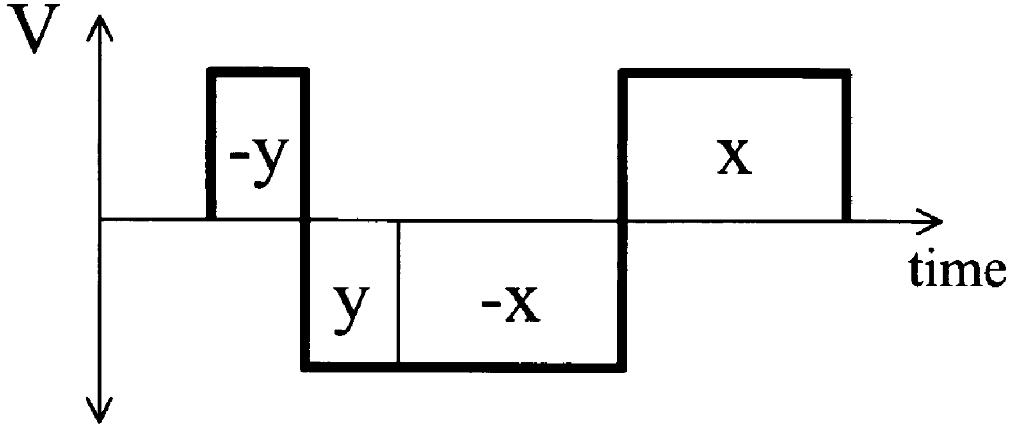
FIG. 28 illustrates one waveform produced by modifying the waveform of FIG. 24 in the manner illustrated in FIG. 27.

Type II: Special Case A:

In this special form, the "−y,y" pulse pair is placed before the "−x,x" pulse pair. It has been found that, when y and x are of opposite sign, as illustrated in FIG. 28, the final optical state can be finely tuned by even moderately coarse adjustment of the duration y. Thus, the value of x can be adjusted for coarse control and the value of y for final control of the final optical state of the electro-optic medium. This is believed to happen because the y pulse augments the −x pulse, thus changing the degree to which the electro-optic medium is pushed into one of its optical rails. The degree of pushing into one of the optical rails is known to give fine adjustment of the final optical state after a pulse away from that optical rail (in this case, provided by the x pulse).

Figure 29:
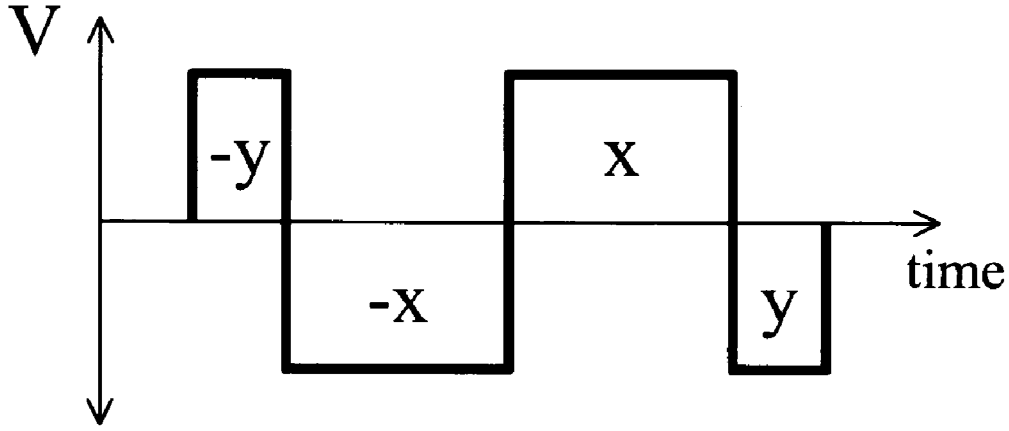
FIG. 29 illustrates a second waveform produced by modifying the waveform of FIG. 24 in the manner illustrated in FIG. 27.

Type II: Special Case B:

For reasons indicated above, it has been found advantageous to use waveforms with at least one pulse element long enough to drive the electro-optic medium substantially into one optical rail. Also, for a more visually pleasing transition, it is desirable to arrive to the final optical state from the nearer optical rail, since achieving gray levels near an optical rail requires only a short final pulse. Waveforms of this type require at least one long pulse for driving into an optical rail and a short pulse to achieve the final optical state near that optical rail, and hence cannot have the Type I structure described above. However, special cases of the Type II waveform can achieve this type of waveform. FIG. 29 shows one example of such a waveform, where the y pulse is placed after the −x,x pulse pair and the −y pulse is placed before the −x,x pulse pair. In this type of waveform, the final y pulse provides coarse tuning because the final optical state is very sensitive to the magnitude of y. The x pulse provides a finer tuning, since the final optical state typically does not depend as strongly on the magnitude of the drive into the optical rail.

Figure 30:
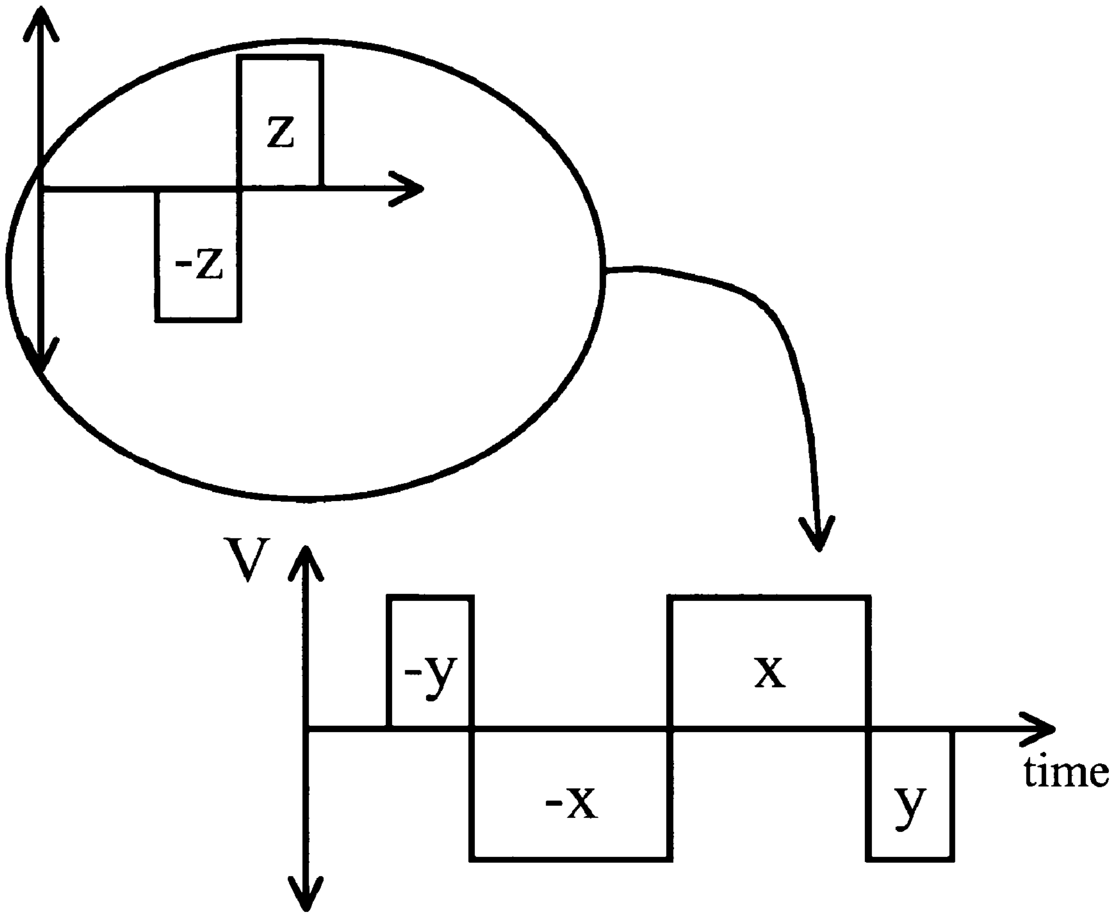
FIG. 30 illustrates schematically how the waveform shown in FIG. 29 may be further modified to include a third pair of drive pulses.
Figure 31:
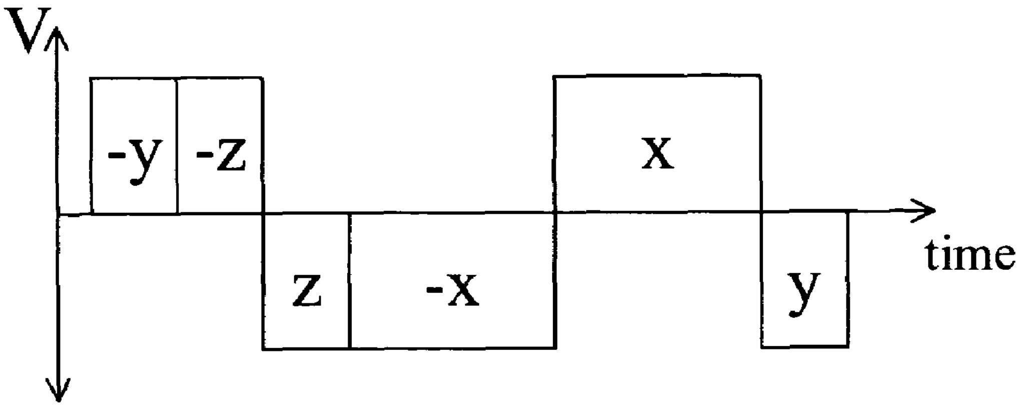
FIG. 31 illustrates one waveform produced by modifying the waveform of FIG. 29 in the manner illustrated in FIG. 30.

Type III:

A third type (Type III) of DC balanced waveform of the present invention introduces yet another DC-balanced pulse pair (denoted "z", "−z") into the waveform, as shown schematically in FIG. 30. A preferred example of such a Type III waveform is shown in FIG. 31; this type of waveform is useful for fine tuning of the final optical state, for the following reasons. Consider the situation without the z and −z pulses (i.e. the Type II waveform discussed above). The x pulse element is used for fine tuning, and the final optical state can be decreased by increasing x and increased by decreasing x. However, it is undesirable to decrease x beyond a certain point because then the electro-optic medium is not brought sufficiently close to an optical rail, as required for stability of the waveform. To avoid this problem, instead of decreasing x, one can (in effect) increase the −x pulse without changing the x pulse by adding the −z,z pulse pair as shown in FIG. 31, with z having the opposite sign from x. The z pulse augments the −x pulse, while the −z pulse maintains the transition at zero net impulse, i.e., maintains a DC-balanced transition.

The Type I, II and III waveforms discussed above can of course be modified in various ways. Additional pairs of pulses can be added to the waveform to achieve more general structures. The advantage of such additional pairs diminishes with increasing number of pulse elements, but such waveforms are a natural extension of the Type I, II and III waveforms. Also, as already discussed, one or more time delays can be inserted in various places in any of the waveforms, in the same manner as illustrated in FIGS. 25 and 26. As mentioned earlier, time delays in pulses affect the final optical state achieved, and are thus useful for fine tuning. Also, the placement of time delays can change the visual appearance of transitions by changing the position of transition elements relative to other elements in the same transition as well as relative to transition elements of other transitions. Time delays can also be used to align certain waveform transition elements, and this may be advantageous for some display modules with certain controller capabilities. Also, in recognition of the fact that small changes in the ordering of the applied pulses may substantially change the optical state following the pulses, the output signal may also be formed by transposing all or part of one of the above-described pulse sequences, or by repeated transpositions of all or part of one of the above described sequences, or by the insertion of one or more 0 V periods at any location within one of the above-described sequences. In addition, these transposition and insertion operators can be combined in any order (e.g., insert 0 V section, then transpose, then insert 0 V section). It is important to note that all such pulse sequences formed by these transformations retain the essential character of having zero net impulse.

Figure 32:
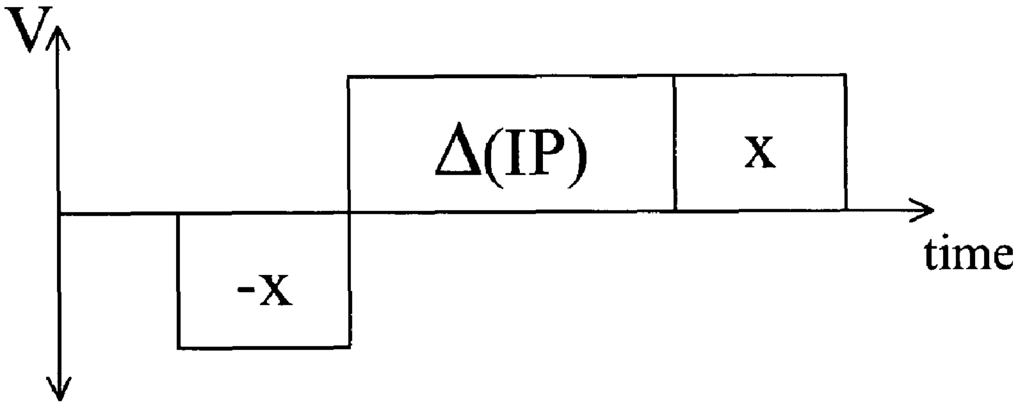
FIG. 32 illustrates one preferred DC imbalanced waveform which may be used in conjunction with DC balanced waveforms to provide a complete look-up table for use in the methods of the present invention.

Finally, DC balanced transitions can be combined with DC imbalanced transitions to form a complete drive scheme. For example, copending Application Ser. No. 60/481,053, filed Jul. 2, 2003 describes a preferred waveform of the type −TM(R1,R2) [IP(R1)−IP(R2)] TM(R1,R2). where [IP(R1)−IP(R2)] denotes a difference in impulse potential between the final and initial states of the transition being considered, while the two remaining terms represent a DC balanced pair of pulse. For convenience this waveform will hereinafter be referred to as the −x/ΔIP/x waveform, and is illustrated in FIG. 32. While satisfactory for transitions between differing optical states, this waveform is less satisfactory for zero transitions in which the initial and final optical states are the same. For these zero transitions there is used, in this example, a Type II waveform such as the ones shown in FIGS. 28 and 29. This complete waveform is shown symbolically in Table 11, from which it will be seen that the −x/ΔIP/x waveform is used for non-zero transitions and the Type II waveform for zero transitions.

TABLE 11

| initial gray level | final gray level 1 | 2 | 3 | 4 |
|---|---|---|---|---|
| 1 | Type II | −x/ΔIP/x | −x/ΔIP/x | −x/ΔIP/x |
| 2 | −x/ΔIP/x | Type II | −x/ΔIP/x | −x/ΔIP/x |
| 3 | −x/ΔIP/x | −x/ΔIP/x | Type II | −x/ΔIP/x |
| 4 | −x/ΔIP/x | −x/ΔIP/x | −x/ΔIP/x | Type II |

The DC balanced addressing method is not of course confined to transition matrices of this type, in which DC balanced transitions are confined to the "leading diagonal" transitions, in which the initial and final gray levels are the same; to produce the maximum improvement in control of gray levels, it is desirable to maximize the number of transitions which are DC balanced. However, depending upon the specific electro-optic medium being used, it may be difficult to DC balance transitions involving transitions to or from extreme gray levels, for example to or from black and white, gray levels 1 and 4 respectively. Furthermore, in choosing which transitions are to be DC balanced, it is important not to imbalance the overall transition matrix, i.e., to produce a transition matrix in which a closed loop beginning and ending at the same gray level is DC imbalanced. For example, a rule that transitions involving only a change of 0 or 1 unit in gray level are DC balanced but other transitions are DC imbalanced is not desirable, since this would imbalance the entire transition matrix, as shown by the following example; a pixel undergoing the sequence of gray levels 2-4-3-2 would experience transitions 2-4 (DC imbalanced), 4-3 (balanced) and 3-2 (balanced), so that the entire loop would be imbalanced. A practical compromise between these two conflicting desires may be to use DC balanced transitions in cases where only mid gray levels (levels 2 and 3) are involved and DC imbalanced transitions where the transition begins or ends at an extreme gray level (level 1 or 4). Obviously, the mid gray levels chosen for such a rule may vary with the specific electro-optic medium and controller used; for example, in three-bit (8 gray level) display it might be possible to use DC balanced transitions in all transitions beginning or ending at gray levels 2-7 (or perhaps 3-6) and DC imbalanced transitions in all transitions beginning or ending at gray levels 1 and 8 (or 1, 2, 7 and 8).

From the foregoing, it will be seen that the DC balanced addressing method of this invention allows fine tuning of waveforms to achieve desired gray levels with high precision, and a means by which a waveform transition can have zero net voltage, using source drivers that do not permit fine tuning of the voltage, especially source drivers with only two or three voltage levels. It is believed that DC balanced waveform transitions offer better performance than DC imbalanced waveforms. This invention applies to displays in general, and especially, although not exclusively, to active-matrix display modules with source drivers that offer only two or three voltages. This invention also applies to active-matrix display modules with source drivers that offer more voltage levels.

The DC balanced addressing method of this invention can provide certain additional advantages. As noted above, in some driving methods of the invention, the transition matrix is a function of variables other than prior optical state, for example the length of time since the last update, or the temperature of the display medium. It is quite difficult to maintain DC balance in these cases with non-balanced transitions. For example, consider a display that repeatedly transitions from white to black at 25° C. and then from black to white at 0° C. The slower response at low temperature will typically dictate using a longer pulse length. As a result, the display will experience a net DC imbalance towards white. On the other hand, if all transitions are internally balanced, then different transition matrices can be freely mixed without introducing DC imbalance.

Defined Region Method

The objectionable effects of reset steps, as described above, may be further reduced by using local rather than global updating, i.e., by rewriting only those portions of the display which change between successive images, the portions to be rewritten being chosen on either a "local area" or a pixel-by-pixel basis. For example, it is not uncommon to find a series of images in which relatively small objects move across a larger static background, as for example in diagrams illustrating parts in mechanical devices or diagrams used in accident reconstruction. To use local updating, the display controller needs to compare the final image with the initial image and determine which area(s) differ between the two images and thus need to be rewritten. The controller may identify one or more local areas typically rectangular areas having axes aligned with the pixel grid, which contain pixels which need to be updated, or may simply identify individual pixels which need to be updated. Any of the drive schemes already described may then be applied to update only the local areas or individual pixels thus identified as needing rewriting. Such a local updating scheme can substantially reduce the energy consumption of a display.

Furthermore, as already mentioned, the defined region method of the present invention provides a defined region method which permits updating of a bistable electro-optic display using different updating methods in different regions of the display.

Electro-optic displays are known in which the entire display can be driven in a one-bit or in a grayscale mode. When the display is in one-bit mode, updates are effected using a one-bit general image flow (GIF) waveform, whereas when the display is in grayscale mode, updates are effected using a multi-prepulse slide show waveform, or some other slow waveform, even if, in a specific area of the display, only one-bit information is being updated.

Such an electro-optic display may be modified to carry out the defined region method of the present invention by defining two additional commands in the controller, namely a "DEFINE REGION" command and a "CLEAR ALL REGIONS" command. The DEFINE REGION command typically takes as arguments locations sufficient to define completely a rectangular area of the display, for example the locations of the upper right and lower left corners of the defined region; this command may also have an additional argument specifying the bit depth to which the defined region is set, although this last argument is not necessary in simple forms of the defined region method in which the defined region is always monochrome. The bit depth set by the last argument of course overrides any bit depth previously set for the defined region. Alternatively, the DEFINE REGION command could specify a series of points defining the vertices of a polygon. The CLEAR ALL REGIONS command may take no arguments and simply reset the entire display to a single predefined bit depth, or might take a single argument specifying which of various possible bit depths is to be adopted by the entire display after the clearing operation.

It will be appreciated that the defined region method of the present invention is not restricted to the use of only two regions and more regions could be provided if desired. For example, in an image editing program it might be helpful to have a main region showing the image being edited at full bit depth, and both an information display region (for example, a box showing present cursor position) and a dialog box region (providing a dialog box for entry of text by the user) running in one-bit mode. The invention will primarily be described below in a two-region version, since the necessary modifications to enable use of more than two regions will readily be apparent to those skilled in the construction of display controllers.

In order to keep track of the depths of the different regions, the controller may keep an array of storage elements, one element being associated with each pixel in the display, and each element storing a value representing the current bit depth for the associated pixel. For example, an XVGA (800×600) display capable of operating in either 1-bit or 2-bit mode could use an 800×600 array of 1-bit elements (each containing 0 for 1-bit mode, 1 for 2-bit mode). In such a controller, the DEFINE REGION command would set the elements within the defined region of the display to the requested bit depth, while the CLEAR ALL REGIONS command would reset all elements of the array to the same value (either a predetermined value or one defined by the argument of the command).

Optionally, when a region is defined or cleared, the controller could execute an update sequence on the pixels within that region to transfer the display from one mode to the other, in order to ensure DC balancing or to adjust the optical states of the relevant pixels, for example by using an FT sequence as described above.

When a display is operating in defined region mode, a new image is sent to the controller, and the display must be redrawn, there are three possible cases:

1. Only pixels within the defined (say) one-bit region have changed. In this case, a one-bit (fast) waveform can be used to update the display;

2. Only pixels within the non-defined (grayscale) regions have changed. In this case, a grayscale (slow) waveform must be used to update the display (note that since by definition not pixels are changed within the defined region, the legibility of the defined region, for example a dialog box, during the redrawing is not a problem); and 3. Pixels in both the defined and non-defined regions have changed. In this case, the grayscale pixels are updated using the grayscale waveform, and the one-bit pixels are updated using the one-bit waveform (the shorter one-bit waveforms must be zero-padded appropriately to match the length of the grayscale update).

The controller may determine, before scanning thee display, which of these cases exists by performing the following logical tests (assuming a one-bit value associated with each pixel and storing the pixel mode, as defined above):

(Old_image XOR new_image)>0: pixels are changed in the display (Old_image XOR new_image) AND mode_array>0: grayscale pixels are changed (Old_image XOR new_image) AND (NOT mode_array) >0: monochrome pixels are changed As the controller scans the display, for case 1 or case 2 it can use one waveform look-up table for all pixels, since the unchanged pixels will receive 0 V, assuming that a null transition in one-bit mode is the same as in grayscale mode (in other words, that both waveforms are local-update). If instead the grayscale waveform is global-update (all pixels are updated whenever the display is updated), then the controller will need to test to see if a pixel is within the appropriate region to determine whether to apply the global-update waveform or not. For Case 3, the controller must check the value of the mode bit array for each pixel as it scans to determine which waveform to use.

Optionally, if the lightness values of the black and white states achieved in one-bit mode are identical to those achieved in grayscale mode, in Case 3 above the grayscale waveform can be used for all pixels in the display, thus eliminating the need for transfer functions between the one-bit and grayscale waveforms.

The defined region method of the present invention may make use of any of the optional features of the basic look-up table method, as described above.

The primary advantage of the defined region method of the present invention is that it enables the use of a fast one-bit waveform on a display that is displaying a previously written grayscale image. Prior art display controllers typically only allow the display to be in either grayscale or one-bit mode at any one time. While it is possible to write one-bit images in grayscale mode, the relevant waveforms are quite slow. In addition, the defined region method of the present invention is essentially transparent to the host system (the system, typically a computer) which supplies images to the controller, since the host system does not have to advise the controller which waveform to use. Finally, the defined region method allows both one-bit and grayscale waveforms to be used on the display at the same time, whereas other solutions require two separate update events if both kinds of waveforms are being used.

Further General Waveform Discussion

The aforementioned drive schemes may be varied in numerous ways depending upon the characteristics of the specific electro-optic display used. For example, in some cases it may be possible to eliminate many of the reset steps in the drives schemes described above. For example, if the electro-optic medium used is bistable for long periods (i.e., the gray levels of written pixels change only very slowly with time) and the impulse needed for a specific transition does not vary greatly with the period for which the pixel has been in its initial gray state, a look-up table may be arranged to effect gray state to gray state transitions directly without any intervening return to a black or white state, resetting of the display being effected only when, after a substantial period has elapsed, the gradual "drift" of pixels from their nominal gray levels has caused noticeable errors in the image presented. Thus, for example, if a user was using a display of the present invention as an electronic book reader, it might be possible to display numerous screens of information before resetting of the display were necessary; empirically, it has been found that with appropriate waveforms and drivers, as many as 1000 screens of information can be displayed before resetting is necessary, so that in practice resetting would not be necessary during a typical reading session of an electronic book reader.

It will readily be apparent to those skilled in display technology that a single apparatus of the present invention could usefully be provided with a plurality of different drive schemes for use under differing conditions. For example, since in the drive schemes shown in FIGS. 9 and 10, the reset pulses consume a substantial fraction of the total energy consumption of the display, a controller might be provided with a first drive scheme which resets the display at frequent intervals, thus minimizing gray scale errors, and a second scheme which resets the display only at longer intervals, thus tolerating greater gray scale errors but reduce energy consumption. Switching between the two schemes can be effected either manually or dependent upon external parameters; for example, if the display were being used in a laptop computer, the first drive scheme could be used when the computer is running on mains electricity, while the second could be used while the computer was running on internal battery power.

Compensation Voltage Method

A further variation on the basic look-up table method and apparatus of the present invention is provided by the compensation voltage method and apparatus of the present invention, which will now be described in detail.

As already mentioned, the compensation voltage method and apparatus of the present invention seek to achieve results similar to the basic look-up table methods described above without the need to store very large look-up tables. The size of a look-up table grows rapidly with the number of prior states with regard to which the look-up table is indexed. For this reason, as already discussed, there is a practical limitation and cost consideration to increasing the number of prior states used in choosing an impulse for achieving a desired transition in a bistable electro-optic display.

In the compensation voltage method and apparatus of the present invention, the size of the look-up table needed is reduced, and compensation voltage data is stored for each pixel of the display, this compensation voltage data being calculated dependent upon at least one impulse previously applied to the relevant pixel. The voltage finally applied to the pixel is the sum of a drive voltage, chosen in the usual way from the look-up table, and a compensation voltage determined from the compensation voltage data for the relevant pixel. In effect, the compensation voltage data applies to the pixel a "correction" such as would otherwise be applied by indexing the look-up table for one or more additional prior states.

The look-up table used in the compensation voltage method may be of any of the types described above. Thus, the look-up table may be a simple two-dimensional table which allows only for the initial and final states of the pixel during the relevant transition. Alternatively, the look-up table may take account of one or more temporal and/or gray level prior states. The compensation voltage may also take into account only the compensation voltage data stored for the relevant pixel but may optionally also take into account of one or more temporal and/or gray level prior states. The compensation voltage may be applied to the relevant pixel not only during the period for which the drive voltage is applied to the pixel but also during so-called "hold" states when no drive voltage is being applied to the pixel.

The exact manner in which the compensation voltage data is determined may vary widely with the characteristics of the bistable electro-optic medium used. Typically, the compensation voltage data will periodically be modified in a manner which is determined by the drive voltage applied to the pixel during the present and/or one or more scan frames. In preferred forms of the invention, the compensation voltage data consists of a single numerical (register) value associated with each pixel of the display.

In a preferred embodiment of the invention, scan frames are grouped into superframes in the manner already described so that a display update can be initiated only at the beginning of a superframe. A superframe may, for example, consist of ten display scan frames, so that for a display with a 50 Hz scan rate, a display scan is 20 ms long and a superframe 200 ms long. During each superframe while the display is being rewritten, the compensation voltage data associated with each pixel is updated. The updating consists of two parts in the following order:

(1) Modifying the previous value using a fixed algorithm independent of the pulse applied during the relevant superframe; and (2) Increasing the value from step (1) by an amount determined by the impulse applied during the relevant superframe.

In a particularly preferred embodiment of the invention, steps (1) and (2) are carried out as follows:

(1) Dividing the previous value by a fixed constant, which is conveniently two; and (2) Increasing the value from step (1) by an amount proportional to the total area under the voltage/time curve applied to the electro-optic medium during the relevant superframe.

In step (2), the increase may be exactly or only approximately proportional to the area under the voltage/time curve during the relevant superframe. For example, as described in detail below with reference to FIG. 33, the increase may be "quantized" to a finite set of classes for all possible applied waveforms, each class including all waveforms with a total area between two bounds, and the increase in step (2) determined by the class to which the applied waveform belongs.

The following example is now given. The display used was a two-bit gray scale encapsulated electrophoretic display, and the drive method employed used a two-dimensional look-up table as shown in Table 12 below, which takes account only of the initial and final states of the desired transition; in this Table, the column headings represent the desired final state of the display and the row headings represent the initial state, while the numbers in individual cells represent the voltage in volts to be applied to the pixel for a predetermined period.

TABLE 12

| | | to: 0 | to: 1 | to: 2 | to: 3 |
|---|---|---|---|---|---|
| from: | 0 | 0 | +6 | +9 | +15 |
| from: | 1 | −6 | 0 | +6 | +9 |
| from: | 2 | −9 | −6 | 0 | +6 |
| from: | 3 | −15 | −9 | −6 | 0 |

To allow for practice of the compensation voltage method of the present invention, a single numerical register was associated with each pixel of the display. The various impulses shown in Table 12 were classified and a pulse class was associated with each impulse, as shown in Table 13 below.

TABLE 13

| | | | | | | | |
|---|---|---|---|---|---|---|---|
| pulse voltage (V) | −15 | −9 | −6 | 0 | +6 | +9 | +15 |
| pulse class | −30 | −18 | −12 | 0 | 12 | 18 | 30 |

During each superframe, the numerical register associated with each pixel was divided by 2, and then increased by the numerical value shown in Table 13 for the pulse being applied to the relevant pixel during the same superframe. The voltage applied to each pixel during the superframe was the sum of the drive voltage, as shown in Table 12 and a compensation voltage, $V_{comp}$, given by the formula:

$$V_{comp}=A*(\text{pixel register})$$

where the pixel register value is read from the register associated with the relevant pixel and "A" is a pre-defined constant.

Figure 33:
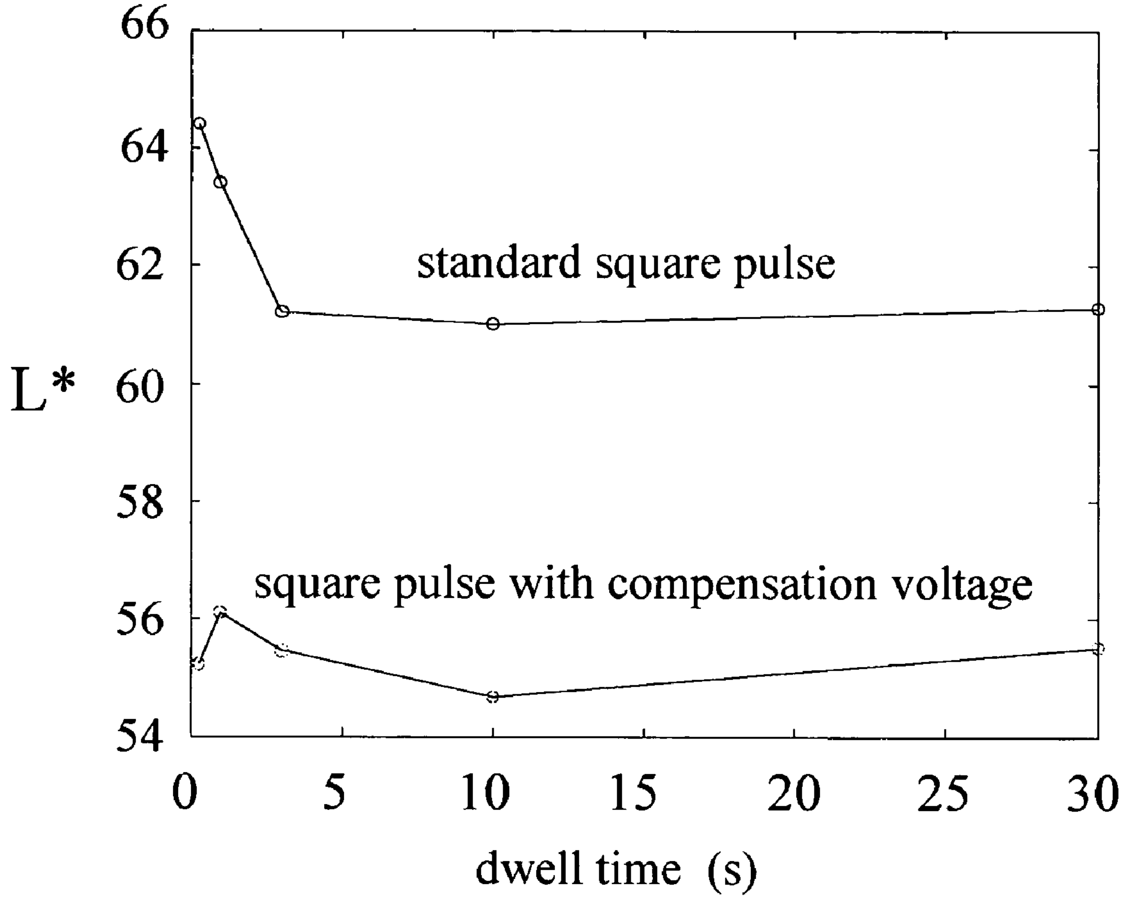
FIG. 33 is a graph illustrating the reduced dwell time dependency which can be achieved by the compensation voltage method of the present invention.

In a laboratory demonstration of this preferred compensation voltage method of the invention, single pixel displays using an encapsulated electrophoretic medium sandwiched between parallel electrodes, the front one of which was formed of ITO and light-transmissive, were driven by 300 millisecond +/−15V square wave pulses between their black and white states. The display started in its white state, was driven black, then back to white after a dwell time. It was found that the lightness of the final white state was a function of dwell state, as shown in FIG. 33 of the accompanying drawings. Thus, this encapsulated electrophoretic medium was sensitive to dwell time, with the L* of the white state varying by about 3 units depending upon dwell time.

To show the effect of the compensation voltage method of the present invention, the experiment was repeated, except that a compensation voltage, consisting of an exponentially decaying voltage starting at the end of each drive pulse, was appended to each pulse. The applied voltage was the sum of the drive voltage and the compensation voltage. As shown in FIG. 33, the white state for various dwell times in the case with the compensation voltage was much more uniform than for the uncompensated pulses. Thus, this experiment demonstrated that use of such compensation pulses in accordance with the present invention can greatly reduce the dwell time sensitivity of an encapsulated electrophoretic medium.

The compensation voltage method of the present invention may make use of any of the optional features of the basic look-up table method described above.

Further General Waveform Discussion

From the foregoing description, it will be seen that the present invention provides drivers for controlling the operation of electro-optic displays, which are well adapted to the characteristics of bistable particle-based electrophoretic displays and similar displays.

From the foregoing description, it will also be seen that the present invention provides methods and controllers for controlling the operation of electro-optic displays which allow accurate control of gray scale without requiring inconvenient flashing of the whole display to one of its extreme states at frequent intervals. The present invention also allows for accurate control of the display despite changes in the temperature and operating time thereof, while lowering the power consumption of the display. These advantages can be achieved inexpensively, since the controller can be constructed from commercially available components.

DTD Integral Reduction Method

As already mentioned, It has been found that, at least in some cases, the impulse necessary for a given transition in a bistable electro-optic display varies with the residence time of a pixel in its optical state, this phenomenon, which does not appear to have previously been discussed in the literature, hereinafter being referred to as "dwell time dependence" or "DTD". Thus, it may be desirable or even in some cases in practice necessary to vary the impulse applied for a given transition as a function of the residence time of the pixel in its initial optical state.

Figure 34:
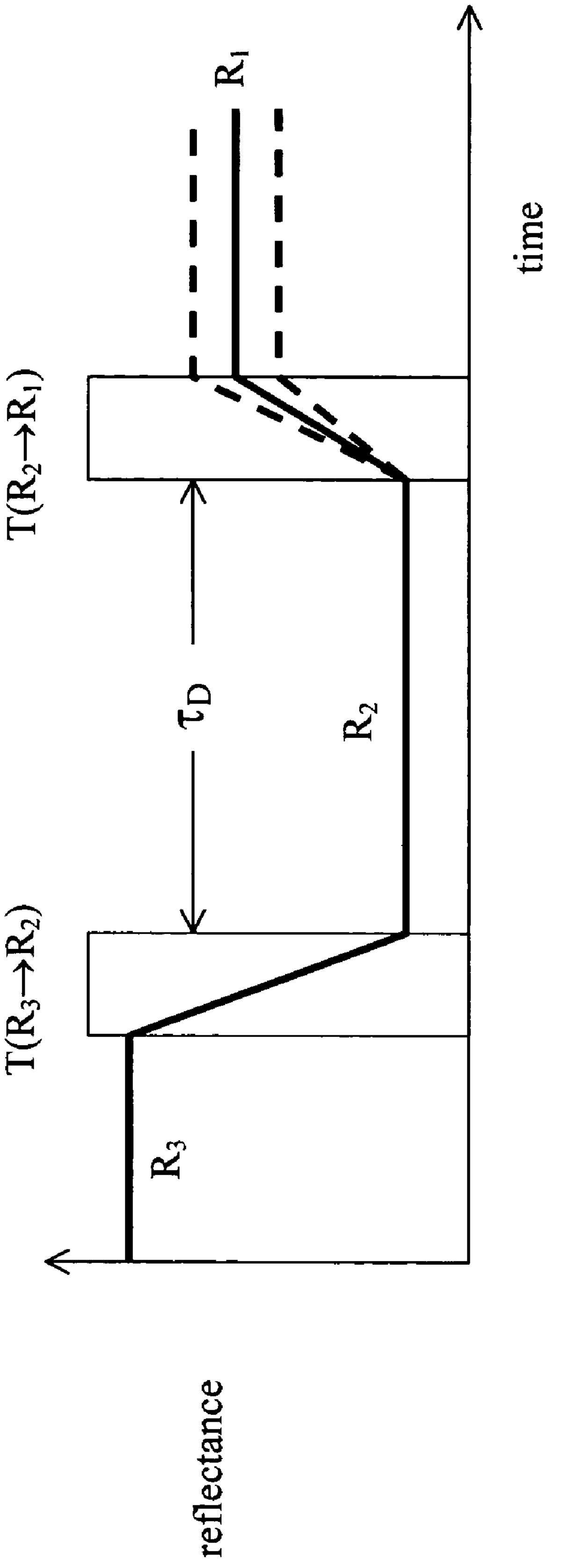
FIG. 34 is a graph illustrating the effect of dwell time dependence in an electro-optic display.

The phenomenon of dwell time dependence will now be explained in more detail with reference to FIG. 34 of the accompanying drawings, which shows the reflectance of a pixel a function of time for a sequence of transitions denoted $R_3 \rightarrow R_2 \rightarrow R_1$, where each of the $R_k$ terms indicates a gray level in a sequence of gray levels, with R's with larger indices occurring before R's with smaller indices. The transitions between $R_3$ and $R_2$ and between $R_2$ and $R_1$ are also indicated. DTD is the variation of the final optical state $R_1$ caused by variation in the time spent in the optical state $R_2$, referred to as the dwell time. The DTD integral reduction method of the present invention provides a method for reducing dwell time dependence when driving bistable electro-optic displays.

Although the invention is in no way limited by any theory as to its origin, DTD appears to be, in large part, caused by remnant electric fields experienced by the electro-optic medium. These remnant electric fields are residues of drive pulses applied to the medium. It is common practice to speak of remnant voltages resulting from applied pulses, and the remnant voltage is simply the scalar potential corresponding to remnant electric fields in the usual manner appropriate to electrostatic theory. These remnant voltages can cause the optical state of a display film to drift with time. They also can change the efficacy of a subsequent drive voltage, thus changing the final optical state achieved after that subsequent pulse. In this manner, the remnant voltage from one transition waveform can cause the final state after a subsequent waveform to be different from what it would be if the two transitions were very separate from each other. By "very separate" is meant sufficiently separated in time so that the remnant voltage from the first transition waveform has substantially decayed before the second transition waveform is applied.

Measurements of remnant voltages resulting from transition waveforms and other simple pulses applied to an electro-optic medium indicate that the remnant voltage decays with time. The decay appears monotonic, but not simply exponential. However, as a first approximation, the decay can be approximated as exponential, with a decay time constant, in the case of most encapsulated electrophoretic media tested, of the order of one second, and other bistable electro-optic media are expected to display similar decay times.

Accordingly, the DTD integral reduction method of present invention provides a method of driving a bistable electro-optic display having at least one pixel which comprises applying to the pixel a waveform V(t) such that:

$$J = \int_0^T V(t)M(T-t)dt \tag{1}$$

(where T is the length of the waveform, the integral is over the duration of the waveform, V(t) is the waveform voltage as a function of time t, and M(t) is a memory function that characterizes the reduction in efficacy of the remnant voltage to induce dwell-time-dependence arising from a short pulse at time zero) is less than about 1 volt sec. Desirably J is less than about 0.5 volt sec., and most desirably less than about 0.1 volt sec. In fact J should be arranged to be as small as possible, ideally zero.

Waveforms can be designed that give very low values of J and hence very small DTD, by generating compound pulses. For example, a long negative voltage pulse preceding a shorter positive voltage pulse (with a voltage amplitude of the same magnitude but of opposite sign) can result in a much-reduced DTD. It is believed (although the invention is in no way limited by this belief) that the two pulses provide remnant voltages with opposite signs. When the ratio of the lengths of the two pulses are correctly set, the remnant voltages from the two pulses can be caused to largely cancel each other. The proper ratio of the length of the two pulses can be determined by the memory function for the remnant voltage.

In a presently preferred embodiment of the present invention, J is calculated by:

$$J = \int_0^T V(t)\exp\left(-\frac{T-t}{\tau}\right)dt \tag{2}$$

where τ is a decay (relaxation) time best determined empirically.

For some encapsulated electrophoretic media, it has been found experimentally that waveforms that give rise to small J values also give rise to particularly low DTD, while waveforms with particularly large J values give rise to large DTD. In fact, good correlation has been found between J values calculated by Equation (2) above with τ set to one second, roughly equal to the measured decay time of the remnant voltage after an applied voltage pulse.

Thus, it is advantageous to apply the methods described in the aforementioned patents and applications with waveforms where each transition (or at least most of the transitions in the look-up table) from one gray level to another is achieved with a waveform that gives a small value of J. This J value is preferably zero, but empirically it has been found that, at least for the encapsulated electrophoretic media described in the aforementioned patents and application, as long as J had a magnitude less than about 1 volt sec. at ambient temperature, the resulting dwell time dependence is quite small.

Thus, this invention provides a waveform for achieving transitions between a set of optical states, where, for every transition, a calculated value for J has a small magnitude. The J is calculated by a memory function that is presumably monotonically decreasing. This memory function is not arbitrary but can be estimated by observing the dwell time dependence of the display film to simple voltage pulse or compound voltage pulses. As an example, one can apply a voltage pulse to the display film to achieve a transition from a first to a second optical state, wait a dwell time, then apply a second voltage pulse to achieve a transition from the second to a third voltage pulse. By monitoring the shift in the third optical state as a function of the dwell time, one can determine an approximate shape of the memory function. The memory function has a shape approximately similar to the difference in the third optical state from its value for long dwell times, as a function of the dwell time. The memory function would then be given this shape, and would have amplitude of unity when its argument is zero. This method yields only an approximation of the memory function, and for various final optical states, the measured shape of the memory function is expected to change somewhat. However, the gross features, such as the characteristic time of decay of the memory function, should be similar for various optical states. However, if there are significant differences in shape with final optical state, then the best memory function shape to adopt is one gained when the third optical state is in the middle third of the optical range of the display medium. The gross features of the memory function should also be estimable by measuring the decay of the remnant voltage after an applied voltage pulse.

Although, the methods discussed here for estimating the memory function are not exact, it has been found that J values calculated from even an approximate memory are a good guide to waveforms having low DTD. A useful memory function expresses the gross features of the time dependence of the DTD as described above. For example, a memory function that is exponential with a decay time of one second has been found to work well in predicting waveforms that gave low DTD. Changing the decay time to 0.7 or 1.3 second does not destroy the effectiveness of the resulting J values as predictors of low DTD waveforms. However, a memory function that does not decay, but remains at unity indefinitely, is noticeably less useful as a predictor, and a memory function with a very short decay time, such as 0.05 second, was not a good predictor of low DTD waveforms.

An example of a waveform that gives a small J value is the waveform shown in FIGS. 30 and 31 described above, where the x, y, and z pulses are all of durations much smaller than the characteristic decay time of the memory function. This waveform functions well when this condition is met because this waveform is composed of sequential opposing pulse elements whose remnant voltages tend to approximately cancel. For x and y values that are not much smaller than the characteristic decay time of the memory function but not larger than this decay time, it is found that that waveforms where x and y are of opposite sign tend to give lower J values, and x and y pulse durations can be found that actually permit very small J values because the various pulse elements give remnant voltages that cancel each other out after the waveform is applied, or at least largely cancel each other out.

It will be appreciated that the J value of a given waveform can be manipulated by inserting periods of zero voltage into the waveform, or adjusting the lengths of any periods of zero voltage already present in the waveform. Thus a wide variety of waveforms can be used while still maintaining a J value close to zero.

This invention has general applicability. A waveform structure can be devised described by parameters, its J values calculated for various values of these parameters, and appropriate parameter values chosen to minimize the J value, thus reducing the DTD of the waveform.

Remnant Voltage Method

In the remnant voltage method of the present invention, measurement of the remnant voltage is desirably effected by a high impedance voltage measurement device, for example a metal oxide semiconductor (MOS) comparator. When the display is one having small pixels, for example a 100 dots per inch (DPI) matrix display, in which each pixel has an area of $10^{-4}$ square inch or about $6\times10^{-2}$ $mm^2$, the comparator needs to have an ultra-low input current, as the resistance of such a single pixel is of the order of $10^{12}$ ohm. However, suitable comparators are readily available commercially; for example, the Texas Instruments INA111 chip is suitable, as it has an input current on only about 20 pA. (Technically, this integrated circuit is an instrumentation amplifier, but if its output is routed into a Schmitt trigger, it acts as a comparator.) For displays having large single pixels, such as large direct-drive displays (defined below) used in signage, where the individual pixels may have areas of several square centimeters, the requirements for the comparator are much less stringent, and almost any commercial FET input comparator may be used, for example the LF311 comparator from National Semiconductor Corporation.

It will readily be apparent to those skilled in the art of electronic displays that, for cost and other reasons, mass-produced electronic displays will normally have drivers in the form of application specific integrated circuits (ASIC's), and in this type of display the comparator would typically be provided as part of the ASIC. Although this approach would require provision of feedback circuitry within the ASIC, it would have the advantage of making the power supply and oscillator sections of the ASIC simpler and smaller in area. If tri-level general image flow drive is required, this approach would also make the driver section of the ASIC simpler and smaller in area. Thus, this approach would typically reduce the cost of the ASIC.

Conveniently, a driver which can apply a driving voltage, electronically short or float the pixel, is used to apply the driving pulses. When using such a driver, on each addressing cycle where DC balance correction is to be effected, the pixel is addressed, electronically shorted, then floated. (The term "addressing cycle" is used herein in its conventional meaning in the art of electro-optic displays to refer to the total cycle needed to change from a first to a second image on the display. As noted above, because of the relatively low switching speeds of electrophoretic displays, which are typically of the order of tens to hundreds of milliseconds, a single addressing cycle may comprise a plurality of scans of the entire display.) After a short delay time, the comparator is used to measure the remnant voltage across the pixel, and to determine whether it is positive or negative in sign. If the remnant voltage is positive, the controller may slightly extend the duration of (or slightly increase the voltage of) negative-going addressing pulses on the next addressing cycle. If, however, the remnant voltage is negative, the controller may slightly extend the duration of (or slightly increase the voltage of) positive-going voltage pulses on the next addressing cycle.

Thus, the remnant voltage method of the invention places the electro-optic medium into a bang-bang feedback loop, adjusting the length of the addressing pulses to drive the remnant voltage toward zero. When the remnant voltage is near zero, the medium exhibits ideal performance and improved lifetime. In particular, use of the present invention may allow improved control of gray scale. As noted earlier, it has been observed that the gray scale level obtained in electro-optic displays is a function not only of the starting gray scale level and the impulse applied, but also of the previous states of the display. It is believed (although this invention is in no way limited by this belief) that one of the reasons for this "history" effect on gray scale level is that the remnant voltage affects the electric field experienced by the electro-optic medium; the actual electric field influencing the behavior of the medium is the sum of the voltage actually applied via the electrodes and the remnant voltage. Thus, controlling the remnant voltage in accordance with the present invention ensures that the electric field experienced by the electro-optic medium accurately corresponds to that applied via the electrodes, thus permitting improved control of gray scale.

The remnant voltage method of the present invention is especially useful in displays of the so-called "direct drive" type, which are divided into a series of pixels each of which is provided with a separate electrode, the display further comprising switching means arranged to control independently the voltage applied to each separate electrode. Such direct drive displays are useful for the display of text or other limited character sets, for example numerical digits, and are described in, inter alia, the aforementioned International Application Publication No. 00/05704. However, the remnant voltage method of the present invention can also be used with other types of displays, for example active matrix displays which use an array of transistors, at least one of which is associated with each pixel of the display. Activating the gate line of a thin film transistor (TFT) used in such an active matrix display connects the pixel electrode to the source electrode. The remnant voltage is small compared to the gate voltage (the absolute value of the remnant voltage typically does not exceed about 0.5 V), so the gate drive voltage will still turn the TFT on. The source line can then be electronically floated and connected to a MOS comparator, thus allowing reading the remnant voltage of each individual pixel of the active matrix display.

It should be noted that, although the remnant voltage on a pixel of an electrophoretic display does closely correlate with the extent to which the current flow through that pixel has been DC balanced, zero remnant voltage does not necessarily imply perfect DC balance. However, from the practical point of view, this makes little difference, since it appears to be the remnant voltage itself rather than the DC balance history which is responsible for the adverse effects noted herein.

It will readily be apparent to those skilled in the display art that, since the purpose of the remnant voltage method of the present invention is to reduce remnant voltage and DC imbalance, this method need not be applied on every addressing cycle of a display, provided it is applied with sufficient frequency to prevent a long-term build-up of DC imbalance at a particular pixel. For example, if the display is one which requires use of a "refresh" or "blanking" pulse at intervals, such that during the refresh or blanking pulse all of the pixels are driven to the same display state, normally one of the extreme display states (or, more commonly, all of the pixels are first driven to one extreme display state, and then to the other extreme display state), the method of the present invention might be practiced only during the refresh or blanking pulses.

Although the remnant voltage method of the invention has primarily been described in its application to encapsulated electrophoretic displays, this method may be also be used with unencapsulated electrophoretic displays, and with other types of display, for example electrochromic displays, which display a remnant voltage.

From the foregoing description, it will be seen that the remnant voltage method of the present invention provides a method for driving electrophoretic and other electro-optic displays which reduces the cost of the equipment needed to ensure DC balancing of the pixels of the display, while providing increasing display lifetime, operating window and long-term display optical performance.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing data representing at least one temporal prior state of each pixel of the display at a predetermined time prior to the initial state;

storing data representing at least two gray level prior states of each pixel prior to a change in gray scale level to produce the initial state;

receiving an input signal representing a desired final state of at least one pixel of the display; and generating an output signal representing the impulse necessary to convert the initial state of said one pixel to the desired final state thereof, as determined from the look-up table, the output signal being generated dependent upon said at least one temporal prior state, said at least two gray level prior states and said initial state of said one pixel.

2. A method according to claim 1 further comprising receiving a temperature signal representing the temperature of at least one pixel of the display and generating said output signal dependent upon said temperature signal.

3. A method according to claim 1 further comprising generating a lifetime signal representing the operating time of said pixel and generating said output signal dependent upon said lifetime signal.

4. A method according to claim 1 wherein at least one entry in the look-up table comprises a pointer to an entry in a second table specifying one of a plurality of types of waveform to be used for the relevant transition, and at least one parameter specifying how the waveform is to be varied for the relevant transition.

5. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing data representing at least two temporal prior states of each pixel at predetermined times prior to the initial state;

storing data representing at least one gray level prior state of each pixel prior to a change in gray scale level to produce the initial state;

receiving an input signal representing a desired final state of at least one pixel of the display; and generating an output signal representing the impulse necessary to convert the initial state of said one pixel to the desired final state thereof, as determined from the look-up table, the output signal being generated dependent upon said at least two temporal prior states, said at least one gray level prior state and said initial state of said one pixel.

6. A method according to claim 5 further comprising receiving a temperature signal representing the temperature of at least one pixel of the display and generating said output signal dependent upon said temperature signal.

7. A method according to claim 5 further comprising generating a lifetime signal representing the operating time of said pixel and generating said output signal dependent upon said lifetime signal.

8. A method according to claim 5 wherein at least one entry in the look-up table comprises a pointer to an entry in a second table specifying one of a plurality of types of waveform to be used for the relevant transition, and at least one parameter specifying how the waveform is to be varied for the relevant transition.

9. A device controller comprising:

storage means arranged to store a look-up table containing data representing the impulses necessary to convert an initial gray level to a final gray level, data representing at least an initial state of each pixel of the display, data representing at least one temporal prior state of each pixel of the display at a predetermined time prior to the initial state, and data representing at least two gray level prior states of each pixel prior to a change in gray scale level to produce the initial state;

input means for receiving an input signal representing a desired final state of at least one pixel of the display;

calculation means for determining, from the input signal, the stored data representing the initial state, the at least one temporal prior state and the at least two gray level prior states of said pixel, and the look-up table, the impulse required to change the initial state of said one pixel to the desired final state; and output means for generating an output signal representative of said impulse.

10. A controller according to claim 9 wherein the input means is arranged to receive a temperature signal representing the temperature of at least one pixel of the display, and the calculation means is arranged to determine the impulse dependent upon the temperature signal.

11. A controller according to claim 9 wherein the input means is arranged to receive a lifetime signal representing the operating time temperature of the pixel, and the calculation means is arranged to determine the impulse dependent upon the lifetime signal.

12. A device controller comprising:

storage means arranged to store a look-up table containing data representing the impulses necessary to convert an initial gray level to a final gray level, data representing at least an initial state of each pixel of the display, data representing at least two temporal prior states of each pixel of the display at predetermined times prior to the initial state, and data representing at least one gray level prior state of each pixel prior to a change in gray scale level to produce the initial state;

input means for receiving an input signal representing a desired final state of at least one pixel of the display;

calculation means for determining, from the input signal, the stored data representing the initial state, the at least two temporal prior states and the at least one gray level prior state of said pixel, and the look-up table, the impulse required to change the initial state of said one pixel to the desired final state; and output means for generating an output signal representative of said impulse.

13. A controller according to claim 12 wherein the input means is arranged to receive a temperature signal representing the temperature of at least one pixel of the display, and the calculation means is arranged to determine the impulse dependent upon the temperature signal.

14. A controller according to claim 12 wherein the input means is arranged to receive a lifetime signal representing the operating time temperature of the pixel, and the calculation means is arranged to determine the impulse dependent upon the lifetime signal.

15. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing compensation voltage data representing a compensation voltage for each pixel of the display, the compensation voltage for any pixel being calculated dependent upon at least one impulse previously applied to that pixel;

receiving an input signal representing a desired final state of at least one pixel of the display; and generating an output signal representing a pixel voltage to be applied to said one pixel, said pixel voltage being the sum of a drive voltage determined from the initial and final states of the pixel and the look-up table, and a compensation voltage determined from the compensation voltage data for the pixel, the compensation voltage for each pixel being applied to that pixel both during a period when a drive voltage is being applied to the pixel and during a hold period when no drive voltage is being applied to the pixel.

16. A method according to claim 15 wherein the display is an electrophoretic display.

17. A method according to claim 16 wherein the display is an encapsulated electrophoretic display.

18. A method according to claim 15 wherein the display is a microcell display comprising charged particles and a suspending fluid retained within a plurality of cavities formed in a carrier medium.

19. A method according to claim 15 wherein the display is a passive matrix display.

20. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing compensation voltage data representing a compensation voltage for each pixel of the display, the compensation voltage for any pixel being calculated dependent upon at least one impulse previously applied to that pixel;

receiving an input signal representing a desired final state of at least one pixel of the display; and generating an output signal representing a pixel voltage to be applied to said one pixel, said pixel voltage being the sum of a drive voltage determined from the initial and final states of the pixel and the look-up table, and a compensation voltage determined from the compensation voltage data for the pixel, the compensation voltage for each pixel being updated during each superframe required for a complete addressing of the display.

21. A method according to claim 20 wherein the compensation voltage for each pixel is calculated dependent upon at least one of a temporal prior state of the pixel and a gray level prior state of the pixel.

22. A method according to claim 20 wherein the compensation voltage for each pixel is updated by (1) modifying the previous value of the compensation voltage using a fixed algorithm independent of the pulse applied during the relevant superframe; and (2) increasing the value from step (1) by an amount determined by the pulse applied during the relevant superframe.

23. A method according to claim 22 wherein the compensation voltage for each pixel is updated by (1) dividing the previous value of the compensation voltage by a fixed constant; and (2) increasing the value from step (1) by an amount substantially proportional to the total area under the voltage/time curve applied to the electro-optic medium during the relevant superframe.

24. A method according to claim 20 wherein the compensation voltage is applied in the form of an exponentially decaying voltage applied at the end of at least one drive pulse.

25. A method according to claim 20 wherein the display is an electrophoretic display.

26. A method according to claim 25 wherein the display is an encapsulated electrophoretic display.

27. A method according to claim 20 wherein the display is a microcell display comprising charged particles and a suspending fluid retained within a plurality of cavities formed in a carrier medium.

28. A method according to claim 20 wherein the display is a passive matrix display.

29. A device controller comprising:

storage means arranged to store both a look-up table containing data representing the impulses necessary to convert an initial gray level to a final gray level, data representing at least an initial state of each pixel of the display; and compensation voltage data for each pixel of the display;

input means for receiving an input signal representing a desired final state of at least one pixel of the display;

calculation means for determining, from the input signal, the stored data representing the initial state of said pixel, and the look-up table, a drive voltage required to change the initial state of said one pixel to the desired final state, the calculation means also determining, from the compensation voltage data for said pixel, a compensation voltage for said pixel, and summing the drive voltage and the compensation voltage to determine a pixel voltage; and output means for generating an output signal representative of said pixel voltage, the output means being arranged to apply the compensation voltage to the pixel both during a period when a drive voltage is being applied to the pixel and during a hold period when no drive voltage is being applied to the pixel.

30. A device controller comprising:

storage means arranged to store both a look-up table containing data representing the impulses necessary to convert an initial gray level to a final gray level, data representing at least an initial state of each pixel of the display; and compensation voltage data for each pixel of the display;

input means for receiving an input signal representing a desired final state of at least one pixel of the display;

calculation means for determining, from the input signal, the stored data representing the initial state of said pixel, and the look-up table, a drive voltage required to change the initial state of said one pixel to the desired final state, the calculation means also determining, from the compensation voltage data for said pixel, a compensation voltage for said pixel, and summing the drive voltage and the compensation voltage to determine a pixel voltage; and output means for generating an output signal representative of said pixel voltage, the calculation means being arranged to update the compensation voltage for each pixel during each superframe required for a complete addressing of the display.

31. A device controller according to claim 30 wherein the calculation means is arranged to update the compensation voltage for each pixel by (1) modifying the previous value of the compensation voltage using a fixed algorithm independent of the pulse applied during the relevant superframe; and (2) increasing the value from step (1) by an amount determined by the pulse applied during the relevant superframe.

32. A device controller according to claim 31 wherein the calculation means is arranged to update the compensation voltage for each pixel by (1) dividing the previous value of the compensation voltage by a fixed constant; and (2) increasing the value from step (1) by an amount substantially proportional to the total area under the voltage/time curve applied to the electro-optic medium during the relevant superframe.

33. A device controller according to claim 30 wherein the output means is arranged to apply the compensation voltage in the form of an exponentially decaying voltage applied at the end of at least one drive pulse.

34. A method for updating a bistable electro-optic display having a plurality of pixels arranged in a plurality of rows and columns such that each pixel is uniquely defined by the intersection of a specified row and a specified column, and drive means for applying electric fields independently to each of the pixels to vary the display state of the pixel; each pixel having at least three different display states, the method comprising:

storing region data representing a defined region comprising a part but less than all of said display;

determining for each pixel whether the pixel is within or outside the defined region;

applying a first drive scheme to pixels within the defined region and a second drive scheme, different from the first drive scheme, to pixels outside the defined region, the first and second drive scheme differing in bit depth.

35. A method according to claim 34 wherein one of the first and second drive schemes is monochrome and the other is gray scale having at least four different gray levels.

36. A method according to claim 34 wherein the defined region comprises a text box used for entry of text on to the display.

37. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table, wherein for at least one transition from an initial state to a final state, the output signal comprises a DC imbalanced fine tuning sequence which:

(a) has a non-zero net impulse;

(b) is non-contignous;

(c) results in a change in gray level of the pixel that is substantially different from the change in optical state of its DC reference pulse, where the DC reference pulse is a pulse of voltage $V_0$, where $V_0$ is the maximum voltage applied during the fine tuning sequence but with the same sign as the net impulse G of the fine tuning sequence, and the duration of the reference pulse is $G/V_0$; and (d) results in a change in gray level of the pixel smaller in magnitude than the change in gray level caused by its time-reference pulse, where the time-reference pulse is defined as a monopolar voltage pulse of the same duration as the fine tuning sequence, but where the sign of the reference pulse is that which gives the larger change in gray level.

38. A method according to claim 37 wherein the fine tuning sequence results in a change in gray level of the pixel less than one half of the change in gray level caused by its time-reference pulse.

39. A method according to claim 37 wherein for said at least one transition, the output signal comprises at least one monopolar drive pulse in addition to the fine tuning sequence.

40. A method according to claim 37 wherein, for said at least one transition, the output signal is non-periodic.

41. A method according to claim 37 wherein, for a majority of transitions in the lookup table, the output signal has a non-zero net impulse and is non-contiguous.

42. A method according to claim 41 wherein, for said at least one transition, the output signal consists only of pulses having voltage levels of 0 and one of +V and −V.

43. A method according to claim 42 wherein, for said at least one transition, the output signal consists of a pulse having a voltage level of 0 preceded and followed by at least two pulses having voltage levels of the same one of +V and −V.

44. A method according to claim 43 wherein, for a majority of transitions in the lookup table for which the initial and final states of the pixel are different, the output signal consists of a pulse having a voltage level of 0 preceded and followed by at least two pulses having voltage levels of the same one of +V and −V.

45. A method according to claim 37 wherein, for said at least one transition, the output signal consists only of pulses having voltage levels of +V, 0 and −V.

46. A method according to claim 37 wherein the transition table is DC balanced.

47. A method according to claim 37 wherein, for said at least one transition, the output signal consists of a series of pulses which are integer multiples of a single interval.

48. A method according to claim 37 further comprising storing data representing at least one temporal prior state of said one pixel and/or at least one gray level prior state of said one pixel, and wherein the output signal is generated dependent upon said at least one temporal prior state and/or at least one gray level prior state of said one pixel.

49. A method according to claim 37 wherein the display is an electrophoretic display.

50. A method according to claim 49 wherein the display is an encapsulated electrophoretic display.

51. A method according to claim 37 wherein the display is a microcell display comprising charged particles and a suspending fluid retained within a plurality of cavities formed in a carrier medium.

52. A method according to claim 37 wherein the display is a passive matrix display.

53. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table, wherein for at least one transition from an initial state to a final state, the output signal comprises a DC balanced fine tuning sequence which:

(a) has substantially zero net impulse; and (b) at no point in the fine tuning sequence, causes the gray level of the pixel to vary from its gray level at the beginning of the fine tuning sequence by more than about one third of the difference in gray level between the two extreme optical states of the pixel.

54. A method according to claim 53 wherein for said at least one transition, the output signal comprises at least one monopolar drive pulse in addition to the fine tuning sequence.

55. A method according to claim 53 wherein the display is an electrophoretic display.

56. A method according to claim 55 wherein the display is an encapsulated electrophoretic display.

57. A method according to claim 53 wherein the display is a microcell display comprising charged particles and a suspending fluid retained within a plurality of cavities formed in a carrier medium.

58. A method according to claim 53 wherein the display is a passive matrix display.

59. A method of driving a bistable electro-optic display having a plurality of pixels, each of which is capable of displaying at least three gray levels, the method comprising applying to each pixel of the display an output signal effective to change the pixel from an initial state to a final state, wherein, for at least one transition, the output signal is non-zero but DC balanced.

60. A method according to claim 59 wherein, for said at least one transition, the output signal comprises a first pair of pulses comprising a voltage pulse preceded by a pulse of equal length but opposite sign.

61. A method according to claim 60 wherein the output signal further comprises a period of zero voltage between the two pulses.

62. A method according to claim 60 wherein at least one of the pulses is interrupted by a period of zero voltage.

63. A method according to claim 60 wherein, for said at least one transition, the output signal further comprises a second pair of pulses of equal length but opposite sign.

64. A method according to claim 63 wherein the second pair of pulses having a length different from that of the first pair of pulses.

65. A method according to claim 63 wherein the first of the second pair of pulses has a polarity opposite to that of the first of the first pair of pulses.

66. A method according to claim 63 wherein the first pair of pulses occur between the first and the second of the second pair of pulses.

67. A method according to claim 59 wherein, for said at least one transition, the output signal comprises at least one pulse element effective to drive the pixel substantially into one optical rail.

68. A method according to claim 59 wherein, for each transition for which the initial and final states of the pixel are the same, the output signal is non-zero but DC balanced, and for each transition in which the initial and final states of the pixel are not the same, the output signal is not DC balanced.

69. A method according to claim 68 wherein, for each transition in which the initial and final states of the pixel are not the same, the output signal has the form $-x/\Delta IP/x$, where ΔIP is the difference in impulse potential between the initial and final states of the pixel and −x and x are a pair of pulses of equal length but opposite sign.

70. A method according to claim 59 further comprising:

storing a look-up table containing data representing the impulses necessary to convert the initial gray level of a pixel to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from the look-up table.

71. A method of driving a bistable electro-optic display having at least one pixel which comprises applying to the pixel a waveform V(t) such that:

$$J = \int_0^T V(t)M(T-t)dt$$

(where T is the length of the waveform, the integral is over the duration of the waveform, V(t) is the waveform voltage as a function of time t, and M(t) is a memory function that characterizes the reduction in efficacy of the remnant voltage to induce dwell-time-dependence arising from a short pulse at time zero) is less than about 1 volt sec.

72. A method according to claim 71 wherein J is less than about 0.5 volt sec.

73. A method according to claim 71 wherein J is less than about 0.1 volt sec.

74. A method according to claim 71 wherein J is calculated by:

$$J = \int_0^T V(t)\exp\left(-\frac{T-t}{\tau}\right)dt$$

where τ is a decay (relaxation) time.

75. A process according to claim 74 wherein τ has a value of from about 0.7 to about 1.3 seconds.

76. A method according to claim 71 wherein the display is an electrophoretic display.

77. A method according to claim 76 wherein the display is an encapsulated electrophoretic display.

78. A method according to claim 71 wherein the display is a microcell display comprising charged particles and a suspending fluid retained within a plurality of cavities formed in a carrier medium.

79. A method according to claim 71 wherein the display is a passive matrix display.

* * * * *